US012697593B2

(12) United States Patent
Yücesan

(10) Patent No.: US 12,697,593 B2
(45) Date of Patent: Aug. 4, 2026

(54) SEMICONDUCTIVE AND PROTON-CONDUCTIVE POROUS HYDROGEN-BONDED FRAMEWORKS

(71) Applicant: TECHNISCHE UNIVERSITÄT BERLIN, Berlin (DE)

(72) Inventor: Gündog Yücesan, Berlin (DE)

(73) Assignee: Technische Universitat Berlin, Berlin (DE)

( * ) Notice: Subject to any disclaimer, the term of this patent is extended or adjusted under 35 U.S.C. 154(b) by 916 days.

(21) Appl. No.: 17/802,945

(22) PCT Filed: Feb. 26, 2021

(86) PCT No.: PCT/EP2021/054781
§ 371 (c)(1),
(2) Date: Aug. 27, 2022

(87) PCT Pub. No.: WO2021/170775
PCT Pub. Date: Sep. 2, 2021

(65) Prior Publication Data

US 2023/0330605 A1 Oct. 19, 2023

(30) Foreign Application Priority Data

Feb. 27, 2020 (EP) .................................... 20159842

(51) Int. Cl.

| | |
|---|---|
| *B01D 71/82* | (2006.01) |
| *B01D 67/00* | (2006.01) |
| *B01D 69/14* | (2006.01) |

(52) U.S. Cl.
CPC ....... *B01D 71/82* (2013.01); *B01D 67/00931* (2022.08); *B01D 69/148* (2013.01)

(58) Field of Classification Search
None
See application file for complete search history.

(56) References Cited

U.S. PATENT DOCUMENTS

2011/0236301 A1 9/2011 Kang et al.

FOREIGN PATENT DOCUMENTS

WO 2005114772 A2 12/2005

OTHER PUBLICATIONS

Y. Y. Enakieva, et. al., Highly Proton-Conductive Zinc Metal-Organic Framework Based On Nickel(II) Porphyrinylphosphonate, Chem. Eur. J. 2019, 25, 10552. (Year: 2019).*

(Continued)

*Primary Examiner* — Benjamin L Lebron
*Assistant Examiner* — Eric J Mccullough
(74) *Attorney, Agent, or Firm* — MaxGoLaw PLLC

(57) ABSTRACT

A hydrogen bonded organic framework (HOF) includes at least one kind of organic linker with at least one functional group forming a hydrogen-bonded network, the functional group includes a hydroxyl group and a central atom of tetrahedral geometry, the HOF is semi-conductive, proton-conductive and porous, and can even be microporous. In some embodiments, the at least one functional group is phosphonic acid, phosphinic acid, arsonic acids, arsinic acids, phosphonate, arsonate and/or esters thereof including at least one hydroxyl group. A covalent organic framework (COF), is also provided based on an HOF for transforming the hydrogen bonds between the functional groups into covalent anhydride bonds via a condensation reaction or reactions known to form anhydrides.

20 Claims, 19 Drawing Sheets

(56) References Cited

OTHER PUBLICATIONS

Int'l Search Report for PCT/EP2021/054781, dated May 27, 2021.
Bao, et al., "Proton conductive metal phosphonate frameworks", Coordination Chemistry Reviews, vol. 378, Dec. 28, 2017 (Dec. 28, 2017), pp. 577-594.
Colodrero, et al., "Structural variability in M2+ 2-hydroxyphosphonoacetate moderate proton conductors", Pure & Applied Chemistry, vol. 89, No. 1, Jan. 6, 2017 (Jan. 6, 2017), pp. 75-87.
Schutrumph, et al. "Synthesis of Some Di- and Tetraphosphonic Acids by Suzuki Cross-Coupling", Anorg. Chem, 2018, vol. 644, Issue 19., pp. 1134-1142, Abstract Only.
Lloyd, et al., "Substituted phenylarsonic acids; structures and spectroscopy", Journal of Organometallic Chemicstry, Jul. 2008, vol. 693, pp. 2443-2450, Abstract only.
Song-Song, et al., "Proton conductive metal phosphonate frameworks," Coordination Chemistry Reviews, vol. 378, Jan. 1, 2019, pp. 577-594, Abstract only.
Colodrero, et al., "Structural variability in M2+ 2-hydroxyphosphonoacetate moderate proton conductors", Pure Appl. Chem., 2017, vol. 89(1), pp. 75.87.
Hamilton, et al., "The Preparation of Aromatic Arsonic and Arsinic Acids by the Bart, Bechamp, and Rosenmund Reactions", Organic Reactions, vol. II, John Wiley & Sons, Inc, 1944, pp. 415-454.

* cited by examiner

1

TPPP

H$_8$-TPPA

[(H8-TPPA)(PPA)2(DMA)4]
GTUB-5

TBPP

TDPP

A

B

A

B

A

B

C

D

E

F

G

H

I

SEMICONDUCTIVE AND PROTON-CONDUCTIVE POROUS HYDROGEN-BONDED FRAMEWORKS

The invention relates to a hydrogen-bonded organic framework (HOF) comprising at least one kind of organic linker with at least one functional group forming a hydrogen-bonded network, wherein the functional group comprise a hydroxyl group and a central atom of tetrahedral geometry, and wherein the HOF is semi-conductive, proton-conductive and porous, preferably microporous. In embodiments, the at least one functional group is selected from the group comprising phosphonic acid, phosphinic acid, arsonic acids, arsinic acids, phosphonate, arsonate and/or esters thereof comprising at least one hydroxyl group. The invention further relates to a covalent organic framework (COF), characterized in that it has been generated from a HOF according to any of the preceding claims by transforming the hydrogen bonds between the functional groups into covalent anhydride bonds via a condensation reaction or a reaction known to form anhydrides.

BACKGROUND OF THE INVENTION

Metal organic frameworks (MOFs) emerged as revolutionary microporous materials at the beginning of the $21^{st}$ century[1-3]. Owing to their well-ordered pores, which are surrounded by inorganic and organic components, MOFs have been used in a wide range of applications, such as gas storage/separation[4-7], catalysis[8-13], magnetism[14-16], electric conductivity[17-19], proton conductivity[20-22], drug delivery[23-25].

In parallel to MOF research, another closely related family of supramolecular architectures known as Hydrogen-bonded Organic Frameworks (HOFs) have attracted immense interest in recent years[26-28]. In HOFs, the linker connectivity is achieved via simpler hydrogen-bonded networks rather than complex inorganic building units (IBUs)[29-33]. Hydrogen bonds provide simpler connectivity options compared to the complex molecular, one-, two-, and three-dimensional IBUs of MOFs[34]. Therefore, the design and synthesis of stable hydrogen-bonded supramolecular networks can be more easily achieved compared to that of MOFs.

However, the HOFs and COFs of the invention in comparison to MOFs of the state of the art are totally different compound families. One cannot predict the properties of the one from knowledge about the other. Also, the synthesis of HOFs and MOFs are not comparable. Synthesis of coordination polymers or MOFs involve the formation of coordinate covalent bond between the linkers while in the synthesis of HOF, no coordinate covalent bonds are formed, just hydrogen bonds between the linkers.

For example, Bao Song-Song et al. ("Proton conductive metal phosphonate frameworks", COORDINATION CHEMISTRY REVIEWS, vol. 378, pages 577-594) describe metal organic frameworks comprising in their IBU lithium ions. Li-HPA is a metal organic framework, which is (as all MOFs) not held together by hydrogen bonds, but by coordinate covalent bonds between metal ions and metal binding functional groups. In contrast, HOFs do not have coordinate covalent bonds and there is no hydrogen in $PO_3$-groups of Li-HPA. The only proton is in the (OH) group, which is attached to the central methane core, which is an alcohol and not a phosphonic acid. Li-HPA is a mixed linker system, it is not a pure organophosphonic acid. Also, all the other compounds and works presented by Song-Song et al. are metal organic frameworks, and there is no indication that the MOFs presented therein could have semiconductive properties. Accordingly, the compounds presented by Song-Song et al. are completely different from the HOFs of the invention and no relevant information concerning the HOFs disclosed herein can be derived therefrom.

Furthermore, Colodrero et al. ("Structural variability in $M^{2+}$2-hydroxy-phosphonoacetate moderate proton conductors", PURE & APPLIED CHEMISTRY, vol. 89, no. 1, 1 Jan. 2017, pages 75-87) disclose various porous proton-conductive organic frameworks. Importantly, the band gap for proton conductivity disclosed therein is a totally different concept than the band gap of a semiconductive material. Colodrero et al. do not even mention semi-conductivity. Importantly, there is not a relationship between semi-conductivity and proton conductivity, since proton conductivity is about the movement of positively charged hydrogen atoms, the semi-conductivity is about the movement of electrons. Semi-conductivity band gap is calculated by a Tauc plot and DFT calculations. Proton conductivity band gap is not. A highly semiconductive material can exhibit no proton conductivity and many proton conductive materials are not semiconductive at all. For example, graphene or gallium arsenate are perfect semiconductors but they don't have a single hydrogen atom to conduct protons.

HOFs are also more convenient to recycle and HOFs are free of heavy metal ions compared to the MOFs providing environmentally friendly solutions. The recent interest in HOFs has resulted in many research and several review articles[34-37] summarizing their applications in gas storage, $CO_2$ capture[38-40], and proton conductivity[41-42]. However, to date, no semi-conductive HOF have been reported in the literature.

In light of the prior art there remains a significant need in the art to provide HOFs with both semi-conductive and proton-conductive behavior. Such HOFs could be used in supercapacitors and electrodes, thin films on surfaces, optoelectronic applications, solar panels, printed electronics such as screen printing, flexography, gravure, offset lithography, and inkjet. Furthermore, such HOFs could be used to construct active or passive devices such as thin film transistors, coils, resistors. Semiconductive HOFs would provide important advantages due to their simpler chemistry and solubilities compared to the MOFs.

SUMMARY OF THE INVENTION

In light of the prior art the technical problem underlying the present invention is to provide HOFs with both semi-conductive and proton-conductive behavior. Such HOFs could be used in multiple ways, for example in the context of electrochemical double layer capacitor and/or supercapacitor as electrode material.

This problem is solved by the features of the independent claims. Preferred embodiments of the present invention are provided by the dependent claims.

The invention therefore relates to a hydrogen-bonded organic framework (HOF) comprising at least one kind of organic linker with at least one functional group forming a hydrogen-bonded network,

- wherein the functional group comprise a hydroxyl group and a central atom of tetrahedral geometry, and
- wherein the HOF is semi-conductive, proton-conductive and porous, preferably microporous.

The invention is based on the entirely surprising finding that organic linkers of multiple different shapes comprising diverse organic cores and the functional groups as described herein can assemble into HOFs. The HOFs of the present invention are characterized by being semi-conductive, proton-conductive and (micro)porous, which makes them an excellent material for use in membranes in proton exchange membrane fuel cells (PEMFCs), in electrodes of supercapacitors, in solar cells, such as photovoltaic solar cells, printed electronics such as, screen printing, flexography, gravure, offset lithography, and inkjet. Furthermore, such HOFs could be used to construct active or passive devices such as thin film transistors, coils, resistors and in other semiconductor applications, such as printing semi-conductive wires, nanowires, etc.

The invention therefore relates to a HOF of the invention for use as a membrane-material in a proton exchange membrane fuel cell, as an electrode material in an electrical double layer capacitor and/or supercapacitor and use in a solar cell and/or in semiconductor applications. Semiconductor application as used herein include the use of the HOFs of the invention as semiconductor in thin films on surfaces, optoelectronic applications, solar panels, applications in photovoltaics, in printed electronics such as screen printing, flexography, gravure, offset lithography, and inkjet.

The HOFs of the present invention, in contrast to known metal organic frameworks (MOFs) do not comprise inorganic building units (IBUs). IBUs may also be called metal ion clusters, or metal-based inorganic groups, such as one dimensional and two-dimensional inorganic building units. The inorganic building units are formed by metal atoms or ions and the functional groups of the organic linkers of the MOFs, wherein the metal atoms and the functional groups of the organic linkers are bound to each other through coordinate covalent bonding. In other words, MOFs are made by linking metal atoms or ions with organic building units which comprise organic linkers and optionally auxiliary linkers, mostly through coordinate covalent bonding.

In contrast, the HOFs of the invention do not comprise such IBUs comprising metal ions that interact with the functional groups of organic linkers. In the context of the HOFs of the invention, the framework is formed through hydrogen bonds between the functional groups. Metal ions are not involved in the formation of the network between the individual molecules of the HOF.

With respect to the HOFs of the present invention, herein it shown for the first time that organophosphonic acids can form permanently microporous, thermally stable, hydrogen bonded organic frameworks. There is no IBU or metal ion forming coordinate covalent bonds required for achieving these surprising and advantageous properties.

There is not a single semiconductive hydrogen bonded organic framework (HOF) ever reported in the literature. Our work is the first example of semiconductivity observed in HOFs. There is also not a single proton conductive phosphonic acid HOFs in the literature. We reported this for the first time.

Furthermore, the invention relates to a PEMFC comprising a HOF of the invention as a membrane-material. The invention also relates to an electrode suitable for constructing an electrochemical double layer capacitor and/or supercapacitor comprising as an electrode material a HOF of the invention as disclosed herein. The invention further relates to a solar cell comprising a HOF of the invention, for example as a semiconductor material. Additionally, the invention relates to semiconductor products, such as wires and nanowires, comprising a HOF of the invention as a semiconductor material. Furthermore, the invention relates to printed electronics such as, screen printing, flexography, gravure, offset lithography, and inkjet, comprising a HOF of the invention as a semiconductor material. The invention relates to the active and passive devices constructed using printing electronics such as thin film transistors, coils, resistors, comprising a HOF of the invention. GTUB5 has 1.65 eV bandgap in solution and the cyclic voltammetry in DMSO produces the same band gap. Therefore, phosphonic acid HOFs are superior compounds to be used in printed electronics.

Accordingly, the invention also relates to the use of a HOF of the invention for constructing membranes in proton exchange membrane fuel cells (PEMFCs). The invention further relates to the use of a HOF of the invention for constructing and/or as a material of electrodes, preferably electrodes in supercapacitor application. The invention further relates to the use of a HOF of the invention for constructing and/or as a material of solar cells, such as photovoltaic solar cells. The invention further relates to the use of a HOF of the invention as a semiconductor in known semiconductor applications and printed electronics. All features disclosed herein in the context of the HOFs of the invention also relate to and are herewith also disclosed in the context of the uses of the HOFs as well as the products comprising the HOFs and applications of the HOFs described herein.

The HOFs of the present invention are advantageous in comparison to known HOFs, since they are semi-conductive, which enables the use of the HOFs of the invention in many semi-conductive applications. Semi-conductivity is enabled by the formation of three-dimensional HOFs comprising multiple layers of two-dimensional sheets that are stacked onto each other. This enables the formation of HOMO/LUMO interactions between the neighboring stacked sheets, leading to semi-conductive properties of the HOFs of the invention formed by stacked two-dimensional sheets. This phenomenon of the HOFs of the invention is explained in more detail in the examples of the invention. However, based on the examples it is evident to a skilled person that the HOFs of the invention surprisingly show previously undescribed semi-conductive properties.

Furthermore, the HOFs of the invention are particularly advantageous since their properties and shapes, for example the shape and geometry of their pores, can be flexible influence by choice of the organic linkers and their organic cores, resulting in differently shaped voids/pores of the HOFs.

Proton-conductivity is a property of HOFs that is enabled by the hydrogen-bonded network formed between the organic linkers by means of their functional groups.

As understood herein, a hydrogen-bonded network is a continuous connection of multiple functional groups through the formation of a chain of hydrogen bonds. Therein, the functional groups may form one, two or three hydrogen bonds with each other, depending on the specific composition of organic linkers and the comprised functional groups of the respective HOF. The hydrogen-bonded network may be formed by continuous (linear) chains of functional groups aligned via hydrogen bonds. Furthermore, a hydrogen-bonded network can also be formed by continuous sheets of functional groups aligned via hydrogen-bonds that extend in two-dimensions, for example within of a planar sheet formed by the organic linkers of the invention. Furthermore, a two-dimensional hydrogen bonded network can also be formed by a linear chain of hydrogen bonds between functional groups of organic linkers within a sheet, and a second chain of hydrogen bonds between functional groups of organic linkers in neighboring sheets of the stack of sheets. Accordingly, in embodiments the hydrogen-bonded network can spread between multiple sheets formed by the organic linkers that are stacked onto each other and that may be connected by hydrogen-bonds between functional groups of organic linkers comprised by different sheets. In embodiments, the hydrogen-bonded network can be three-dimensional extending in two dimensions within a sheet and in a third dimension across neighboring stacked sheets.

The porosity of the HOFs of the invention is an important advantage for example for applications of the HOFs as electrode material, for example in the context of a supercapacitor, since porous HOFs provide the high surface to mass ratios as well as excellent conductivity, which makes them a preferred electrode material for use in supercapacitor applications.

In embodiments of the invention, the HOFs have a surface to mass ratio of more than 7000 $m^2/g$. However, due to their good conductivity the HOFs or the present invention are also suitable for multiple applications with lower surface to mass ratios. In embodiments of the invention, the HOFs have the surface to mass ratio of more than 50, 75, 100, 125, 150, 175, 200, 225, 250, 275, 300, 325, 350, 375, 400, 425, 450, 475, 500, 550, 600, 650, 700, 750, 800, 850, 900, 950, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900 or 8000 $m^2/g$.

In preferred embodiments, the HOFs have a surface to mass ratio of about 2400 $m^2/g$.

Importantly, HOFs with smaller surface areas can be advantageous, since they often display increased stability and durability while still providing good conductivity and capacitance.

The required functional groups of the organic linkers that form for example porous arsonates can be synthesized using precursor p-di-methylarsonato-phenylboronic acid. Furthermore, in embodiments such organic arsonate-linkers can be synthesized using the methods described by Bart and Scheller. Suzuki Cross Coupling reaction could also be used to produce extended tether lengths of the arylphosphonic acid and arylarsonic acid linkers. [*Synthesis of Some Di- and Tetraphosphonic Acids by Suzuki Cross-Coupling*, A. Schütrumph, A. Duthie, E. Lork, G. Yücesan and J. Beckmann, *Z. Allgem. Anorg. Chem.*, 2018, 644 (19), 1134-1142; *Substituted phenylarsonic acids, structures and spectroscopy*, N. C. Lloyd, H. W. Morgan, B. K. Nicholson, R. S. Ronimus, Journal of Organometallic Chemistry, 2008, 693, 2443-2450; *The Preparation of Aromatic Arsonic and Arsinic Acids by the Bart, Bechamp, and Rosenmund Reactions*, C. S. Hamilton, J. F. Morgan, In *Organic Reactions*; John Wiley & Sons, Inc., 2004; pages 415-454].

In embodiments of the invention, the organic linker comprise organic cores (also termed geometrical cores in the context of the present invention), which are highly conjugated aromatic linkers such as with naphthalene, anthracene, pyrene cores or with aromatic organic cores.

It is a further important advantage of the HOFs of the invention that they are thermally stable, for example even under relative humidity of around 90% or more, which enables the multiple different applications disclosed herein. In embodiments, the HOFs of the invention are stable above 80° C., 100° C., 150, 180, 210, 240, 270, 300, 330, 360, 390 and/or 400° C.

In embodiments of the invention, the functional groups of at least one kind of organic linkers comprise one or more atoms selected from selected from group 14, 15 and 16 elements. In embodiments, the functional groups comprise one or more atoms selected from selected from group 14, 15 and 16 elements.

In embodiments, functional groups of the organic linkers comprise atoms selected from the group comprising carbon (C), phosphorus (P), arsenic (As), antimony (Sb), silicon (Si) and bismuth (Bi), and nitrogen (N). In embodiments of the invention, the functional groups of the organic linkers comprise one or more atoms selected from the group comprising phosphorus (P), arsenic (As), antimony (Sb), silicon (Si), carbon and bismuth (Bi), and nitrogen (N). Particularly preferred are embodiments, wherein the functional groups of the organic linkers comprise phosphorus and arsenic. In embodiments, the HOFs can have organic linkers with more than one functional group, for example a functional group comprising a C and a functional group comprising P, such as for example carboxylic acid and a phosphonic acid functional groups.

In embodiments, the central atom of the functional group is selected from the group comprising phosphorus (P), arsenic (As), antimony (Sb), silicon (Si), selenium (Se) and bismuth (Bi).

Phosphorus and arsenic possess d orbitals and they have electrical conductivities $1\times10^7$ S/m and $3.3\times10^6$ S/m, respectively, which are comparable to transition metal Ions and way higher than the carbon in carboxylate and the nitrogen in nitrogen containing organic linkers. Accordingly, HOFs comprising organic linkers with functional groups comprising atoms of these elements are particularly advantageous for semi-conductive applications of the HOFs of the invention. Similarly, antimony has $2.5\times10^6$ S/m, silicon has $1\times10^3$ S/m, bismuth has $7.7\times10^5$ S/m conductivities. Therefore, the preferred elements could make better conducting HOFs.

In further embodiments, the functional group of the organic linker is selected from the group comprising phosphonic acid, phosphinic acid, arsonic acids, arsinic acids, phosphonate, arsonate and/or esters thereof comprising at least one hydroxyl group.

In embodiments of the invention, the organic linkers comprise aromatic phosphonic acids and aromatic arsonic acids, as shown in the following Tables 1 and 2. In embodiments, the HOFs of the invention comprise or consist of one or more of the organic linkers as listed in Tables 1 and 2.

In the structural formulas of Tables 1 and 2, R' can be a $PO_3H_2$, $AsO_3H_2$, H, F, Cl, Br, I, $NO_2$ or alkyl groups. In embodiments, all R' of a structural formula listed in Tables 1 or 2 are H.

TABLE 1

Preferred non-limiting examples of aromatic phosphonic acids that can be used as organic linkers of the HOFs of the invention. R' can be, $PO_3H_2$, $AsO_3H_2$, H, F, Cl, Br, I, $NO_2$ and/or alkyl.

| Structural formula of aromatic phosphonic acid | Formula No. |
| --- | --- |
| 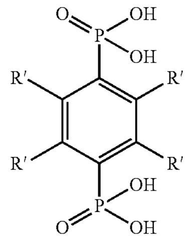 | Formula No. 1 1,4-benzenediphosphonic acid |
| 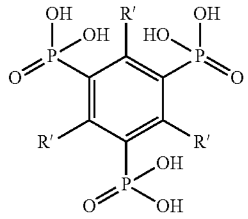 | Formula No. 2 1,3,5-benzenetriphosphonic acid |
| 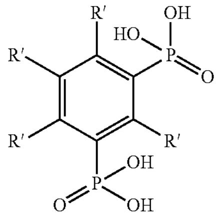 | Formula No. 3 1,3-benzenediphosphonic acid |
| 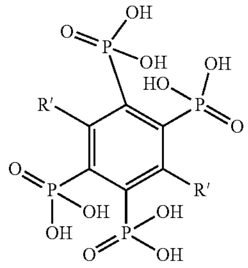 | Formula No. 4 1,2,4,5-benzenetetraphosphonic acid |
| 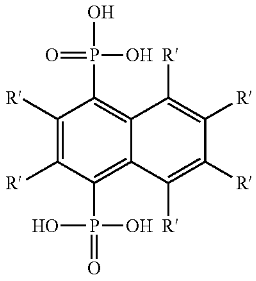 | Formula No. 5 1,4-naphthalenediphosphonic acid |
| 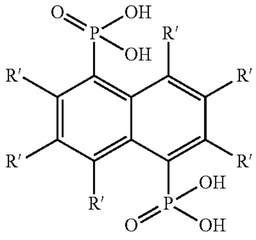 | Formula No. 6 1,5-naphthalenediphosphonic acid |

TABLE 1-continued

Preferred non-limiting examples of aromatic phosphonic acids that can be used as organic linkers of the HOFs of the invention. R' can be, $PO_3H_2$, $AsO_3H_2$, H, F, Cl, Br, I, $NO_2$ and/or alkyl.

| Structural formula of aromatic phosphonic acid | Formula No. |
|---|---|
| 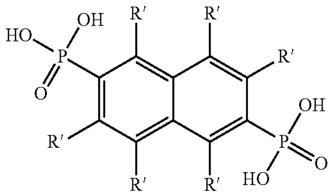 | Formula No. 7<br>2,6-napthalenediphosphonic acid |
| 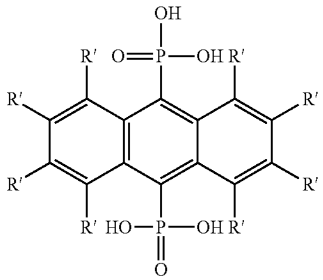 | Formula No. 8<br>9,10-anthracenediphosphonic acid |
| 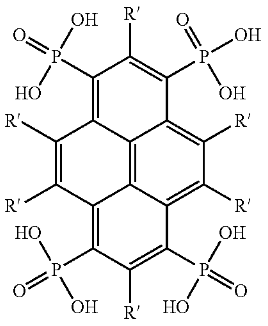 | Formula No. 9<br>1,3,6,8-pyrenetetraphosphonic acid |
| 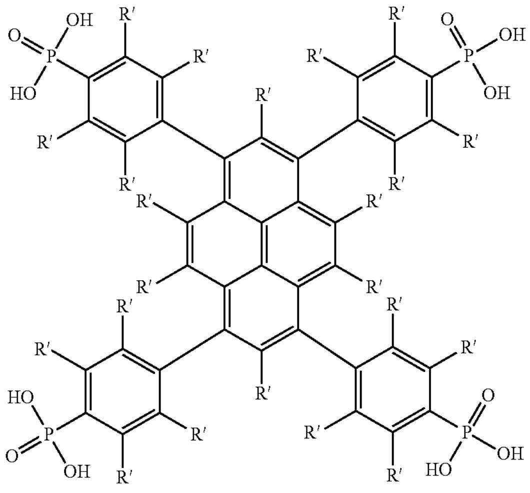 | Formula No. 10<br>pyrene-1,3,6,8-tetrakis-p-phenylphosphonic acid |

TABLE 1-continued
| Preferred non-limiting examples of aromatic phosphonic acids that can be used as organic linkers of the HOFs of the invention. R' can be, $PO_3H_2$, $AsO_3H_2$, H, F, Cl, Br, I, $NO_2$ and/or alkyl. | |
|---|---|
| Structural formula of aromatic phosphonic acid | Formula No. |
| 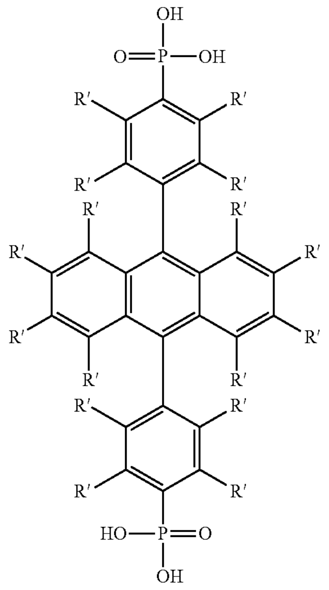 | Formula No. 11 anthracene-9,10-bis-p-phenylphosphonic acid |
| 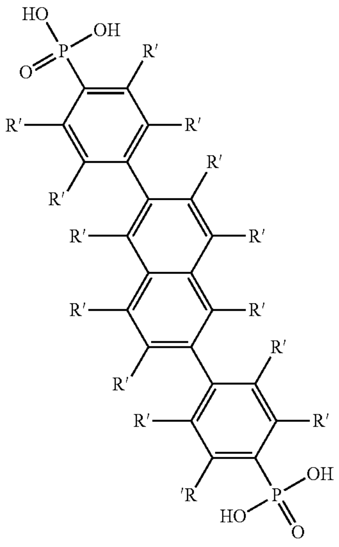 | Formula No. 12 naphthale-2,6-bis-p-phenylphosphonic acid |

TABLE 1-continued
| Preferred non-limiting examples of aromatic phosphonic acids that can be used as organic linkers of the HOFs of the invention. R' can be, $PO_3H_2$, $AsO_3H_2$, H, F, Cl, Br, I, $NO_2$ and/or alkyl. | |
|---|---|
| Structural formula of aromatic phosphonic acid | Formula No. |
| 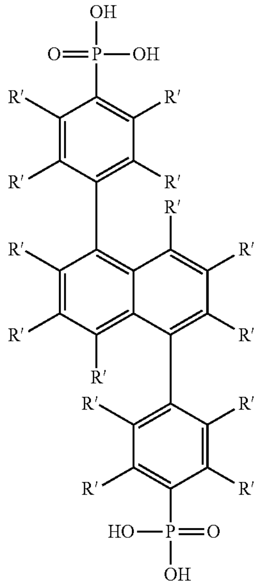 | Formula No. 13 naphthale-1,5-bis-p-phenylphosphonic acid |
| 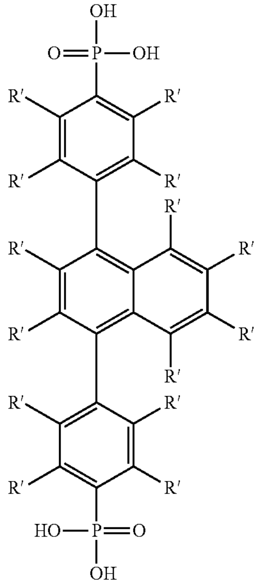 | Formula No. 14 naphthale-1,4-bis-p-phenylphosphonic acid |

TABLE 1-continued

| Preferred non-limiting examples of aromatic phosphonic acids that can be used as organic linkers of the HOFs of the invention. R' can be, $PO_3H_2$, $AsO_3H_2$, H, F, Cl, Br, I, $NO_2$ and/or alkyl. | |
|---|---|
| Structural formula of aromatic phosphonic acid | Formula No. |
| 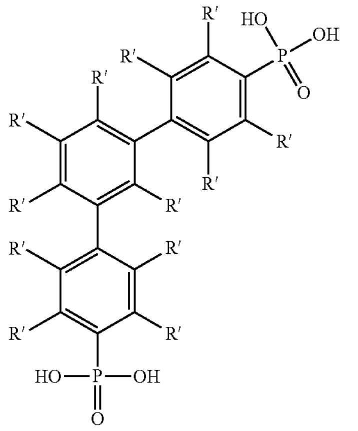 | Formula No. 15 benzene-1,3-bis-p-phenylphosphonic acid |
| 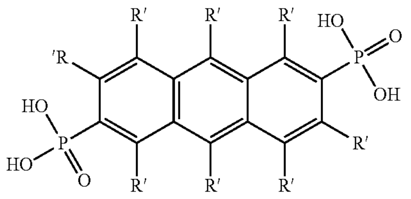 | Formula No. 16 P,P'-2,6-anthracenediylbisphosphonic acid |
| 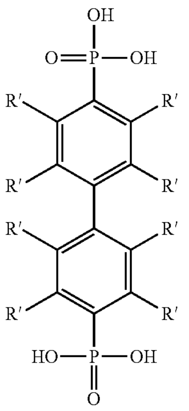 | Formula No. 17 4,4'-biphenyldiphosphonic acid |

TABLE 1-continued
| Preferred non-limiting examples of aromatic phosphonic acids that can be used as organic linkers of the HOFs of the invention. R' can be, $PO_3H_2$, $AsO_3H_2$, H, F, Cl, Br, I, $NO_2$ and/or alkyl. | |
|---|---|
| Structural formula of aromatic phosphonic acid | Formula No. |
| 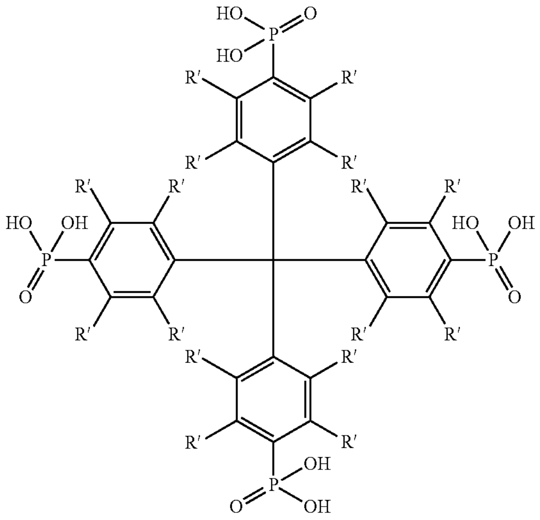 | Formula No. 18 Methane tetra-p-phenylphosphonic acid |
| 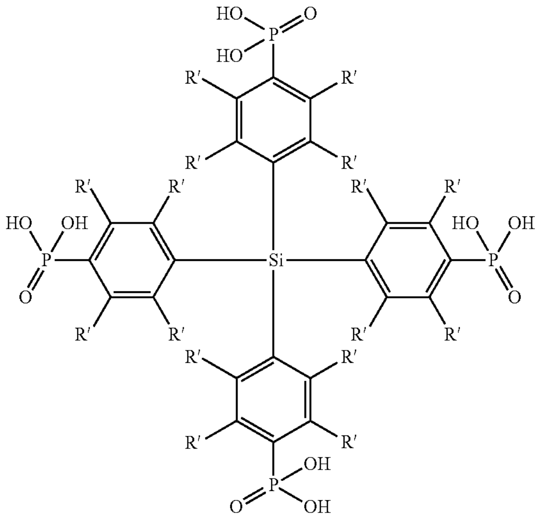 | Formula No. 19 Silane tetra-p-phenyphosphonic acid |

TABLE 1-continued

| Preferred non-limiting examples of aromatic phosphonic acids that can be used as organic linkers of the HOFs of the invention. R' can be, $PO_3H_2$, $AsO_3H_2$, H, F, Cl, Br, I, $NO_2$ and/or alkyl. | |
|---|---|
| Structural formula of aromatic phosphonic acid | Formula No. |
| 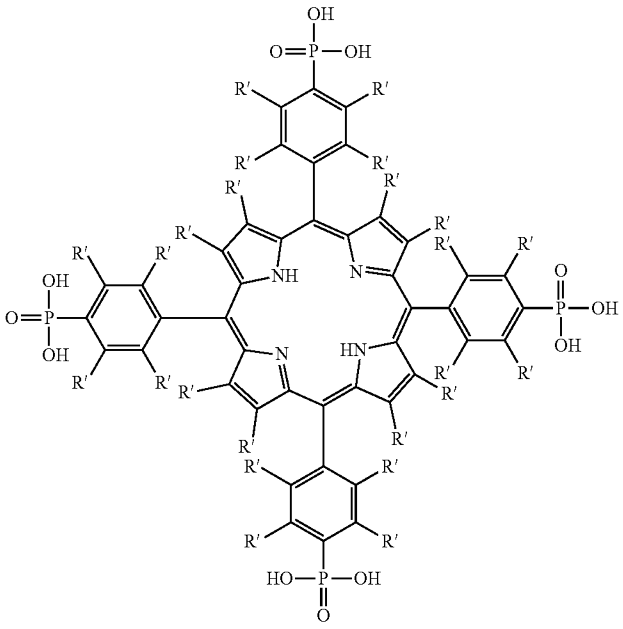 | Formula No. 20 5,10,15,20-tetrakis[p-phenylphosphonic acid] porphyrin |
| 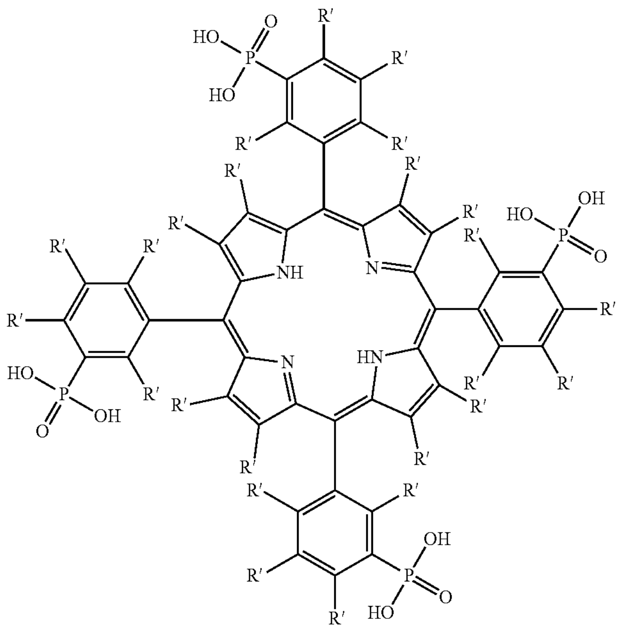 | Formula No. 21 5,10,15,20-tetrakis[m-phenylphosphonic acid] porphyrin |

TABLE 1-continued

| Preferred non-limiting examples of aromatic phosphonic acids that can be used as organic linkers of the HOFs of the invention. R' can be, $PO_3H_2$, $AsO_3H_2$, H, F, Cl, Br, I, $NO_2$ and/or alkyl. | |
|---|---|
| Structural formula of aromatic phosphonic acid | Formula No. |
| 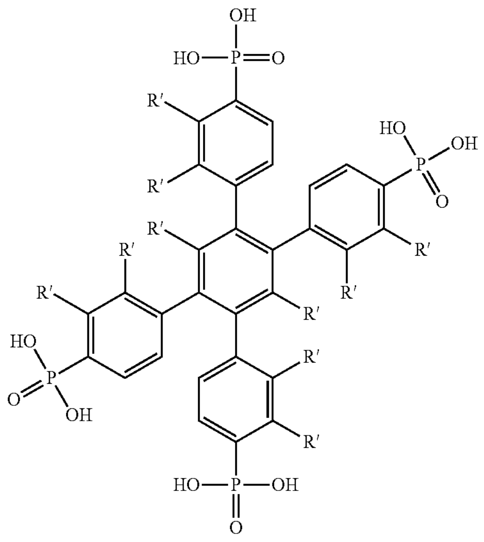 | Formula No. 22<br>1,2,4,5-tetrakis-p-phenylphosphonic acid<br>R' facing inside the phenyl rings are omitted due to the limited space |

TABLE 2

| Preferred non-limiting examples of aromatic arsonic acids that can be used as organic linkers of the HOFs of the invention. R' can be H, F, Cl, Br, I, $NO_2$ and/or alkyl. | |
|---|---|
| Structure of aromatic arsonic acid | Formula No. |
| 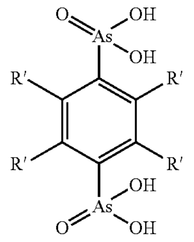 | Formula No. 23<br>1,4-benzenediarsonic acid |
| 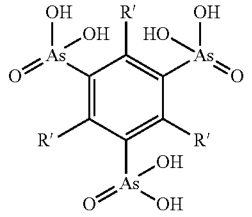 | Formula No. 24<br>1,3,5-bezenetriarsonic acid |
| 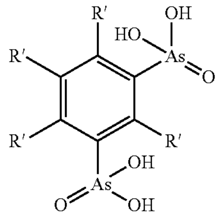 | Formula No. 25<br>1,3-benzenediarsonic acid |

TABLE 2-continued

| Preferred non-limiting examples of aromatic arsonic acids that can be used as organic linkers of the HOFs of the invention. R' can be H, F, Cl, Br, I, $NO_2$ and/or alkyl. | |
|---|---|
| Structure of aromatic arsonic acid | Formula No. |
| 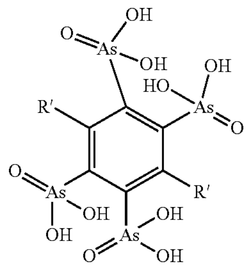 | Formula No. 26 1,2,4,5-benzenetetraarsonic acid |
| 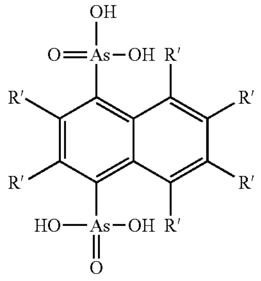 | Formula No. 27 1,4-naphthalenediarsonic acid |
| 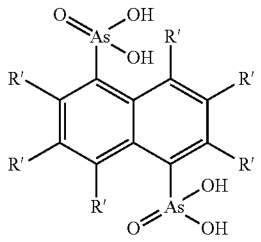 | Formula No. 28 1,5-naphthalenediarsonic acid |
| 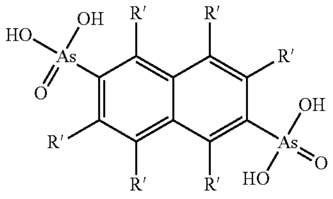 | Formula No. 29 2,6-naphthalenediarsonic acid |
| 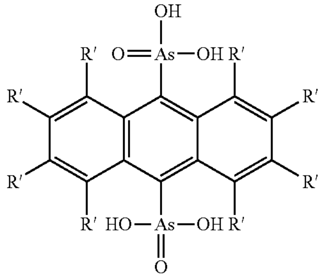 | Formula No. 30 9,10-anthracenediarsonic acid |

TABLE 2-continued
| Preferred non-limiting examples of aromatic arsonic acids that can be used as organic linkers of the HOFs of the invention. R' can be H, F, Cl, Br, I, $NO_2$ and/or alkyl. | |
|---|---|
| Structure of aromatic arsonic acid | Formula No. |
| 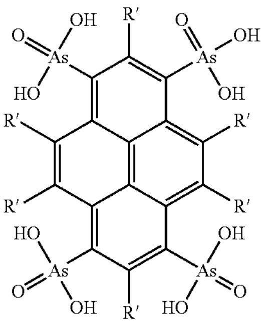 | Formula No. 31 1,3,6,8-pyrenetetraarsonic acid |
| 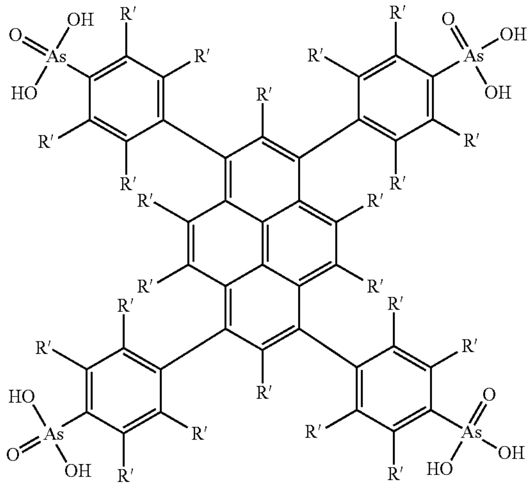 | Formula No. 32 pyrene-1,3,6,8-tetrakis-p-phenylarsonic acid |
| 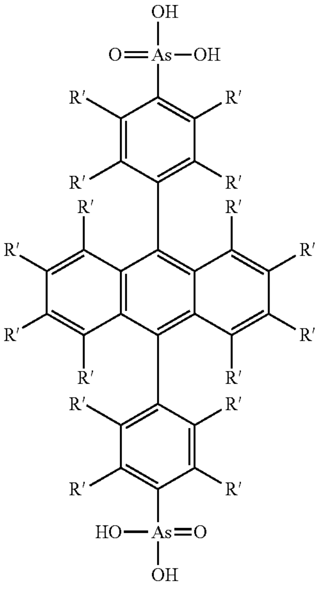 | Formula No. 33 anthracene-9,10-bis-p-phenylarsonic acid |

TABLE 2-continued
| Preferred non-limiting examples of aromatic arsonic acids that can be used as organic linkers of the HOFs of the invention. R' can be H, F, Cl, Br, I, $NO_2$ and/or alkyl. | |
|---|---|
| Structure of aromatic arsonic acid | Formula No. |
| 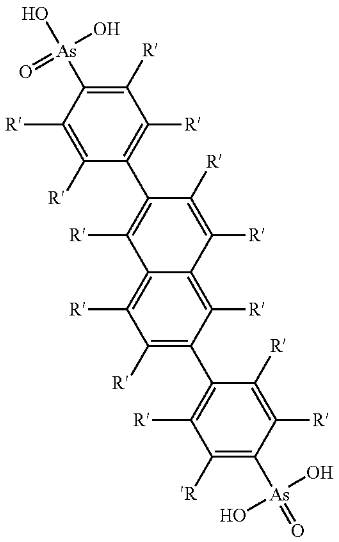 | Formula No. 34 naphthale-2,6-bis-p-phenylarsonic acid |
| 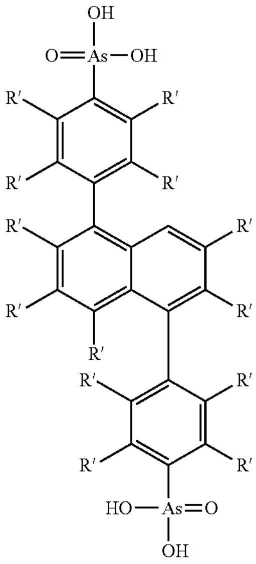 | Formula No. 35 naphthale-1,5-bis-p-phenylarsonic acid |

TABLE 2-continued

| Preferred non-limiting examples of aromatic arsonic acids that can be used as organic linkers of the HOFs of the invention. R' can be H, F, Cl, Br, I, $NO_2$ and/or alkyl. | |
|---|---|
| Structure of aromatic arsonic acid | Formula No. |
| 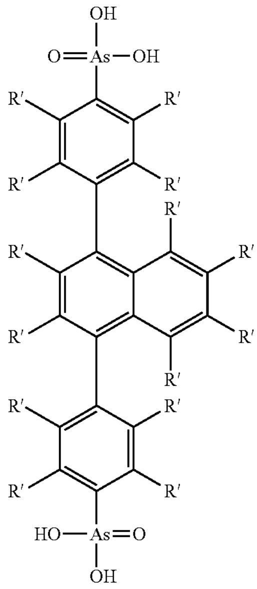 | Formula No. 36 naphthale-1,4-bis-p-phenylarsonic acid |
| 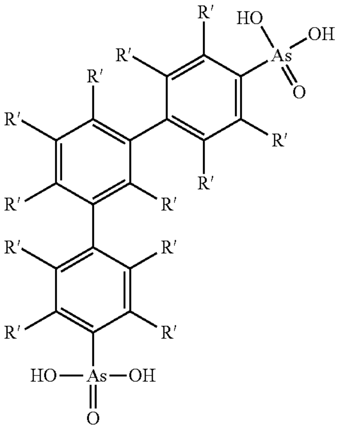 | Formula No. 37 benzene-1,3-bis-p-phenylarsonic acid |
| 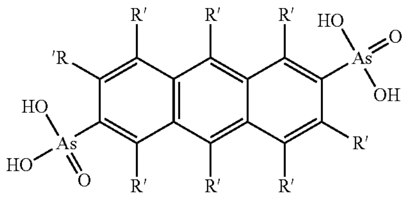 | Formula No. 38 P,P'-2,6-anthracenediylbisarsonic acid |

TABLE 2-continued
| Preferred non-limiting examples of aromatic arsonic acids that can be used as organic linkers of the HOFs of the invention. R' can be H, F, Cl, Br, I, $NO_2$ and/or alkyl. | |
|---|---|
| Structure of aromatic arsonic acid | Formula No. |
| 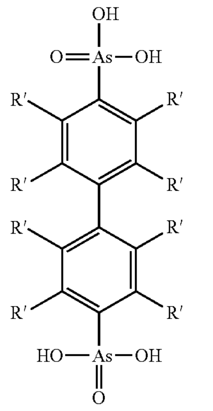 | Formula No. 39 4,4'-biphenyldiarsonic acid |
| 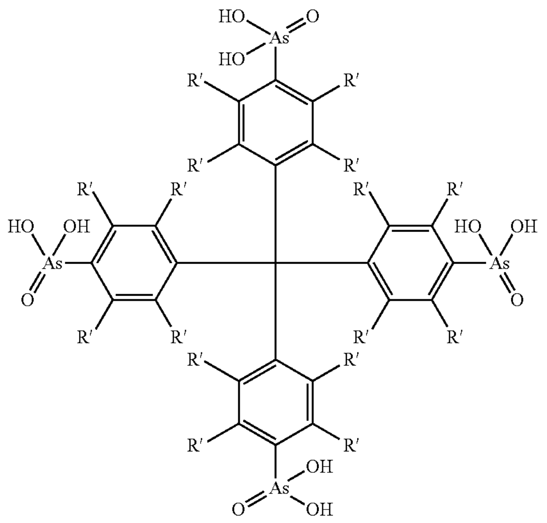 | Formula No. 40 Methane tetra-p-phenylarsonic acid |
| 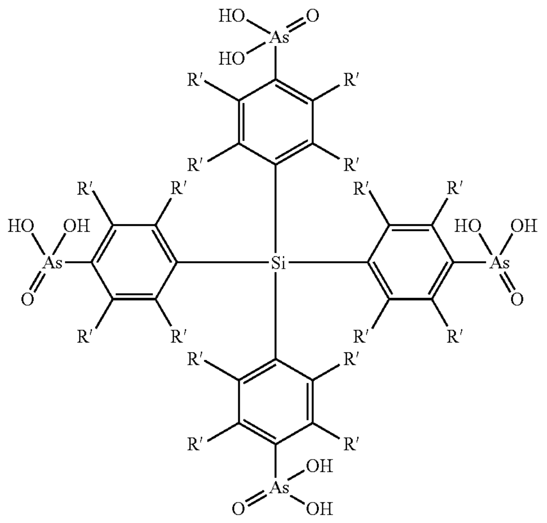 | Formula No. 41 Silane tetra-p-phenylarsonic acid |

TABLE 2-continued
| Preferred non-limiting examples of aromatic arsonic acids that can be used as organic linkers of the HOFs of the invention. R' can be H, F, Cl, Br, I, $NO_2$ and/or alkyl. | |
|---|---|
| Structure of aromatic arsonic acid | Formula No. |
| 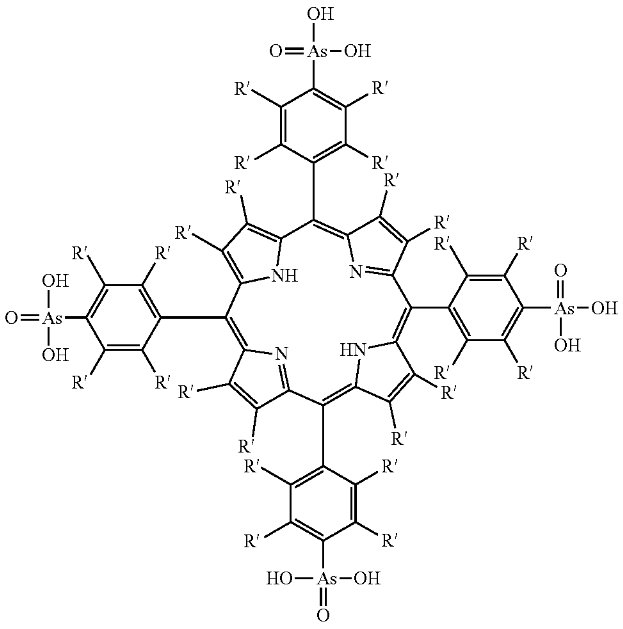 | Formula No. 42 5,10,15,20-tetrakis[p-phenylarsonic acid] porphyrin |
| 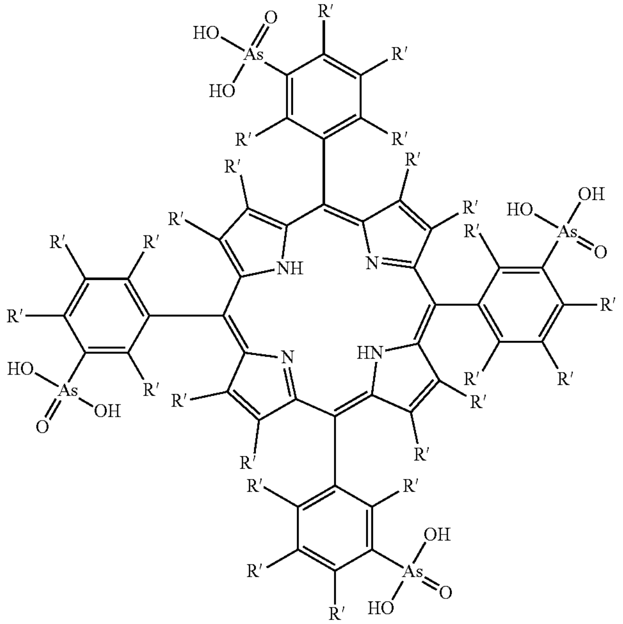 | Formula No. 43 5,10,15,20-tetrakis[m-phenylarsonic acid] porphyrin |

TABLE 2-continued

Preferred non-limiting examples of aromatic arsonic acids that can be used as organic linkers of the HOFs of the invention. R' can be H, F, Cl, Br, I, $NO_2$ and/or alkyl.

| Structure of aromatic arsonic acid | Formula No. |
|---|---|
| 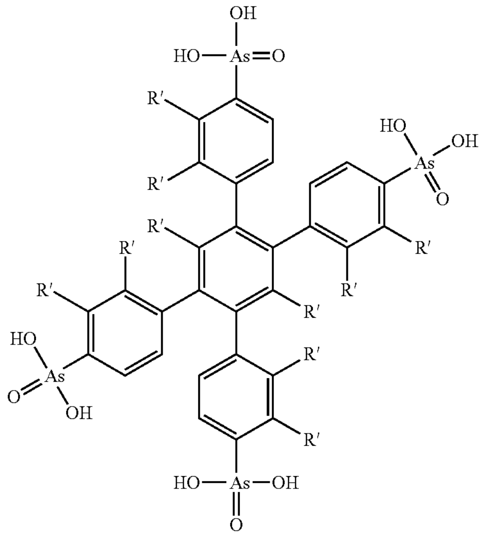 | Formula No. 44 1,2,4,5-tetrakis-p-phenylarsonic acid R' facing inside the phenyl rings omitted due to the limited space |

It is a great advantage of the invention that it is possible to design suitable geometries of void channels or pores for the HOF that are advantageous for the respective application of the HOF. By choosing suitable organic linkers with specific organic cores and functional groups in a certain position on the cores, it can be predicted or estimated how the organic linkers will assemble and what kind of void structures will be comprised by the respective HOF formed by the selected organic linkers.

In the context of the invention, organic linkers may also be referred to as organic ligands or bridging ligands or struts. Organic linkers assemble into HOFs through the formation of hydrogen bonds in form of hydrogen bonded networks and optionally also hydrogen bonded clusters between the functional groups of the organic linkers.

In another embodiment, the functional groups of the organic linkers comprise arsonate and are synthetized using p-dimethylarsenato-phenylboronic acid, m-dimethylarsenato-phenylboronic acid and/or o-dimethylarsenato-phenylboronic acid. They can be also synthesized using Bart and Scheller reactions.

The use of functional groups of organic linkers bearing the P and As atoms and the HOFs constructed using such linkers, and the use of such HOFs for example as electrode material for construction EDLCs and supercapacitors are advantageous, since such HOFs surprisingly provide better electrical conductivities, larger and even adjustable surface areas.

Phosphonate and arsonate HOFs have higher thermal decomposition rates and excellent chemical stability among the known HOFs and they are resistant to humidity and corrosion.

In embodiments, the organic linker comprises a V-shaped, L-shaped, T-shaped, X-shaped, X-shaped tetrahedral, Y-shaped, star-shaped, linear or hexagonal geometrical core enabling the formation of void channels.

The shape of the geometrical cores of the organic linkers and the positioning of the functional groups on the organic cores are an important factor determining the geometry of the resulting HOF. In particular, the shape and size of the void channels and therefore also the surface to mass ratio of the HOFs can be modified or determined by selecting suitable geometrical cores of a specific shape.

For example, V or Y shaped geometrical cores can be chosen for generating microporosity in the HOFs of the invention, and the preferred V or Y shaped linkers are not mixed linker types. In the state of the art, for example in Song-Song et al. (COORDINATION CHEMISTRY REVIEWS, vol. 378, pages 577-594, XP085527253) it is not disclosed that V or Y shaped linkers can be used to generate microporosity of a hydrogen bonded framework. Importantly, the MOFs disclosed by Song-Song et al. and the HOFs of the present invention are totally different compound families and a skilled person would not use MOFs to deduct information about potential properties of HOFs.

Importantly, the mixed linker in Li-HPA disclosed by Song-Song et al. is indeed a sp3 cored tetrahedral linker with a methane core in Li-HPA, which therefore anyway cannot be considered a V or Y shaped linker, since it is not even close to V or Y shaped geometry (flexible rotation, many conformations). Furthermore, Colodrero et al. ("Structural variability in $M^{2+}$2-hydroxy-phosphonoacetate moderate proton conductors", PURE & APPLIED CHEMISTRY, vol. 89, no. 1, 1 Jan. 2017, pages 75-87) discloses metal coordination polymers constructed using mix linkers (acetic acid, phosphonic acid containing molecules), which is a totally different compound family in comparison to the HOFs of the invention. There is no connection between the compounds disclosed therein and the totally new family of microporous hydrogen bonded organic frameworks of the invention that have no metal ion at all and that are not coordination polymers.

Further embodiments of the invention, the organic linkers of the HOFs comprise geometrical cores that can be any of linear shaped, V-shaped, L-shaped, T-shaped, X-shaped, X-shaped tetrahedral, Y-shaped, tetragonal or hexagonal. Linkers can comprise aromatic structures, polyaromatic structures, and conjugated structures such as benzene, biphenyl, triphenyl, naphthalene, anthracene, pyrene, phthalocyanine, porphyrin cores. Linkers can also comprise methane, silane and adamantine cores etc. Examples of such linkers are displayed in FIG. 22. Preferred examples include, without limitation, 1,4-benzenediphosphonic acid, 1,4-naphthalenediphosphonic acid, 1,5-naphthalenediphosphonic acid, 1,4-phenyldiphosphonic acid, methane tetra-p-phenylphosphonic acid, silane tetra-p-phenylphosphonic acid, 5,10,15,20-Tetrakis[p-phenylphosphonic acid] porphyrin, methane tetra-m-phenylphosphonic acid, silane tetra-m-phenylphosphonic acid, 5,10,15,20-Tetrakis[m-phenylphosphonic acid] porphyrin, 1,2,4,5-tetrakis(p-phosphonatophenyl)benzene, tetrabiphenylsilane tetrakis-4-phosphonic acid, 1,3,6,8-tetrakis(p-phosphonatophenyl)pyrene, 4,4'-bis(p-phosphonatophenyl)biphenyl, 9,10-bis(p-phosphonatophenyl)anthracene etc.

In some embodiments, more than one type of organic linkers may be employed, for example, a first kind/type of organic linker and a second kind/type of organic linker. The two or more types of organic linkers may be provided in any suitable ratio. The two or more types of organic linkers may be provided in any suitable ratio.

In embodiments of the invention, the HOFs are free of metal atoms.

In certain embodiments, the at least one organic linker comprises porphyrin or phthalocyanine as a geometrical core, wherein the geometrical core preferably comprises a bound metal, such as iron (Fe), palladium (Pd), zinc (Zn), copper (Cu), nickel (Ni), or a transition metal. It is an advantage of HOFs of the invention comprising organic linkers that comprise porphyrin or phthalocyanine that it is possible to incorporate metal atoms that form a complex with the porphyrin or phthalocyanine ring structures. Through complexation with the metal it is possible to modify the band gap and the semi-conductive properties of the HOFs. Accordingly, the such properties of the HOFs can be adjusted to the respective application by including specific metals complexed to the organic cores comprising porphyrin and phthalocyanine.

In embodiments of the invention, the hydrogen-bonded network of the functional groups of the organic linkers forms one-dimensional hydrogen-bonded chains and/or two-dimensional hydrogen-bonded sheets, and wherein the functional groups optionally form isolated hydrogen bonded clusters, wherein the one-dimensional hydrogen-bonded chains and/or the two-dimensional hydrogen-bonded sheets and optionally the isolated hydrogen bonded clusters assemble organic linkers to form one-dimensional, two-dimensional, and three-dimensional HOFs.

Accordingly, in embodiments the hydrogen-bonded network comprises or consists of one-dimensional hydrogen-bonded chains.

In further embodiments, the hydrogen-bonded network comprises two kinds of hydrogen-bonded chains that cross each other, wherein the two kinds of hydrogen-bonded chains can be both located within one sheet of the HOF or wherein one kind of hydrogen-bonded chain extends within a sheet and the other kind of hydrogen-bonded chain extends between neighboring sheets.

Additionally, three-dimensional hydrogen-bonded networks can be comprised by a HOF of the invention, comprising a two-dimensional network of hydrogen bonds within a sheet formed by organic linkers and a third chain of hydrogen bonds extending between such sheets that are stacked onto each other.

In embodiments, the organic linkers are connected via isolated hydrogen bonded clusters of functional groups, or one-dimensional hydrogen-bonded chains of functional groups or two-dimensional hydrogen-bonded sheets, wherein isolated hydrogen bonded clusters of functional groups, one-dimensional hydrogen-bonded chains and the two-dimensional hydrogen-bonded sheets of functional groups assemble organic linkers to form one-dimensional, two-dimensional, and three-dimensional HOFs.

Furthermore, in embodiments the HOFs of the invention can comprise in addition to a hydrogen-bonded network isolated hydrogen bonded clusters. As used herein, the term "isolated hydrogen bonded cluster" relates to functional groups of organic linkers that form hydrogen bonds with each other within the HOF of the invention, which are not directly continuously connected to further functional groups. Accordingly, such clusters are not integrated into a continuous hydrogen-bonded network within the HOF. However, such hydrogen-bonded clusters can contribute to the stability and electrical properties of the respective HOF and a skilled person in view of the present invention and the examples disclosed herein is able to design HOFs with specific advantageous properties for a respective application involving the incorporation of hydrogen-bonded clusters into the HOF.

In embodiments, the organic linkers are connected via isolated hydrogen bonded clusters.

In embodiments, the organic linkers are connected via isolated hydrogen bonded clusters, or one-dimensional hydrogen-bonded chains or two-dimensional hydrogen-bonded sheets, wherein isolated hydrogen bonded clusters, one-dimensional hydrogen-bonded chains and the two-dimensional hydrogen-bonded sheets assemble organic linkers to form one-dimensional, two-dimensional, and three-dimensional HOFs.

In embodiments, the organic linkers form two-dimensional hydrogen-bonded sheets, wherein the sheets assemble in multiple layers forming a three-dimensional HOF. In further embodiments, the continuous hydrogen-bonded network between functional groups of the organic linkers extends in the two-dimensional hydrogen-bonded sheets and/or between the layers of the three-dimensional HOF.

The HOF according to any of the preceding claims, wherein the HOF comprises or is composed of two kinds of organic linkers, wherein preferably both kinds of organic linkers comprise identical functional groups, preferably a phosphonic acid or an arsonic acid. It is a particular advantage of the HOFs of the invention that they can be designed by assembling two or more kinds of organic linkers in a HOF. This possibility increases the design options and possibilities to adjust the properties such as stability, proton-conductivity, semi-conductivity and porosity to the required or envisioned application of the respective HOF.

In a specific embodiment of the invention, one kind of organic linker is phenylphosphonic acid.

In a further specific embodiments, one kind of organic linker is 5,10,15,20-tetrakis[p-phenylphosphonic acid] porphyrin ($H_8$-TPPA).

Further linkers that can be used in the context of the invention comprise the organic linkers of Tables 1 and 2.

In particular embodiments, a HOF of the invention consists of $H_8$-TPPA and optionally phenylphosphonic acid. In embodiments, a HOF of the invention consists of $H_8$-TPPA. In embodiments, a HOF of the invention consists of $H_8$-TPPA and phenylphosphonic acid.

In embodiments, functional groups of the organic linkers form one, two and/or three hydrogen bonds with each other.

In embodiments, the one or more kind of functional groups of the organic linkers form different kind of hydrogen-bonded connections with each other. For example, while a fraction of the functional groups located in a specific position of the HOF form one hydrogen bond with the neighboring functional group, functional groups of the organic linkers in a different position may form two or three hydrogen bonds with the neighboring functional group of a neighboring organic linkers. For example, the HOF consisting of $H_8$-TPPA and phenylphosphonic acid (PPA) as shown in the examples below comprises functional phosphonic acid (PA) groups of $H_8$-TPPA that form two hydrogen bonds with a neighboring PA group of a neighboring H8-TPPA and one hydrogen bond with a neighboring PA group of a PPA within a 2D-sheet of a HOF consisting of PPA and $H_8$-TPPA. Accordingly, a skilled person is able to design HOFs according to the present invention comprising one or more kind of organic linkers with one or more kinds of functional groups that form different kinds of hydrogen-bonded connections between each other.

Further preferred HOFs of the invention are disclosed in the example section.

In embodiments of the HOFs of the invention, polar protic solvents, such as water, ethanol, methanol, form hydrogen bonded interactions with the HOF structure and contribute to the hydrogen bonded-framework structure as a building unit.

In some embodiments, the band gap of the HOF of the invention may be varied, e.g., by changing the substituents about the organic linker/ligand core or extending the tether lengths of the linkers. Those of ordinary skill in the art will be aware of methods to determine the band gap of a material, for example, optically or through analytical techniques such as UV/Vis spectroscopy, diffuse reflectance spectroscopy, Tauc plotting.

In embodiments of the invention, the HOF has a band gap of between about ~0 eV and about ~4.0 eV. In further embodiments, the band gap of the HOF is in the range of about 0.1-3.9, 0.1-3.8, 0.1-3.7, 0.1-3.6, 0.1-3.5, 0.1-3.4, 0.2-3.3, 0.3-3.2, 0.3-3.1, 0.4-3.0, 0.5-2.9, 0.6-2.8, 0.7-2.7, 0.8-2.6, 0.9-2.5, 1.0-2.4, 1.1-2.3, 1.2-2.2, 1.3-2.1, 1.4-2.0, 1.5-1.9, 1.6-1.8 or about 1.7 eV. Other ranges are possible. A compound with a band gap above 4.0 is considered in insulator.

In a preferred embodiment, a HOF of the invention has a band gap of about 1.4 to 1.7 eV, such as 1.56 eV. The band gap of a HOF can be determined by UV/Vis spectroscopy, diffuse reflectance spectroscopy, Tauc plotting or other methods are known to a skilled person.

As the molecular building blocks of the HOFs of the invention, such as the organic cores and the functional groups of the one or more kinds of organic linkers, can be changed by synthetic manipulations, the MOFs described herein have variable electrical conductivity that can be tuned to be suitable for one or more of the applications described herein. Those of ordinary skill in the art will be aware of methods to determine the conductivity of a HOF. For example, the electrical conductivity of a HOF may be measured in polycrystalline pellet form and/or in polycrystalline film form. In some cases, a pellet of a HOF may be compressed between two steel rods and subjected to a two-probe direct current measurement.

Preferably, the HOFs of the invention have a high conductivity. Preferably, the HOFs of the invention have conductivity of at least 1 S/cm. However, a HOF of the invention can also have a conductivity between the semiconductivity range of $10^{-10}$ and $10^{2}$ S/cm.

In some embodiments of the present invention, the conductivity of a HOF, for example HOF in pellet form or HOF in film having an average thickness of about 500 nm, is at least about 0.1 S/cm, or at least about 0.2 S/cm, or at least about 0.3 S/cm, or at least about 0.4 S/cm, or at least about 0.5 S/cm, or at least about 0.6 S/cm, or at least about 0.8 S/cm, or at least about 1.0 S/cm, or at least about 1.2 S/cm, or at least about 1.5 S/cm, or at least about 1.8 S/cm, or at least about 2 S/cm, or at least about 2.5 S/cm, or at least about 5 S/cm, or at least about 7.5 S/cm, or at least about 10 S/cm, or at least about 12.5 S/cm, or at least about 15 S/cm, or at least about 17.5 S/cm, or at least about 20 S/cm, or at least about 22.5 S/cm, or at least about 25 S/cm, or at least about 30 S/cm, or at least about 35 S/cm, or at least about 40 S/cm, or at least about 45 S/cm, or at least about 50 S/cm, or at least about 60 S/cm, or at least about 70 S/cm, or at least about 80 S/cm, or at least about 90 S/cm, or at least about 100 S/cm, or between about 0.1 S/cm and about 100 S/cm, or between about 0.2 S/cm and about 80 S/cm, or between about 0.3 S/cm and about 50 S/cm, or between about 0.4 S/cm and about 40 S/cm, or between about 0.5 S/cm and about 30 S/cm, or between about 0.1 S/cm and about 20 S/cm. In some cases, the conductivity is measured at room temperature (e.g., about 25° C.). In some cases, the conductivity may have a linear dependence with temperature. As is known is known to a skilled person, the conductivity varies with the thickness of a film of a HOF.

The features of the HOFs described herein relate to the HOFs as such as well as to the HOFs in the context of a suitable application, such as a semi-conductor application, including the use of a HOF as a material of an electrode suitable for constructing an electrochemical double layer capacitor and/or supercapacitor or the HOFs of an electrochemical double layer capacitor comprising an electrode of the invention or the HOFs of a supercapacitor comprising an electrode as described herein.

The present invention therefore also relates to a proton exchange membrane fuel cell comprising a HOF of the invention as a membrane material. Furthermore, the invention relates to an electrical double layer capacitor and/or supercapacitor comprising a HOF of the invention as an electrode material. Also, the invention relates to a solar cell comprising a HOF of the invention.

One aspect of the invention relates to the use of a HOF of the invention in semiconductor applications, for example for building/constructing and/or using semiconductor devices.

The present invention further relates to a covalent organic framework (COF), characterized in that it has been generated from a HOF according to any of the preceding claims by transforming the hydrogen bonds between the functional groups into covalent anhydride bonds, preferably covalent phosphonic anhydride bonds, via a condensation reaction or reactions known to form anhydrides.

Accordingly, the various specific, preferred and possible features of HOFs of the invention disclosed in the present application are herewith also disclosed in the context of the COFs of the present invention. A skilled person is able to derive the various embodiments of COFs of the invention on the basis of the disclosure of corresponding features in the context of a HOF of the invention.

Similar to corresponding HOFs, phosphonic anhydride COFs can also have one-dimensional, two-dimensional and three-dimensional structures.

The present invention further relates to a method of synthetizing a HOF of the invention as disclosed herein, by combining the organic linkers of the HOF in a solution, wherein the solution comprises as suitable solvent, preferably polar aprotic solvents, such as DMF, DMSO, acetonitrile, THF, N-methyl-2-pyrrolidone or polar protic solvents, such as water, ethanol, methanol, or non-polar solvents;

and the solution is incubated at about 80° C.

In embodiments, the polar protic solvents can form hydrogen bonded interactions with the HOF structure and contribute to the hydrogen bonded-framework structure as a building unit.

All properties and features of the HOFs of the invention are herewith also disclosed in the context of the method of synthetizing a HOF of the invention.

DETAILED DESCRIPTION OF THE INVENTION

All cited documents of the patent and non-patent literature are hereby incorporated by reference in their entirety.

The invention relates to a hydrogen-bonded organic framework (HOF) comprising at least one kind of organic linker with at least one functional group forming a hydrogen-bonded network, wherein the functional group comprise a hydroxyl group and a central atom of tetrahedral geometry, and wherein the HOF is semi-conductive, proton-conductive and porous, preferably microporous.

Hydrogen-bonded organic frameworks (HOFs), are constructed from pure organic or metal-containing organic building blocks, which can also be called organic linkers or organic units, through hydrogen-bonding interactions between the organic building units. HOFs have numerous inherent advantages, such as low cost, easy purification, facile regeneration by recrystallization, potential water tolerance, and high thermal stability. HOFs are also quite promising for gas storage/separation, proton conduction, molecular recognition, optical applications, and so on.

HOFs are structurally ordered organic porous materials formed by hydrogen bonding of organic building blocks (ligands). HOFs have the characteristics of high specific surface area, easy to control pore size rules, and flexible structure. Both COFs and HOFs can be designed to have a suitable pore size and shape, high specific surface area, and good thermal and solvent stability.

HOFs can be self-assembled through H-bonding between organic linkers. To realize permanent porosity in HOFs, stable and robust open frameworks can be constructed by judicious selection of rigid molecular building blocks (organic cores) and hydrogen-bonded units (functional groups) with strong H-bonding interactions, in which the framework stability might be further enhanced through framework interpenetration and other types of weak intermolecular interactions such as π-π interactions. Owing to the reversible and flexible nature of H-bonding connections, HOFs show high crystallinity, solution processability, easy healing and purification. These unique advantages enable HOFs to be used as a highly versatile platform for exploring multifunctional porous materials.

HOFs are porous, preferably microporous, and the porosity can be modified and directed by using synthetic and post-synthetic modifications. In the context of the invention it can preferred that the HOFs are porous and have a high surface to mass ratio, which is a common measure for measuring porosity. Porosity (or void fraction) is a measure of the void (i.e. "empty") spaces in a material and is a fraction of the volume of voids over the total volume, between 0 and 1, or as a percentage between 0% and 100%. Porosity can be influenced by modifying the organic core of the HOF or the positioning or number of functional groups linked to the organic core.

For purposes of this invention, the chemical elements and groups of elements of the periodic table are identified in accordance with the Periodic Table of the Elements, CAS version, Handbook of Chemistry and Physics, 75th inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999, the entire contents of which are incorporated herein by reference.

Formation of the hydrogen-bonded network occurs through hydrogen bonding between the functional groups of the organic linkers of the HOFs of the invention.

The organic core of the organic linker can be of any geometrical shape suitable for use in the context of a HOF, as known to the person skilled in the art, such as for example, linear V-shaped, L-shaped, T-shaped, X-shaped, X-shaped tetrahedral, Y-shaped, or hexagonal. Examples of suitable structures are displayed in FIG. 22 disclosed herein. The tether lengths of the organic linkers can be shorter or longer. The n factor in FIG. 2 describes the number of possible phenyl groups to extend the tether length of the organic linker. The angle between the tethers of the organic linker could be between 0 to 180 degrees. Commonly observed angles include, without limitation, about 90 degrees for porphyrine and phthalocyanine core, about 120 degrees for Y-shaped geometrical core, ca. 108 degrees for tetrahedral core (tetrahedral core angle could be flexible due to the presence of sigma bonds), about 180 degrees for linear geometries.

Furthermore, the HOFs of the invention are semi-conductive. Accordingly, the HOFs of the invention can be regarded as semiconductor material. The invention further relates to the use of a HOF of the invention as a semiconductor in known semiconductor applications.

A semiconductor material has an electrical conductivity value falling between that of a conductor, such as metallic copper, and an insulator, such as glass. Its resistance falls as its temperature rises; metals are the opposite. Its conducting properties may be altered in useful ways by introducing impurities ("doping") into the crystal structure. Where two differently doped regions exist in the same crystal, a semiconductor junction is created. The behavior of charge carriers which include electrons, ions and electron holes at these junctions is the basis of diodes, transistors and all modern electronics. Some examples of semiconductors are silicon, germanium, gallium arsenide, and elements near the so-called "metalloid staircase" on the periodic table. After silicon, gallium arsenide is the second most common semiconductor and is used in laser diodes, solar cells, microwave-frequency integrated circuits and others. Silicon is a critical element for fabricating most electronic circuits.

The modern understanding of the properties of a semiconductor relies on quantum physics to explain the movement of charge carriers in a crystal lattice. Doping greatly increases the number of charge carriers within the crystal. When a doped semiconductor contains mostly free holes it is called "p-type", and when it contains mostly free electrons it is known as "n-type". The semiconductor materials used in electronic devices are doped under precise conditions to control the concentration and regions of p- and n-type dopants. A single semiconductor crystal can have many p- and n-type regions; the p-n junctions between these regions are responsible for the useful electronic behavior.

Semi-conductivity of the HOFs of the invention can be enabled by the formation of three-dimensional HOFs comprising multiple layers of two-dimensional sheets that are stacked onto each other. This enables the formation of HOMO/LUMO interactions. HOMO and LUMO are types of molecular orbitals. The acronyms stand for highest occupied molecular orbital and lowest unoccupied molecular orbital, respectively. The energy difference between the HOMO and LUMO is termed the HOMO-LUMO gap. HOMO and LUMO are sometimes called frontier orbitals in frontier molecular orbital theory. The difference in energy between these two frontier orbitals can be used to predict the strength and stability of transition metal complexes, as well as the colors they produce in solution. The HOMO level to organic semiconductors is roughly what the maximum valence band is to inorganic semiconductors and quantum dots. The same analogy can be made between the LUMO level and the conduction band minimum.

Another measurement of semiconductivity is the band gap value. Materials that have a band gap value between 0 eV and 2.5 eV may be considered to be semiconductors. Materials that have bigger than 4 eV band gap value are considered to be insulators. GTUB5 indicated in the examples of the invention has an indirect band gap of 1.56 eV making it a semiconductor. This value has been calculated to be 1.65 eV via DFT calculations and cyclic voltammetry in DMSO also produced 1.65 eV band gap for GTUB5. The narrow band gap of GTUB5 in DMSO suggests GTUB5 as an advantageous product for printing electronics applications or its application on surfaces as thin films.

The HOFs of the invention are also proton conductive. The present invention also relates to the use of a HOF of the invention for constructing membranes in proton exchange membrane fuel cells (PEMFCs). A proton conductor is an electrolyte, typically a solid electrolyte, in which H+ are the primary charge carriers. Solid-phase proton conduction was first suggested by Alfred Rene Jean Paul Ubbelohde and S. E. Rogers. in 1950. When in the form of thin membranes, proton conductors are an essential part of small, inexpensive fuel cells. Proton conductivity (σ) is one of the most important properties of a proton exchange membrane (PEM). It is usually measured by using a four-point-probe electrochemical impedance spectroscopy technique over a wide range of frequencies (e.g., 10 Hz to 100 KHz).

A proton-exchange membrane, or polymer-electrolyte membrane (PEM), is a semipermeable membrane generally made from ionomers and designed to conduct protons while acting as an electronic insulator and reactant barrier, e.g. to oxygen and hydrogen gas. This is their essential function when incorporated into a membrane electrode assembly (MEA) of a proton-exchange membrane fuel cell or of a proton-exchange membrane electrolyser: separation of reactants and transport of protons while blocking a direct electronic pathway through the membrane. PEMs can be made from either pure polymer membranes or from composite membranes, where other materials are embedded in a polymer matrix.

Proton-exchange membrane fuel cells (PEMFCs) are believed to be the most promising type of fuel cell to act as the vehicular power source replacement for gasoline and diesel internal combustion engines. They are being considered for automobile applications because they typically have a low operating temperature (~80° C.) and a rapid start-up time, including from frozen conditions. PEMFCs operate at 40-60% efficiency and can vary the output to match the demands.

The invention further relates to the use of a HOF of the invention for constructing and/or as a material of solar cells, such as Perovskite solar cells. A solar cell, or photovoltaic cell, is an electrical device that converts the energy of light directly into electricity by the photovoltaic effect, which is a physical and chemical phenomenon. It is a form of photoelectric cell, defined as a device whose electrical characteristics, such as current, voltage, or resistance, vary when exposed to light. The operation of a photovoltaic (PV) cell requires three basic attributes: The absorption of light, generating either electron-hole pairs or excitons. The separation of charge carriers of opposite types. The separate extraction of those carriers to an external circuit. Perovskite solar cells are solar cells that include a perovskite-structured material as the active layer. Most commonly, this is a solution-processed hybrid organic-inorganic tin or lead halide-based material.

As disclosed herein, functional groups of the organic linkers of the HOFs of the invention comprise a hydroxyl group and a central atom of tetrahedral geometry.

Molecular geometry is associated with the specific orientation of bonding atoms. For organic molecules, several types of geometry can be observed: linear, trigonal planar, tetrahedral, trigonal pyramid, and bent. When a molecule consists of many atoms, for example each carbon, oxygen, or nitrogen atom may be the center of the one of the geometries previously listed. The molecule as a whole will be the sum of all of the individual geometries to give an overall shape to the molecule.

In a tetrahedral molecular geometry, a central atom is located at the center with four substituents that are located at the corners of a tetrahedron. The bond angles are cos−1 (−⅓)=109.4712206 . . . °≈109.5° when all four substituents are the same, as in methane (CH4) as well as its heavier analogues. Methane and other perfectly symmetrical tetrahedral molecules belong to point group Td, but most tetrahedral molecules have lower symmetry. Tetrahedral molecules can be chiral. Due to the environmental effects, ionic radius of the atoms bonded to the central tetrahedral atom, the ionic radius of the central tetrahedral atom, presence of lone pairs of electrons, the bond angles can be deviated from 109.5°. Tetrahedral geometry can also have distorted tetrahedral structure. The metal binding unit could resemble the structure of a tetrahedron once they are drawn according to polyhedral representation of crystal structures.

In embodiments, the central atom of tetrahedral geometry is selected from the group comprising phosphorus (P), arsenic (As), antimony (Sb), silicon (Si), selenium (Se) and bismuth (Bi).

Preferably, the functional groups of the organic linkers of the HOFs of the invention is selected from the group comprising phosphonic acid, phosphinic acid, arsonic acids, arsinic acids, phosphonate, arsonate and/or esters thereof comprising at least one hydroxyl group.

Phosphonates and phosphonic acids are organophosphorus compounds containing C—PO(OH)2 or C—PO(OR)2 groups (where R=alkyl, aryl). Organophosphorus compounds are organic compounds containing phosphorus. Organophosphorus chemistry is the corresponding science of the properties and reactivity of organophosphorus compounds. Phosphorus, like nitrogen, is in group 15 of the periodic table, and thus phosphorus compounds and nitrogen compounds have many similar properties. According to one definition of organophosphorus compounds used herein, an organophosphorus compound need contain only an organic substituent, but need not have a direct phosphorus-carbon (P—C) bond. A large group of organophosphorus compounds is known to the skilled person. For example, phosphonates are esters of phosphonic acid and have the general formula RP(=O)(OR')2; phosphate esters have the general structure P(=O)(OR)3 feature P(V); Phosphine oxides (designation $\sigma^4\lambda^5$) have the general structure $R_3P{=}O$ with formal oxidation state V; Compounds with the formula $[PR_{4^+}]X^-$ comprise the phosphonium salts; Phosphites, sometimes called phosphite esters, have the general structure $P(OR)_3$ with oxidation state +3; intermediate between phosphites and phosphines are phosphonites ($P(OR)_2R'$) and phosphinite ($P(OR)R_{'2}$); the parent compound of the phosphines is PH3 or phosphane elsewhere, replacement of one or more hydrogen centers by an organic substituents (alkyl, aryl), gives PH3-xRx, an organophosphine, generally referred to as phosphines; compounds with carbon phosphorus(III) multiple bonds are called phosphaalkenes ($R_2C{=}PR$) and phosphaalkynes ($RC{\equiv}P$). Further examples of organophohsphorus compounds are known to the skilled person.

Hypophosphorous acid (HPA), or phosphinic acid, is a phosphorus oxyacid and a powerful reducing agent with molecular formula $H_3PO_2$. The formula for this acid is generally written $H_3PO_2$, but a more descriptive presentation is $HOP(O)H_2$, which highlights its monoprotic character. Salts derived from this acid are called hypophosphites. Organophosphinic acids have the formula $R_2PO_2H$. The two hydrogen atoms directly bound to phosphorus in phosphinic acid are replaced by organic groups. For example, formaldehyde and $H_3PO_2$ react to give $(HOCH_2)_2PO_2H$. Similarly, phosphinic acid adds to Michael acceptors, for example with acrylamide it gives $H(HO)P(O)CH_2CH_2C(O)NH_2$. The Cyanex family of dialkylphosphinic acids are used in hydrometallurgy to extract metals from ores.

Phosphinates or hypophosphites are a class of phosphorus compounds conceptually based on the structure of hypophosphorous acid. IUPAC prefers the term phosphinate in all cases, however in practice hypophosphite is usually used to describe inorganic species (e.g. sodium hypophosphite), while phosphinate as used herein also refers to organophosphorus species. Organophosphinates are organophosphorus compounds with the formula $OP(OR)R_2$, with the simplest example being methylphosphinic acid. Phosphinites $P(OR)R_2$ can be oxidized into phosphinates. Dialkylphosphinic acids are organophosphorus compounds with the formula $R_2PO_2H$, where R is any alkyl group. They are phosphorus(V) compounds with tetrahedral molecular geometry. Under the brand names Aerophine and Cyanex, they are used in extraction and separation, i.e., hydrometallurgy, of metal salts from ore extracts. Characteristically the organic substituents are branched to confer solubility and preclude crystallization. The dithiodialkyphosphinic acids ($R_2PS_2H$) are related to the diorganodithiophosphates with the formula $(RO)_2PS_2H$, which are also used as complexing agents in the purification of metals. The phosphates are more prone to hydrolysis owing to the greater lability of the RO—P linkage vs the direct C—P bond.

Arsonic acids are a subset of organoarsenic compounds defined as oxyacids where a pentavalent arsenic atom is bonded to two hydroxyl groups, a third oxygen atom (this one with a double bond), and an organic substituent. The salts/conjugate bases of arsonic acids are called arsonates. Arsonic acid refers to $H_3AsO_3$, the case where the substituent is a single hydrogen atom. The other arsonic acids can simply be viewed as hydrocarbyl derivatives of this base case. Arsenic acid results when the substituent is a hydroxyl group. Methylarsonic acid results when the substituent is a methyl group. Phenylarsonic acid results when the substituent is a phenyl group.

Arsenic acid is the chemical compound with the formula $H_3AsO_4$. More descriptively written as $AsO(OH)_3$, this colorless acid is the arsenic analogue of phosphoric acid. Arsenate and phosphate salts behave very similarly. Arsenic acid as such has not been isolated, but is only found in solution, where it is largely ionized. Its hemihydrate form ($H_3AsO_4\cdot\frac{1}{2}H_2O$) does form stable crystals.

In certain embodiments, the at least one organic linker comprises porphyrin or phthalocyanine as a geometrical core, wherein the geometrical core preferably comprises a bound metal, such as iron (Fe), palladium (Pd), zinc (Zn), copper (Cu), nickel (Ni), or a transition metal.

Transition metals are the elements located in Groups 3-12 of the Periodic Table. All the transition metals have two electrons in their outermost shell, and all but zinc, cadmium, and mercury have an incompletely filled inner shell. Terms including multiple valences (because of their incomplete inner shells), high melting points, colored compounds, and the ability to form stable complex ions and alloys describe some of the properties of transition metals. The elements classed as transition metals generally have the following properties in common: Good conductors of heat and electricity; easily hammered or bent into shape; usually hard and tough; high densities; high melting points—but mercury is a liquid at room temperature; form coloured compounds. Transition Metals comprise scandium (Sc), titanium (Ti), vanadium (V), chromium (Cr), manganese (Mn), iron (Fe), cobalt (Co), nickel (Ni), copper (Cu), and zinc (Zn), yttrium (Y), zirconium (Zr), niobium (Nb), molybdenum (Mo), technetium (Tc), ruthenium (Ru), rhodium (Rh), palladium (Pd), silver (Ag), and cadmium (Cd), lanthanum (La), hafnium (Hf), tantalum (Ta), tungsten (W), rhenium (Re), osmium (Os), iridium (Ir), platinum (Pt), gold (Au), and mercury (Hg), actinium (Ac), rutherfordium (Rf), dubnium (Db), seaborgium (Sg), bohrium (Bh), hassium (Hs), meitnerium (Mt), darmstadtium (Ds), roentgenium (Rg), copernicium (Cn).

Furthermore, the metal atoms or metal ions of the invention are selected form the group comprising zinc (Zn), cadmium (Cd), copper (Cu), cobalt (Co), nickel (Ni), gold (Au) and silver (Ag), iron (Fe), preferably Zn, Co, Cu and Ni, most preferably Zn and Cu.

In embodiments, the hydrogen-bonded network between functional groups of the organic linkers forms one-dimensional chains or two-dimensional sheets or extends across stacked sheets of the HOF.

Herein, the band gap, also called an energy gap or band gap, is an energy range in a solid where no electron states can exist. In graphs of the electronic band structure of solids, the band gap generally refers to the energy difference (in electron volts) between the top of the valence band and the bottom of the conduction band in insulators and semiconductors. It is the energy required to promote a valence electron bound to an atom to become a conduction electron, which is free to move within the crystal lattice and serve as a charge carrier to conduct electric current. If the valence band is completely full and the conduction band is completely empty, then electrons cannot move in the solid; however, if some electrons transfer from the valence to the conduction band, then current can flow (see carrier generation and recombination). Therefore, the band gap is a major factor determining the electrical conductivity of a solid. Substances with large band gaps are generally insulators, those with smaller band gaps are semiconductors, while conductors either have very small band gaps or none, because the valence and conduction bands overlap.

As used herein, electrical conductivity or specific conductance (which is the reciprocal of electrical resistivity) represents a material's ability to conduct electric current. It is commonly signified by the Greek letter σ (sigma), but κ (kappa) (especially in electrical engineering) and γ (gamma) are sometimes used. The SI unit of electrical conductivity is siemens per meter (S/m).

In invention further relates to a covalent organic framework (COF), characterized in that it has been generated from a HOF according to any of the preceding claims by transforming the hydrogen bonds between the functional groups into covalent anhydride bonds, preferably covalent phosphonic anhydride bonds, via a condensation reaction or reactions known to form anhydrides.

Covalent Organic Frameworks (COFs) are structurally ordered organic porous materials formed by covalent bonding of organic building blocks. They have high specific surface area, high channel ratio, pore size rules, easy regulation, and flexible structure. It is easy to functionalize and has excellent thermal and chemical stability.

The invention also relates to a method of synthetizing a HOF of the invention as disclosed herein, by combining the organic linkers of the HOF in a solution, wherein the solution comprises as suitable solvent, preferably polar aprotic solvents, such as DMF, DMSO, acetonitrile, THF, or polar protic solvents, such as water, ethanol, methanol, or non-polar solvents; and the solution is incubated at about 80° C. In embodiments, polar protic solvents form hydrogen bonded interactions with the HOF structure and contribute to the hydrogen bonded-framework structure as a building unit.

A protic solvent is a solvent that has a hydrogen atom bound to an oxygen (as in a hydroxyl group), a nitrogen (as in an amine group) or a fluorine (as in hydrogen fluoride). In general terms, any solvent that contains a labile H+ is called a protic solvent. The molecules of such solvents readily donate protons (H+) to reagents. Conversely, aprotic solvents cannot donate hydrogen.

In general, polar protic solvents have high dielectric constants and high polarity. Polar protic solvents display hydrogen bonding, have an acidic hydrogen (although they may be very weak acids such as ethanol), dissolve salts. Examples include water, most alcohols, formic acid, hydrogen fluoride, and ammonia. Polar protic solvents are favorable for SN1 reactions, while polar aprotic solvents are favorable for $S_N2$ reactions.

Polar aprotic solvents are solvents that lack an acidic hydrogen. Consequently, they are not hydrogen bond donors. These solvents generally have intermediate dielectric constants and polarity. Although discouraging use of the term "polar aprotic", IUPAC describes such solvents as having both high dielectric constants and high dipole moments, an example being acetonitrile. Other solvents meeting IUPAC's criteria include pyridine, ethyl acetate, DMF, HMPA, and DMSO. Polar aprotic solvents can accept hydrogen bonds, do not have acidic hydrogen, can dissolve salts. The criteria are relative and very qualitative. A range of acidities are recognized for aprotic solvents. Their ability to dissolve salts depends strongly on the nature of the salt.

The invention further relates to the use of a HOF of the invention for constructing and/or as a material of electrodes, preferably electrodes in supercapacitor application.

As used herein, a supercapacitor (also called a supercap, ultracapacitor or Goldcap) is a high-capacity capacitor with capacitance values much higher than other capacitors (but lower voltage limits) that bridge the gap between electrolytic capacitors and rechargeable batteries. They typically store 10 to 100 times more energy per unit volume or mass than electrolytic capacitors, can accept and deliver charge much faster than batteries, and tolerate many more charge and discharge cycles than rechargeable batteries. Supercapacitors are used in applications requiring many rapid charge/discharge cycles rather than long term compact energy storage: within cars, buses, trains, cranes and elevators, where they are used for regenerative braking, short-term energy storage or burst-mode power delivery. Smaller units are used as memory backup for static random-access memory (SRAM). Unlike ordinary capacitors, supercapacitors do not use the conventional solid dielectric, but rather, they use electrostatic double-layer capacitance and electrochemical pseudocapacitance, both of which contribute to the total capacitance of the capacitor, with a few differences:

Electrochemical or electrostatic double-layer capacitors (EDLCs) usually use carbon electrodes or derivatives with much higher electrostatic double-layer capacitance than electrochemical pseudocapacitance, achieving separation of charge in a Helmholtz double layer at the interface between the surface of a conductive electrode and an electrolyte. The separation of charge is of the order of a few ångströms (0.3-0.8 nm), much smaller than in a conventional capacitor.

Electrochemical pseudocapacitors usually use metal oxide or conducting polymer electrodes with a high amount of electrochemical pseudocapacitance additional to the double-layer capacitance. Pseudocapacitance is achieved by Faradaic electron charge-transfer with redox reactions, intercalation or electrosorption.

Hybrid capacitors, such as the lithium-ion capacitor, use electrodes with differing characteristics: one exhibiting mostly electrostatic capacitance and the other mostly electrochemical capacitance.

The electrolyte forms an ionic conductive connection between the two electrodes which distinguishes them from conventional electrolytic capacitors where a dielectric layer always exists, and the so-called electrolyte (e.g., MnO2 or conducting polymer) is in fact part of the second electrode (the cathode, or more correctly the positive electrode). Supercapacitors are polarized by design with asymmetric electrodes, or, for symmetric electrodes, by a potential applied during manufacture.

Supercapacitors (SCs) consist of two electrodes separated by an ion-permeable membrane (separator), and an electrolyte ionically connecting both electrodes. When the electrodes are polarized by an applied voltage, ions in the electrolyte form electric double layers of opposite polarity to the electrode's polarity. For example, positively polarized electrodes will have a layer of negative ions at the electrode/electrolyte interface along with a charge-balancing layer of positive ions adsorbing onto the negative layer. The opposite is true for the negatively polarized electrode. Additionally, depending on electrode material and surface shape, some ions may permeate the double layer becoming specifically adsorbed ions and contribute with pseudocapacitance to the total capacitance of the supercapacitor.

Supercapacitors use the double-layer effect to store electric energy; however, this double-layer has no conventional solid dielectric to separate the charges. There are two storage principles in the electric double-layer of the electrodes that contribute to the total capacitance of an electrochemical capacitor: Double-layer capacitance and Pseudocapacitance.

The main drawback of carbon electrodes of double-layer SCs is small values of quantum capacitance which act in series with capacitance of ionic space charge. Therefore, further increase of density of capacitance in SCs can be connected with increasing of quantum capacitance of carbon electrode nanostructures. The amount of charge stored per unit voltage in an electrochemical capacitor is primarily a function of the electrode size, which can be enlarged by using highly porous electrode material or active electrode material. The electrostatic storage of energy in the double-layers is linear with respect to the stored charge and correspond to the concentration of the adsorbed ions. Also, while charge in conventional capacitors is transferred via electrons, capacitance in double-layer capacitors is related to the limited moving speed of ions in the electrolyte and the resistive porous structure of the electrodes.

Supercapacitor electrodes are generally thin coatings applied and electrically connected to a conductive, metallic current collector. In the context of the invention, the electrodes comprise as a material or an active material which contributes to or represents the this coatings a HOF of the invention. Supercapacitor or ELC electrodes must preferably have good conductivity, high temperature stability, long-term chemical stability (inertness), high corrosion resistance and high surface areas per unit volume and mass, which is provided by the HOFs described herein. Other requirements include environmental friendliness and low cost. The amount of double-layer as well as pseudocapacitance stored per unit voltage in a supercapacitor is predominantly a function of the electrode surface area. Therefore, supercapacitor electrodes are typically made of porous, spongy material with an extraordinarily high specific surface area, such as activated carbon. Additionally, the ability of the electrode material to perform faradaic charge transfers enhances the total capacitance. Generally the smaller the electrode's pores, the greater the capacitance and specific energy. However, smaller pores increase equivalent series resistance (ESR) and decrease specific power. Applications with high peak currents require larger pores and low internal losses, while applications requiring high specific energy need small pores.

The most commonly used electrode material for EDLC supercapacitors is carbon in various manifestations such as activated carbon (AC), carbon fibre-cloth (AFC), carbide-derived carbon (CDC), carbon aerogel, graphite (graphene), graphane and carbon nanotubes (CNTs).

FIGURES

The invention is further described by the following figures. These are not intended to limit the scope of the invention, but represent preferred embodiments of aspects of the invention provided for greater illustration of the invention described herein.

EXAMPLES

Figure 1:
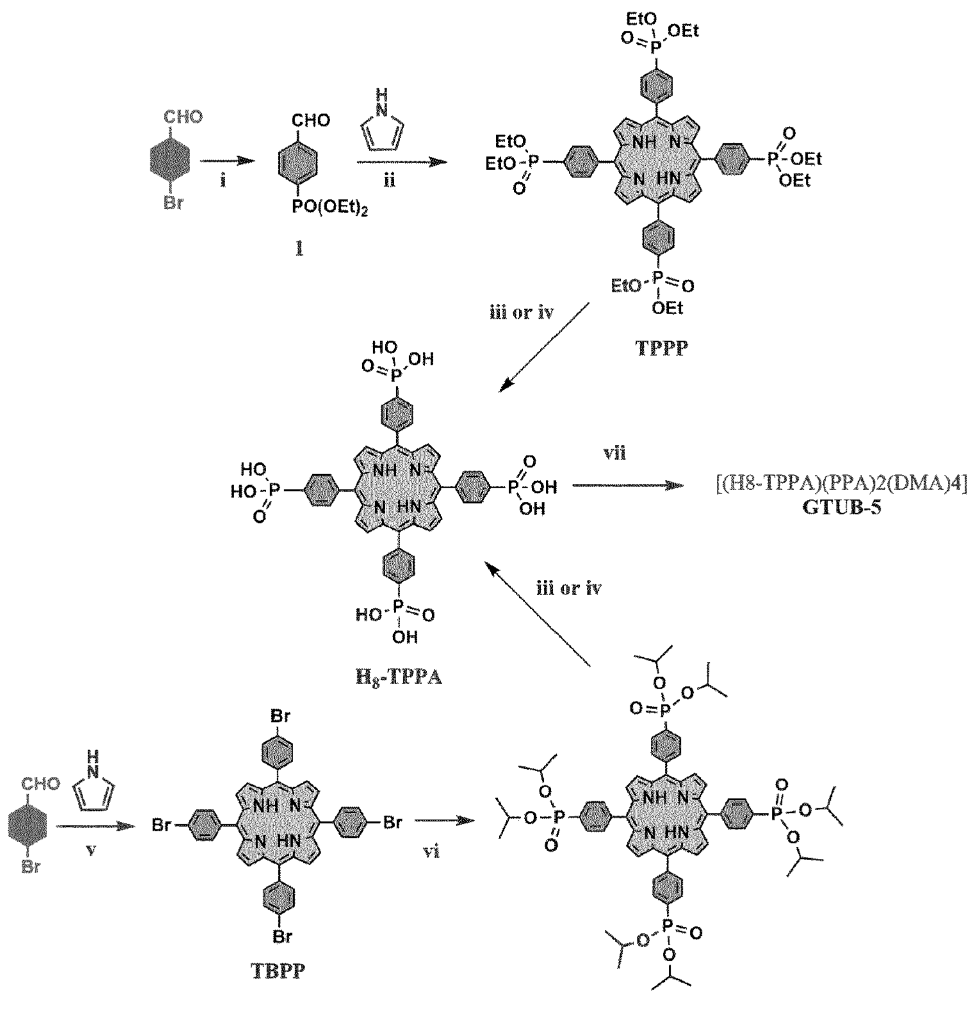
FIG. 1: Synthetic route for meso-aryl phosphonate-functionalized porphyrin derivatives and the porous phosphonic acid hydrogen-bonded organic framework GTUB-5.

The invention is further described by the following examples. These are not intended to limit the scope of the invention, but represent preferred embodiments of aspects of the invention provided for greater illustration of the invention described herein.

Summary of the Examples

Disclosed herein is a novel semiconductive, proton-conductive microporous hydrogen-bonded organic framework derived from phenylphosphonic acid and 5,10,15,20-tetrakis [p-phenylphosphonic acid] porphyrin (known as GTUB5). The structure of GTUB5 was characterized using single crystal X-ray diffraction (XRD). A narrow band gap of 1.56 eV was extracted from a UV-Vis spectrum of pure GTUB5 crystals, in excellent agreement with that obtained from DFT calculations. GTUB5 was found to have a proton conductivity of $3.00 \cdot 10^{-6}$ S $cm^{-1}$ at 75° C. and 75% relative humidity. Its hexagonal voids were found to have a surface area of 422 $m^2g^{-1}$. GTUB5 is thermally stable under relative humidities of up to 90% at 75° C., as shown by XRD. These findings pave the way for a new family of microporous, proton-conductive organic semiconductors with high surface areas and high thermal stability is the first example with both semiconductive and proton-conductive behaviour.

Materials and Methods of the Examples

Synthesis of GTUB5. All the reagents and solvents employed were commercially available and used as received without further purification. As can be seen in Scheme of FIG. 1, 5,10,15,20-Tetra(p-bromophenyl)porphyrin (TBPP) and phosphonate-functionalized porphyrins (TDPP, TPPP, $H_8$-TPPA) were synthesized employing our previously reported synthetic route.[54] To synthesize GTUB-5, $H_8$-TPPA (8.77 mg, 0.0088 mmol) and phenylphosphonic acid (PPA) (208 mg, 1.3 mmol) in a 1.6 mL mixture of DMF/EtOH or DMF/MeOH (1.36:0.24, v/v) were added to a 5-mL glass vial. The reaction mixture was ultrasonically dissolved and then heated to 80° C. in an oven for 48 h. After cooling down to room temperature, dark purple block crystals of GTUB5 have been formed, which were then isolated by filtration, washed with DMF and acetone, and finally air-dried. The yield of GTUB5 was ~5 mg.

Molecular simulations. Accessible pore volume, pore size distribution (PSD) and surface area of GTUB-5 were calculated by computer simulations. These force field based atomistic simulations were performed with the RASPA molecular simulation package.[55] For these simulations GTUB-5 unit cell was replicated by 1×2×4 times in the x, y and z directions, respectively. The replicated framework atoms were fixed in their crystallographically determined positions. Lennard-Jones (LJ) and Coulomb potentials were employed to determine the non-bonded interaction energies between atoms:

$$V_{ij} = 4\varepsilon_{ij}\left[\left(\frac{\sigma_{ij}}{r_{ij}}\right)^{12} - \left(\frac{\sigma_{ij}}{r_{ij}}\right)^{6}\right] + \frac{q_i q_j}{4\,\varepsilon_0\, r_{ij}}$$

where $r_{ij}$ is the distance between atoms i and j, $\varepsilon_{ij}$ and $\sigma_{ij}$ are the LJ well depth and diameter, respectively, $q_i$ is the partial charge of atom i, and $\varepsilon_0$ is the dielectric constant. In all simulations, the LJ parameters between different types of sites were calculated using the Lorentz-Berthelot mixing rules, and the Ewald summation method was employed to compute the electrostatic interactions. The LJ interactions were shifted to be 0 at a cutoff distance of 12.0 Å. For the real part of the Ewald summation, the cutoff was also set to 12.0 Å.

LJ parameters for the GTUB-5 atoms (see Table 3) were taken from the DREIDING[56] force field. Partial atomic charges for the framework atoms were obtained with the REPEAT method[57] which fits point charges against the electrostatic potential. The electrostatic potential of GTUB-5 was derived from a single point energy calculation using periodic plane-wave DFT with the CASTEP 17.21 software[58] and by employing the PBE[59] functional and ultrasoft pseudopotentials[69] with a 550 eV cutoff.

TABLE 3

LJ parameters for the framework atoms of GTUB-5

| Atom type | σ (Å) | $\varepsilon/k_B$ (K) |
|---|---|---|
| C | 3.473 | 47.856 |
| O | 3.033 | 48.158 |
| H | 2.846 | 7.649 |
| P | 3.695 | 153.476 |

Accessible pore volume. Accessible pore volume of GTUB-4 was computed with the Widom insertion method using a helium probe[61] and estimated to be 0.176 $cm^3$/g. This method included the random insertion of a single helium atom for 100,000 times in to the framework. Then the specific pore volume, i.e. pore volume available per unit mass, $V_p$, was determined by $$V_p = \frac{1}{m_s}\int e^{-\varphi(R)/kT}\,dr$$

where ϕ is the helium-solid interaction potential for a single helium atom, dr is a differential volume element, and $m_s$ is the mass of the solid adsorbent in the simulation box. The LJ parameters for helium were taken from Hirschfelder et al.,[62] and are $\sigma_{He}$=2.640 Å and $\varepsilon_{He}/k_B$=10.9 K.

Figure 2:
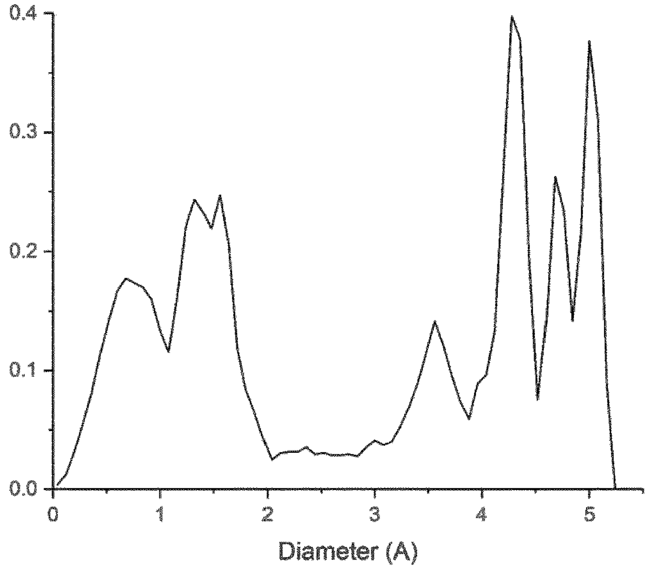
FIG. 2: Pore size distribution (PSD) of GTUB-5.

Pore size distribution. The pore size distribution of GTUB-5 (FIG. 2) was computed with the method of Gelb and Gubbins.[63] Briefly, this method considers subvolumes of the system accessible to spheres of different radii r. Let $V_{pore}(r)$ be the volume of the void space "accessible" by spheres of radius r or smaller; a point x can only be considered in $V_{pore}(r)$ if we can construct a sphere of radius r that overlaps x and does not overlap any framework atoms. The derivative $-dV_{pore}(r)/dr$ is the fraction of volume accessible by spheres of radius r but not by spheres of radius r+dr and is a direct definition of the pore size distribution. The $V_{pore}$(r) function was calculated by Monte Carlo volume integration (10,000 iterations) and setting dr=0.12 Å.

$N_2$ adsorption isotherm and BET surface area. Simulated $N_2$ adsorption isotherm of GTUB-5 was computed by performing grand canonical Monte Carlo (GCMC) simulations at 77K and up to 0.4 bar. In the GCMC ensemble, the chemical potential, volume, and temperature of the system are fixed; however, the number of molecules fluctuate. For all GCMC simulations a 100.000 cycle initialization and a 100,000 cycle production run were performed. Each cycle is N steps, where N is equal to the number of molecules in the system. Random insertions, deletions, translations, rotations, and reinsertions of the $N_2$ molecules were sampled with equal probability. TraPPE force field was used to model $N_2$ molecules,[64] which was originally fit to reproduce the vapor-liquid coexistence curve of $N_2$. In this force field, the $N_2$ molecule is rigid where the N—N bond length is fixed at its experimental value of 1.10 Å. This model reproduces the experimental gas-phase quadrupole moment of the $N_2$ molecule by placing partial charges on nitrogen atoms and on a point located at the center of mass (COM) of the molecule. Table 4 shows the LJ parameters and partial charges for the $N_2$ molecule.

TABLE 4

LJ parameters and partial charges for the sites in the $N_2$ molecule

| | σ (Å) | $\varepsilon/k_B$ (K) | q (e) |
|---|---|---|---|
| N | 3.31 | 36.0 | −0.482 |
| $N_2$ COM | 0 | 0 | 0.964 |

Figure 3:
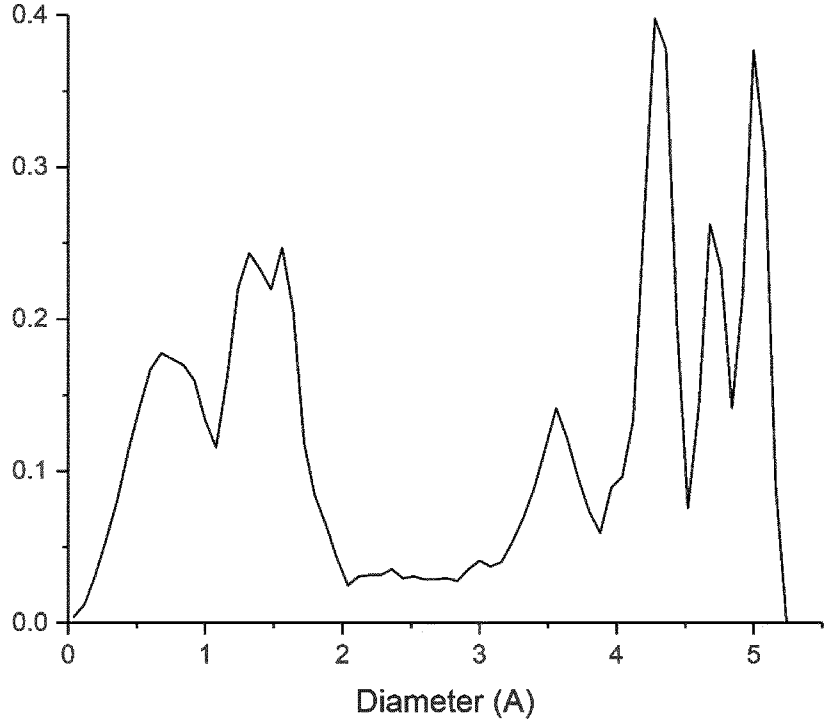
FIG. 3: (A) Simulated N2 isotherm. (B) Plot of the linear region for the BET equation.
Figure 3:
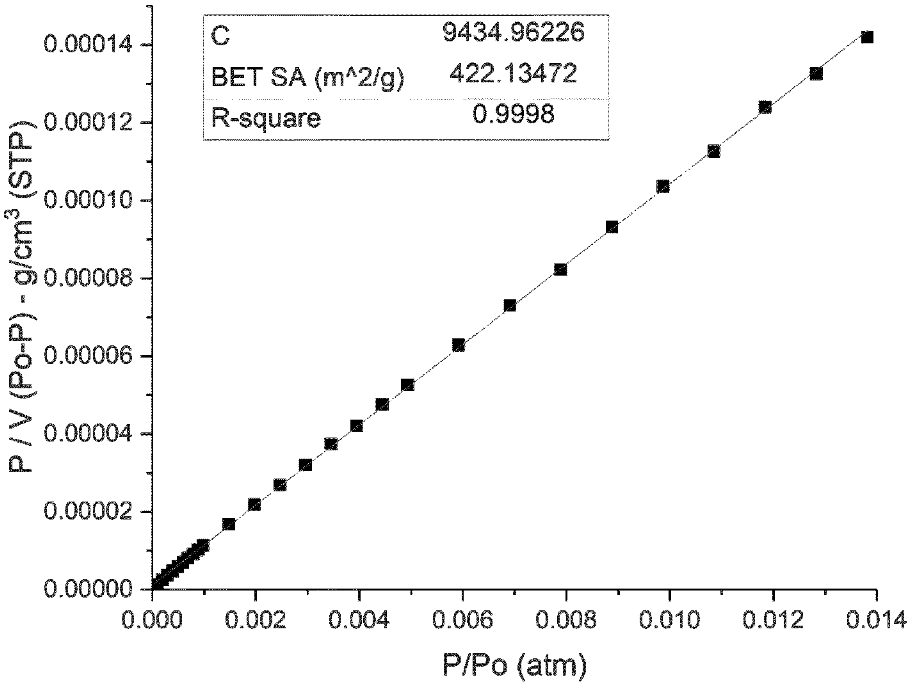

With GCMC simulations once can compute the absolute adsorption ($N_{total}$); whereas, in adsorption experiments excess adsorption ($N_{excess}$) is measured. Therefore, the simulated excess adsorption of $N_2$ was calculated using the following expression $$N_{total}=N_{excess}+\rho_{gas}\times V_p$$

where $\rho_{gas}$ is the bulk density of the gas at simulation conditions which were calculated using the Peng-Robinson equation of state and $V_p$ is the accessible pore volume. BET surface area of GTUB-5 was obtained by using the simulated $N_2$ adsorption isotherm of GTUB-5 (FIG. 3) and estimated to be 422 $m^2$/g. When applying the BET theory, we made sure that our analysis satisfied the two consistency criteria as detailed by Walton et al.[65]

Electronic structure. All of the density functional theory (DFT) calculations on GTUB5 were performed with the Quickstep-CP2K program.[66,67] Since GTUB5 is a bulk material, periodic boundary conditions were applied to a 1×1×1 cell. The Perdew-Burke-Ernzerhof (PBE)[60] generalized gradient approximation (GGA) functional was used in conjunction with the Grimme D3 dispersion correction[67] and BJ damping.[68] The Gaussian and plane waves method[67,69] was used, with the valence orbitals expanded in terms of molecularly optimized Gaussian basis sets of double-ζ plus polarization (MOLOPT-DZVP)[70] quality and the core electrons represented by norm-conserving Goedecker-Teter-Hutter pseudopotentials.[71,72] Γ-point sampling was used and the plane-wave cutoff in reciprocal space was set to 550 Ry, with a Gaussian mapping of 60 Ry over five multi-grids. The self-consistent field was converged to $10^{-6}$ Ry with the FULL_ALL preconditioner using the orbital transformation method with a HOMO-LUMO gap of 1.67 eV for both the geometry optimization and the follow-up single point calculations. The experimental crystal structure was relaxed using the conjugate gradient method[73], and the lattice vectors were set to their experimental values. Single point calculations were performed to obtain the projected density of states, band structure, band gap, and the HOMO and LUMO iso-surfaces.

TABLE 5

Comparison of experimental and calculated average inter-atomic distances (in Å). Standard deviations in distances are given in brackets. The calculated structure was obtained from a geometry optimization of the experimental crystal structure at the PBE-D3-BJ DZVP-550 Ry level of theory.

Figure 4:
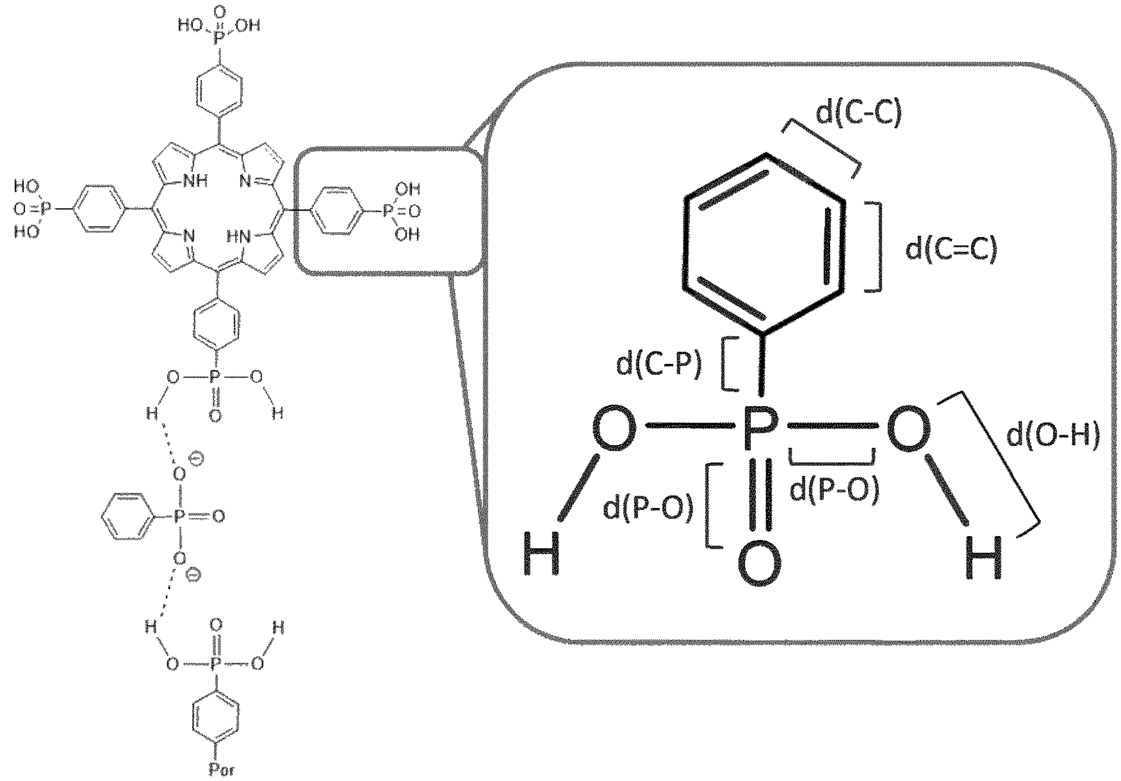
FIG. 4: Simplified chemical structure of the GTUB5 building block, highlighting one of the phenyl-phosphonic acid groups. The bond distance labeling is used in Table 5.
Figure 5:
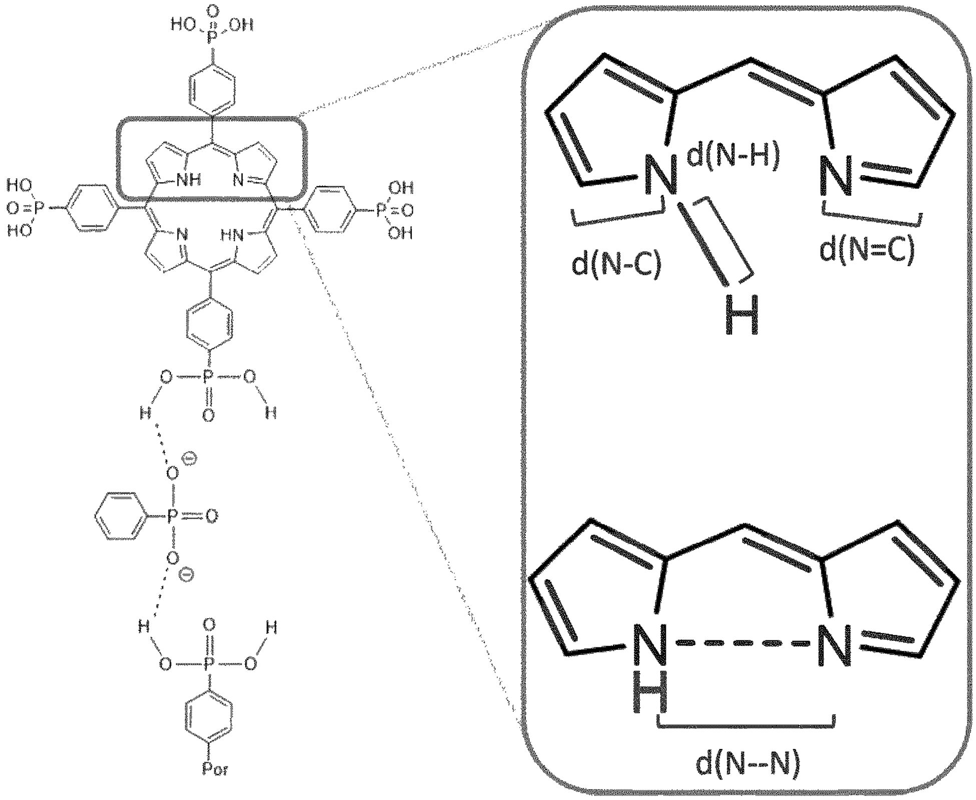
FIG. 5: Simplified chemical structure of the GTUB5 building block, highlighting the dipyrromethene portion of the porphyrin group. The bond distance labeling is used in Table 5.
Figure 6:
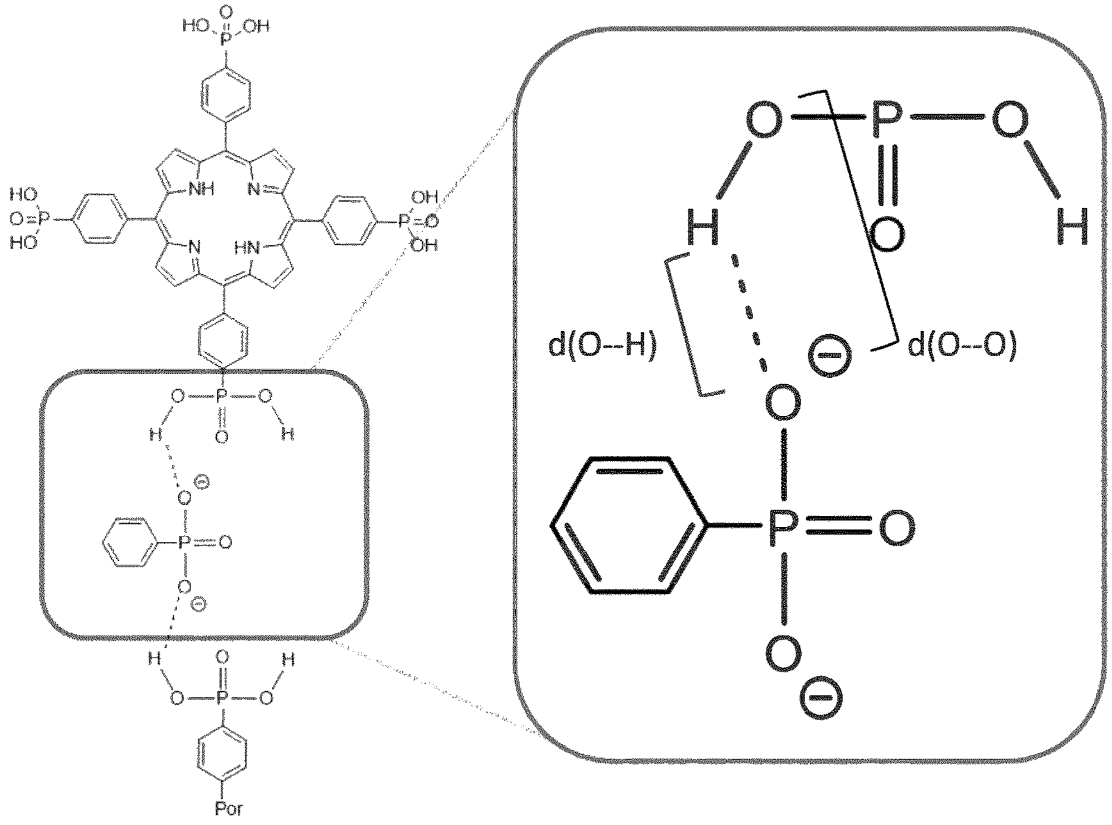
FIG. 6: Simplified chemical structure of the GTUB5 building block, highlighting the hydrogen bonding between neighboring phenyl-phosphonic acid groups. The bond distance labeling is used in Table 5.
Figure 7:
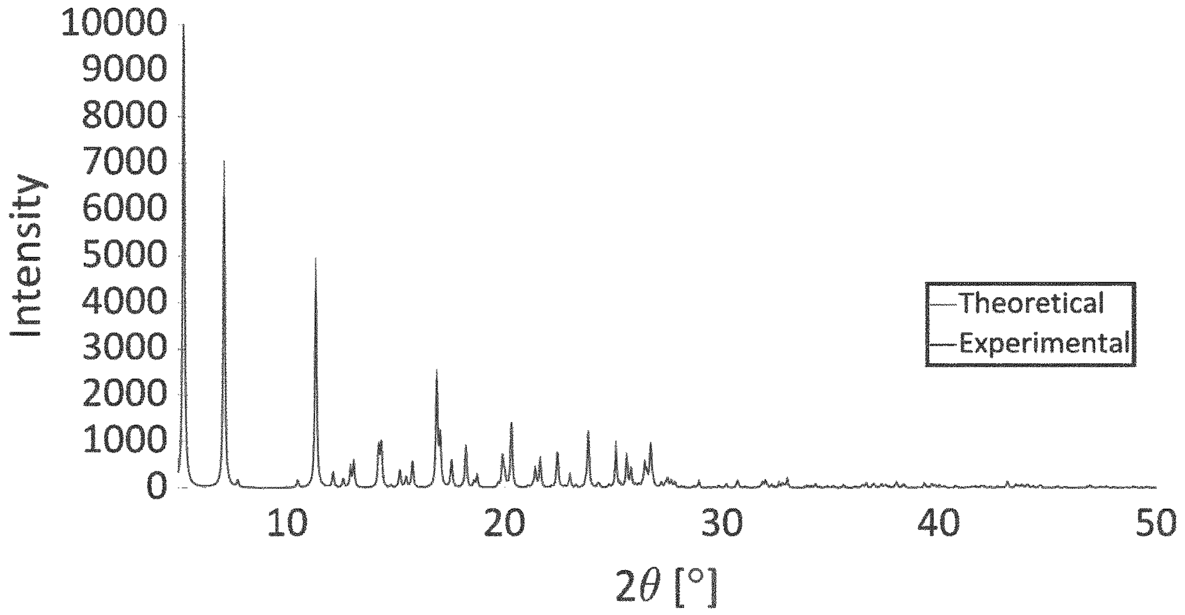
FIG. 7: Comparison between experimental and theoretical X-ray diffraction patterns. The theoretical result was generated using a full width-half max of 0.1 2θ° within the Mercury software package.[74]
Figure 8:
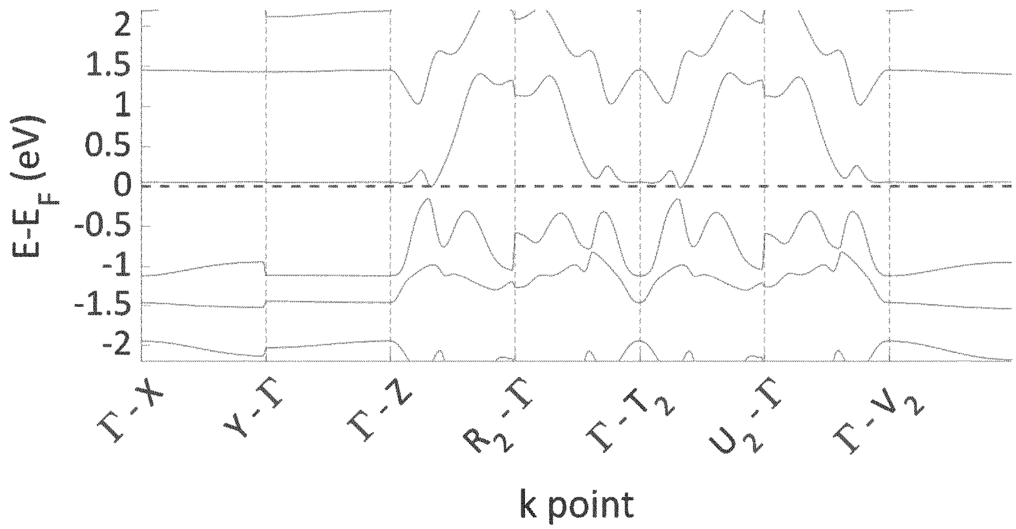
FIG. 8: (A) Band structure of GTUB5.[75,76] (B) The corresponding total density of states (DOS).
Figure 8:
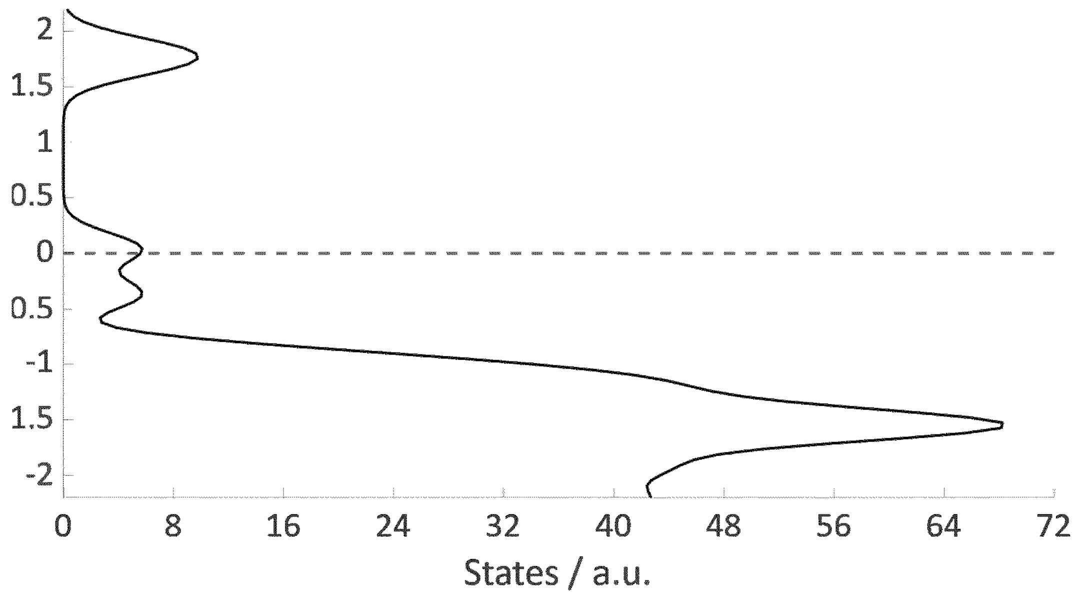

| Atom pair | Experimental | Calculated |
|---|---|---|
| | FIG. 4 | |
| C—P | 1.78 (0.018) | 1.80 (0.008) |
| P—O | 1.53 (0.003) | 1.58 (0.013) |
| O—H | 0.83 (0.013) | 1.16 (0.096) |
| C—C | 1.49 (0.000) | 1.46 (0.023) |
| C═C | 1.39 (0.025) | 1.40 (0.01) |
| | FIG. 5 | |
| N—C | 1.78 (0.018) | 1.80 (0.008) |
| N═C | 1.53 (0.003) | 1.58 (0.013) |
| N—H | 0.88 (0.012) | 1.05 (0.015) |
| N—N | 2.92 (0.000) | 2.93 (0.000) |
| | FIG. 6 | |
| O—O | 2.47 (0.018) | 2.43 (0.000) |
| O—H | 1.88 (0.164) | 1.75 (0.005) |

X-ray data collection and structure refinement. Data for GTUB-5 was obtained with a Bruker APEX II QUAZAR three-circle diffractometer. Indexing was performed using APEX2.[77] Data integration and reduction were carried out with SAINT.[78] Absorption correction was performed by the multi-scan method implemented in SADABS.[79] The structure was solved using SHELXT[80] and then refined by full-matrix least-squares refinements on $F^2$ using the SHELXL[81] in the Olex2 software package.[82] The positions of all H-atoms bonded to carbon, nitrogen, and oxygen atoms were geometrically optimized with the following HFIX instructions in SHELXL: HFIX 23 for the $—CH_2—$ moieties, HFIX 137 for the $—CH_3$, HFIX 43 for the CH and NH groups of the aromatic rings and porphyrin cores, and HFIX 147 for the —P—OH groups (H1a) of the phosphonic acid moieties. Another O-bound H atom (H3) was located from a difference Fourier-map. Finally, their displacement parameters were set to isotropic thermal displacements parameters ($U_{iso}$(H)=1.2×$U_{eq}$ for CH, NH and $CH_2$ groups or ($U_{iso}$(H)=1.5×$U_{eq}$ (—OH and $CH_3$ groups). In the chemical formula $[(H_8\text{-TPPA})(PPA)_2(DMA_4]$ of GTUB-5, there is the $H_8$-TPPA building block is not deprotonated while protons of the phenylphosphonic acid (PPA) groups have been acquired by DMF solvent in the pores forming four dimethylammonium cations ($[NH_2(CH_3)_2]^+$, DMA) to balance the charge. SQUEEZE was used to remove electron density caused by seriously disordered solvent molecules in GTUB-5. Along the c-axis, the 3D supramolecular network of GTUB-5 produced a one-dimensional distinctive void space with a total potential solvent area occupying 19.2% (785 Å$^3$) of the unit cell volume (4081.7 Å$^3$) obtained using the PLATON software package.[84] Analysis of solvent accessible voids in the structure was performed using the CALC SOLV within PLATON with a probe radius of 1.20 Å and grid spacing of 0.2 Å. Van der Waals (or ion) radii used in the analysis are 1.70 Å for C, 1.20 Å for H, 1.55 Å for N, 1.52 Å for O, and 1.80 Å for P. Also, in this crystal structure, the rotationally disordered phosphonate part (—$PO_3$) in phenylphosphonic acid (PPA) was refined as 0.77:0.23. Crystallographic data and refinement details of the data collection for GTUB-5 are given in Table 6. Crystal structure validations and geometrical calculations were performed using PLATON.[83] The Mercury software package[75] was used for visualization of the cif files. Additional crystallographic data with CCDC reference numbers (1963794 for GTUB-5) was deposited to the Cambridge Crystallographic Data Center at www.ccdc.cam.ac.uk/deposit.

TABLE 6

X-ray crystallographic data and refinement parameters for GTUB-5.

| | |
|---|---|
| CCDC | 1963794 |
| Empirical formula | $C_{64}H_{76}N_8O_{18}P_6$ |
| Formula weight/g. mol$^{-1}$ | 1431.14 |
| Temperature/K | 296 |
| Radiation, Wavelength (Å) | Mo$K_\alpha$ ($\lambda$ = 0.71073) |
| Crystal system | Monoclinic |
| Space group | C2/m |
| a/Å | 25.452(2) |
| b/Å | 22.863(2) |
| c/Å | 7.1798(6) |
| $\alpha$/° | 90 |
| $\beta$/° | 102.325(6) |
| $\gamma$/° | 90 |
| Crystal size/mm$^3$ | 0.43 × 0.14 × 0.12 |
| Volume/Å$^3$ | 4081.7(6) |
| Z | 2 |
| $\rho_{calcd}$ (g. cm$^{-3}$) | 1.164 |
| $\mu$ (mm$^{-1}$) | 0.195 |
| F(000) | 1500 |
| 2θ range for data collection (°) | 5.96 to 50.04 |
| h/k/l | $-30 \le h \le 30$, $-27 \le k \le 27$, $-8 \le l \le 8$ |
| Reflections collected | 21748 |
| Independent reflections | 3692 [$R_{int}$ = 0.0572, $R_{sigma}$ = 0.0449] |
| Data/restraints/parameters | 3692/33/247 |
| Goodness-of-fit on $F^2$ (S) | 1.036 |
| Final R indices [I > 2σ(I)] | $R_1$ = 0.0769, $wR_2$ = 0.2197 |
| R indices (all data) | $R_1$ = 0.1108, $wR_2$ = 0.2485 |
| Largest diff. peak/hole/e Å$^{-3}$ | 0.47/−0.38 |

TABLE 7

Hydrogen bond parameters (in Å and °) for GTUB-5.

| D-H . . . A | d(D-H) | d(H . . . A) | d(D-H . . . A) | ∠ D-H . . . A |
|---|---|---|---|---|
| O1—H1A . . . O5$^i$ | 0.82 | 1.74 | 2.450(6) | 144.05 |
| O3—H3 . . . O2$^{ii}$ | 0.85 | 1.68 | 2.522(5) | 171.88 |
| N3—H3B . . . O4$^{iii}$ | 0.89 | 2.06 | 2.945(13) | 170.41 |
| N3—H3C . . . O5$^{iv}$ | 0.89 | 2.08 | 2.956(12) | 167.22 |

Symmetry codes: (i) 3/2 − x, 3/2 − y, 1 − z; (ii) 3/2 − x, 3/2 − y, 2 − z; (iii) 3/2 − x, −1/2 + y, 1 − z; (iv) 3/2 − x, 3/2 − y, −z.

Figure 10:
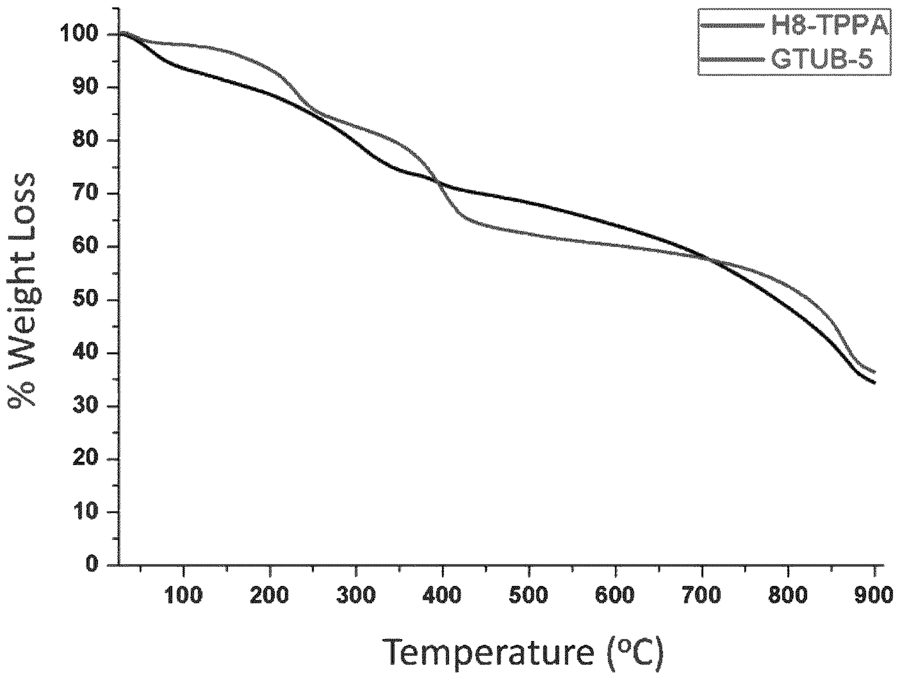
FIG. 10: Thermogravimetric curves of $H_8$TPPA and GTUB-5 between room temperature and 700° C. with a heating rate of 10° C./min.

Thermogravimetric analysis (TGA). TGA on GTUB-5 was performed using a Mettler-Toledo TGA/DSC STARe System at a heating rate of 10 K min$^{-1}$ under an atmosphere of dry argon over a range from 50 to 700° C. (FIG. 10).

Figure 11:
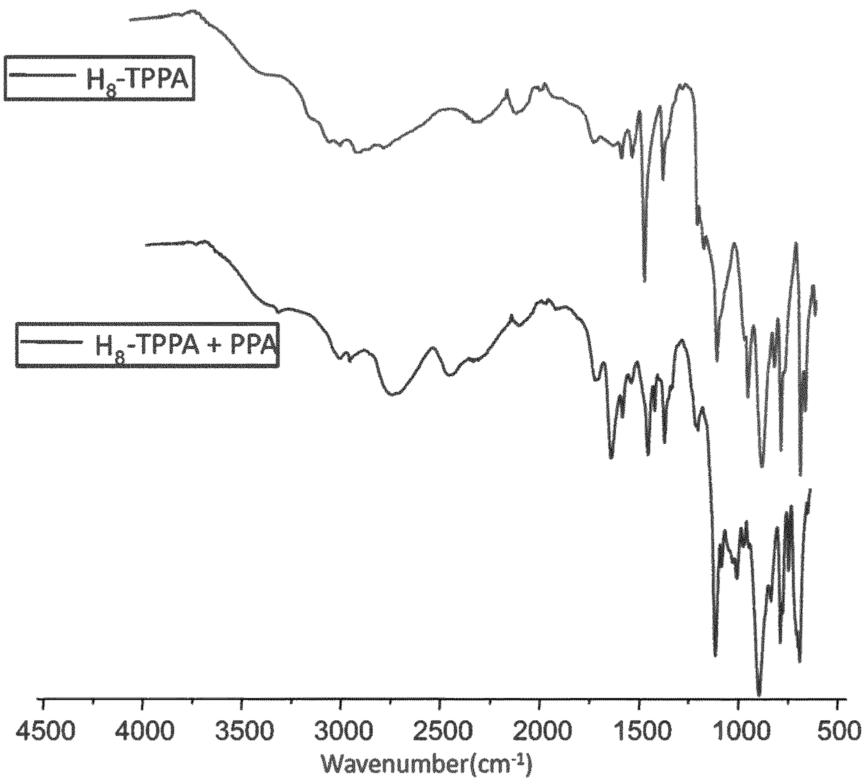
FIG. 11: FT-IR spectra of $H_8$-TPPA and $H_8$TPPA-PPA (GTUB-5).

Spectroscopy. IR spectra of $H_8$TPPA and GTUB-5 were recorded between 4000 and 550 cm$^{-1}$ using a Perkin Elmer Spectrum 100 FT-IR spectrometer with an attenuated total reflection (ATR) accessory featuring a zinc selenide (ZnSe) crystal (FIG. 11).

Figure 12:
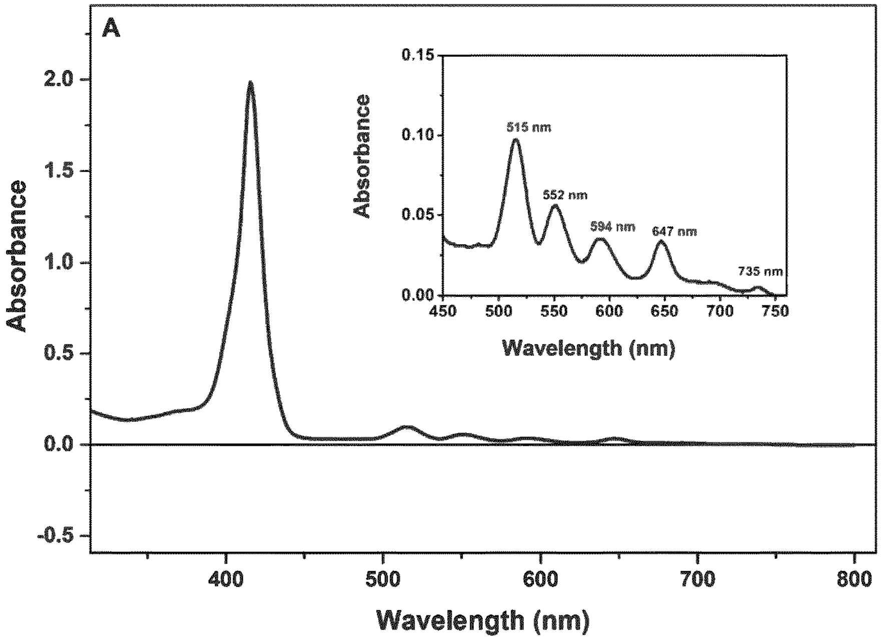
FIG. 12: UV-Vis spectrum of GTUB-5 in DMSO.

The solid-state diffuse reflectance ultraviolet-visible (UV-Vis) spectrum of GTUB-5 crystals was collected on a Varian Cary 300 UV-Vis Spectrophotometer (FIG. 13) and the corresponding solution spectrum was collected using a Varian Eclipse spectrofluorometer with 1-cm path length cuvettes at room temperature in DMSO (FIG. 12).

Figure 14:
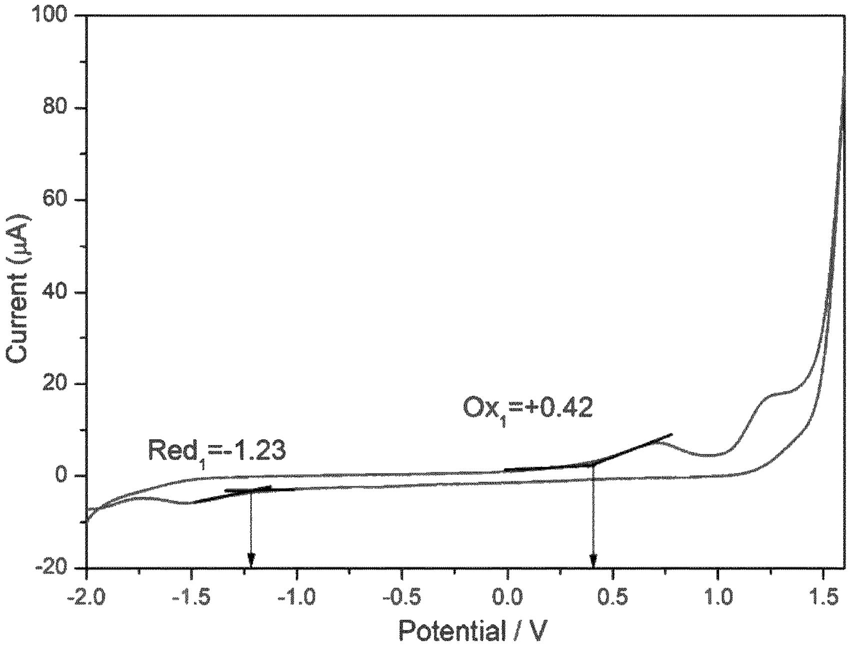
FIG. 14: Cyclic voltammetry of GTUB-5.

The HOMO-LUMO gap of GTUB-5 was extracted using cyclic voltammetry (see FIG. 14).[84] From the measurement, the first oxidation and reduction potentials of GTUB-5 in DMSO were determined to be 0.42 V and −1.23 V, which gives rise to a HOMO-LUMO gap of 1.65 eV.

Figure 15:
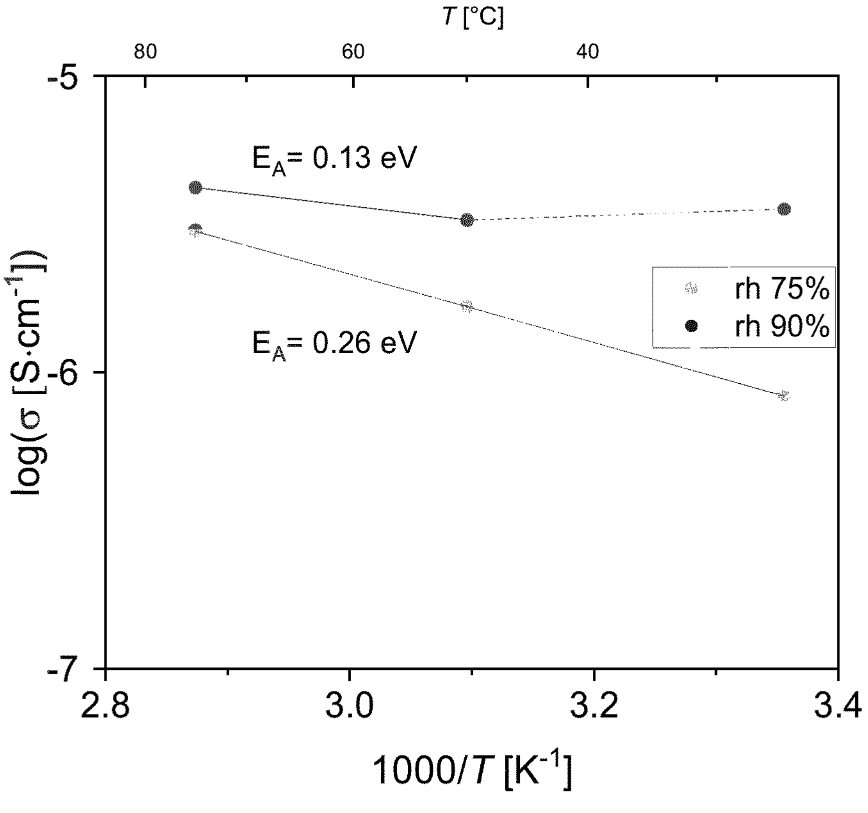
FIG. 15: Proton conductivity of GTUB-5.
Figure 16:
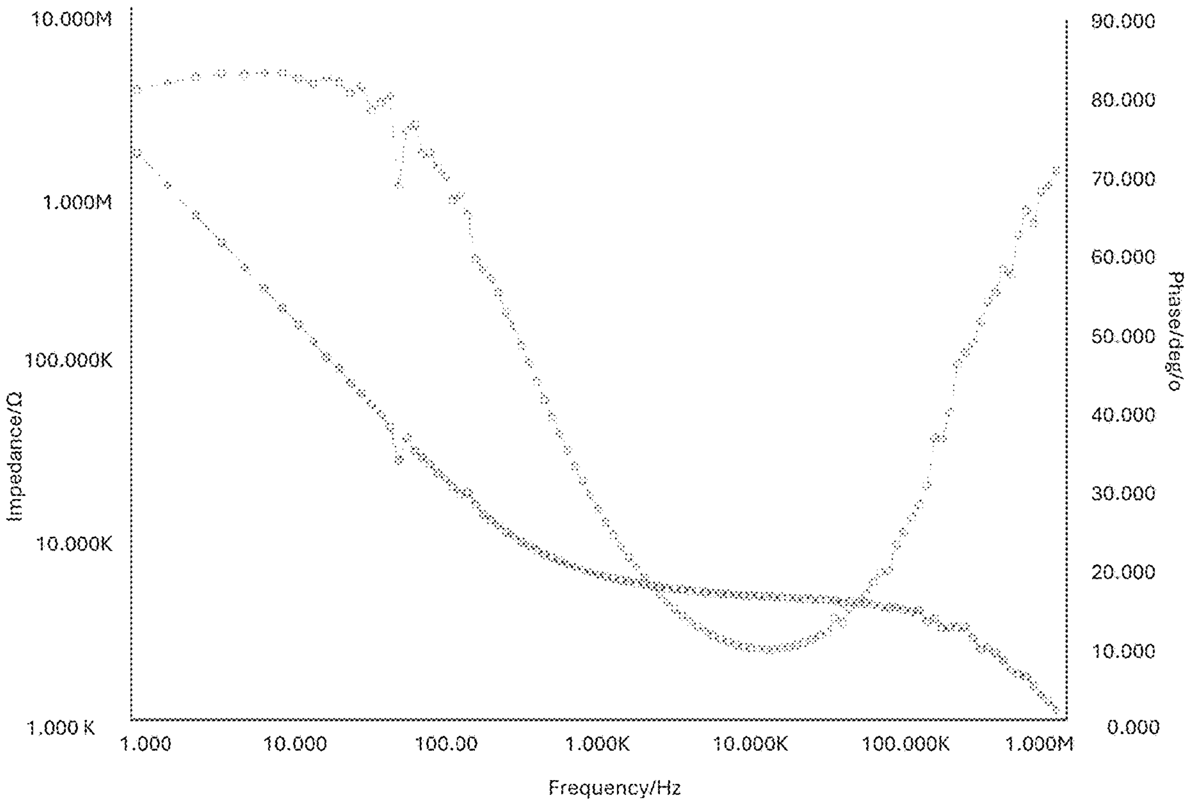
FIG. 16: Bode plot of GTUB-5 at 75° C. 90% rh. Increase font size of all axis labels.

Proton conductivity measurement. The proton conductivity of GTUB-5 was determined by electrochemical impedance spectroscopy (FIGS. 15 and 16). A Zahner Zennium electrochemical workstation was used with an oscillation voltage of 10 mV over a frequency from 1 to $10^6$ Hz. The needles were compressed between two glassy carbon electrodes by a torque of 30 cNm to obtain pellets of 82 mm in diameter and approx. 0.114 mm thickness. The stack was placed in a PTFE sample holder. The sample holder was placed in a stainless-steel chamber with an attached water reservoir. The relative humidity (% rh) was determined by the Clausius-Clapeyron relation and controlled by heating the cell and water reservoir. The sample is held overnight at the desired % rh and temperature before measuring each data point. To ensure reproducibility, each data point was measured three times.

Figure 17:
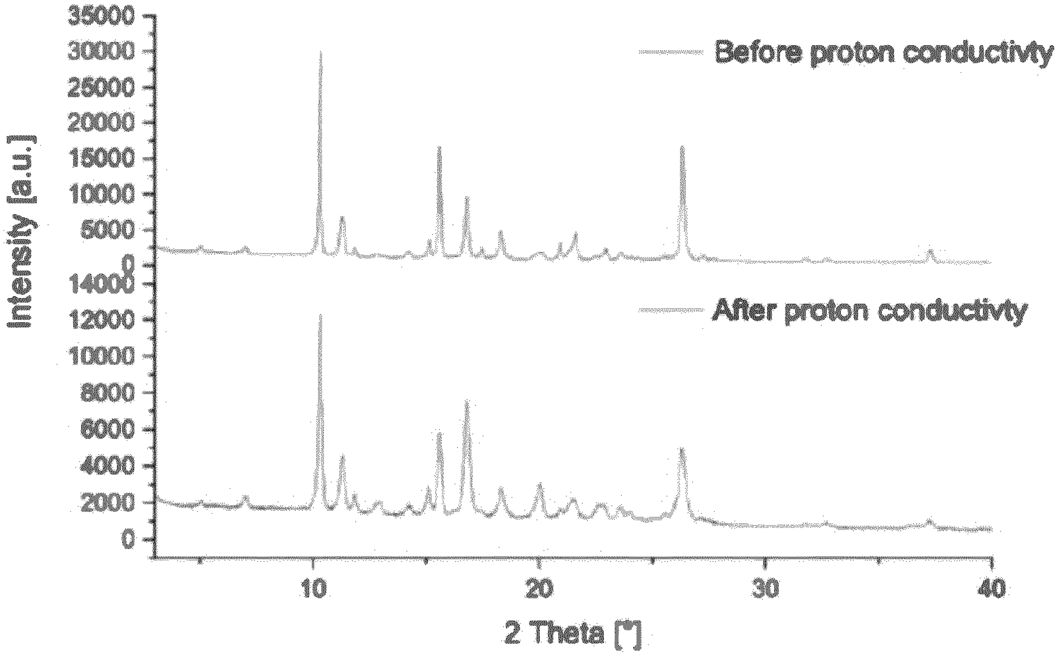
FIG. 17: Powder x-ray diffraction of GTUB-5 before and after the proton conductivity experiment.

Powder x-ray diffraction. PXRD patterns of the GTUB-5 sample were measured on a PANalytical X'pert PRO theta-theta x-ray diffractometer (Mavern Panalytical B.B., Almelo, Netherlands) operation at 40 kV and 40 mA, before and after the proton conductivity experiment (FIG. 17). The sample was placed on a silicon zero background sample holder. Measurements were performed in the range of 3-50 2θ° with a step size of 0.026 2θ° and a counting time of 246.840 s. The results of the measurements were processed with the software Highscore plus version 4.8.

Description of the Examples

GTUB5 as described in the present examples is the first HOF to be described with both semiconductive and proton-conductive behaviour. Thermally stable and permanently microporous semiconducting HOFs of the present invention could revolutionize the design of supercapacitors and electrodes due to their simpler chemistry compared to the MOFs. Herein, the first example of a HOF (known as GTUB5), synthesized using phosphonic acid functional groups R—$PO_3H_2$, which simultaneously exhibits electrical conductivity, proton conductivity, and high thermal stability, is described.

Figure 9A:
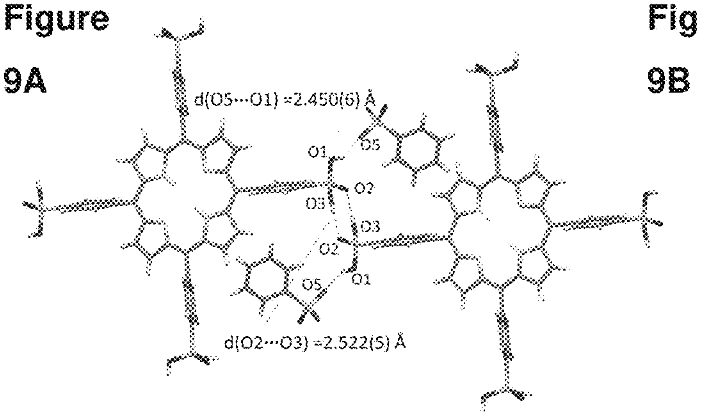
FIG. 9: (A) Portion of hydrogen-bonded network of GTUB5. View of hydrogen bonding interactions between PPA and $H_8$-TPPA linkers. (B) Depiction of hexagonal void spaces in GTUB5. Two-dimensional hydrogen-bonded layers constructed from hydrogen bonding interactions between PPA and $H_8$-TPPA linkers. (C) Layer structure of GTUB5. Three-dimensional hydrogen-bonded framework of GTUB-5 along the c-axis. (D) One-dimensional hydrogen-bonded building unit of GTUB5. View of one-dimensional infinite hydrogen-bonded chain.

As seen in FIG. 9A, phosphonic acid functional group has two protons and one oxygen from the P═O bond, which allow them to form multiple hydrogen bonds between each other and thereby stabilize the resulting HOF. Interestingly, the unique structure and multiple metal binding modes of the phosphonic acid functional group have led to some of the most thermally[34, 43-46] and chemically stable[34, 47-49] MOFs in the literature. The phosphonic acid functional group R—$PO_3H_2$ involves two deprotonation modes with pKa values of 1.7 and 7.4, respectively. Therefore, in order to create the first phosphonate HOF in the literature, we have adopted a novel crystallization method at pH values between 1.7 and 7.4 with mixed phosphonic acid linkers of phenylphosphonic acid (PPA) and 5,10,15,20-tetrakis[p-phenylphosphonic acid] porphyrin ($H_8$-TPPA) to ensure that at least one of the phosphonic acid moieties is not fully deprotonated. $H_8$-TPPA exhibits a planar tetratopic geometry with a 90° angle between the phenylphosphonate tethers[49-51]. Therefore, it is expected that within the mixed linker strategy $H_8$-TPPA and phenylphosphonic acid could produce two-dimensional HOFs with hexagonal void channels.

The $H_8$-TPPA linker was synthesized according to our previously reported method involving a Pd-catalyzed Arbuzov reaction[50] in order to avoid the porphyrin core being occupied by Ni(II) after nickel catalyzed Arbuzov reaction[49, 51]. The synthesized metal free $H_8$TPPA linker eliminated the possibility of potential metal-ligand interactions that could have triggered the formation of MOFs. Due to the ionic radius of Pd and its charge, it is relatively difficult for Pd to coordinate to the nitrogen atoms in the central porphyrin core after the synthesis of $H_8$TPPA. Therefore, this strategy allows the production of metal free $H_8$TPPA, which makes the introduction of variety of transition metal ions into porphyrin core possible. The identity of the metal ions in the porphyrin and phthalocyanine cores could be used to perform band gap modulations to optimize the conductive behavior of HOFs.

Figure 9B:
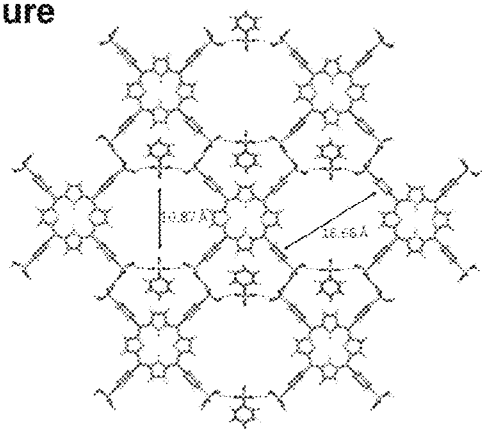
Figure 9C:
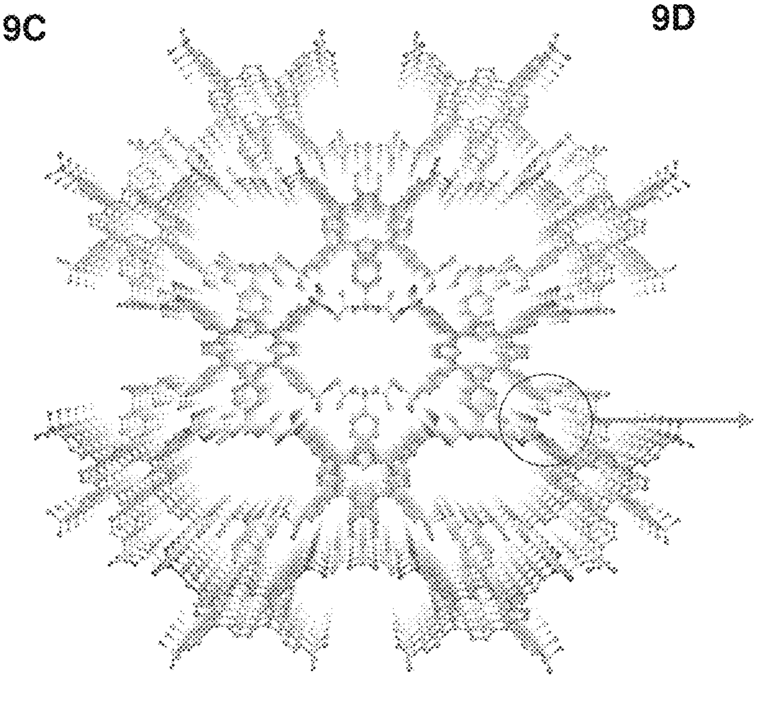
Figure 9D:
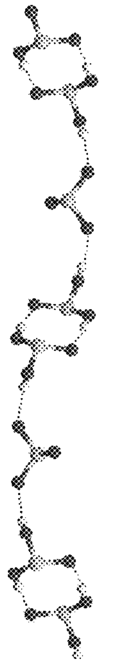

GTUB5 was synthesized following conventional MOF crystallization methods in scintillation vials in DMF/EtOH and at pH between 1.7 and 7.44 to ensure the presence of protonated phosphonic acid functional groups[32]. 1.7 and 7.44 correspond to pKa1 and pKa2 of phenylphosphonic acid respectively. When pH value is equal to the pKa of an acid molecule, the acid molecule is considered to be half deprotonated. The synthesis of GTUB5 gave 1-2 mm dark purple long needle-shaped crystals in almost 100% yield. The dark purple color of GTUB5 is an indication of its conductive behavior. The structure of GTUB5 was characterized using single crystal X-ray diffraction. As seen in FIGS. 9A and 9B, GTUB5 is composed of two-dimensional sheets of hydrogen-bonded $H_8$-TPPA and phenyl phosphonic acid moieties. The structure contains two different hydrogen bonding patterns, which are observed between different $H_8$-TPPA units and between $H_8$-TPPA and phenylphosphonic acid (see FIG. 9D). In the first pattern, the P═O bond from the $H_8$-TPPA unit is exclusively involved in creating the (almost linear) double hydrogen bonding pattern between each unit. In the second pattern, the hydrogen bond forms between the second protonated hydroxyl group of the $H_8$-TPPA and deprotonated $PPA^{2-}$ (where PPA=phenylphosphonic acid). The four DMF solvents in the HOF structure acted as a Lewis base acquiring the PPAs' protons.

The Brunauer-Emmett-Teller (BET) surface area of GTUB5 was estimated to be 422 $m^2 g^{-1}$ from a simulated $N_2$ adsorption isotherm at 77 K (see FIG. 3) obtained using the grand canonical Monte Carlo method.

Figure 13:
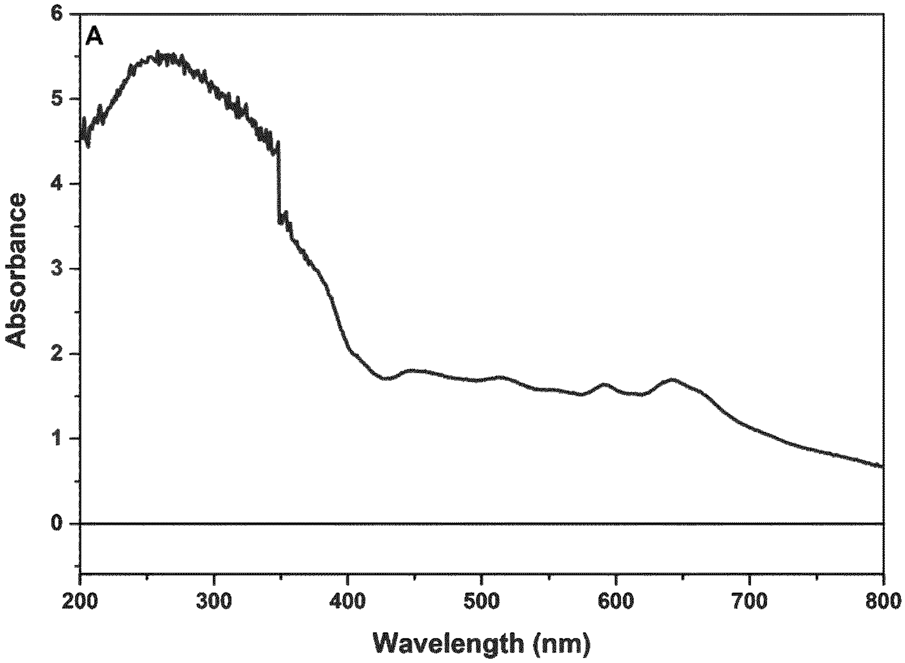
FIG. 13: Solid-state UV-Vis spectrum of GTUB-5.
Figure 18:
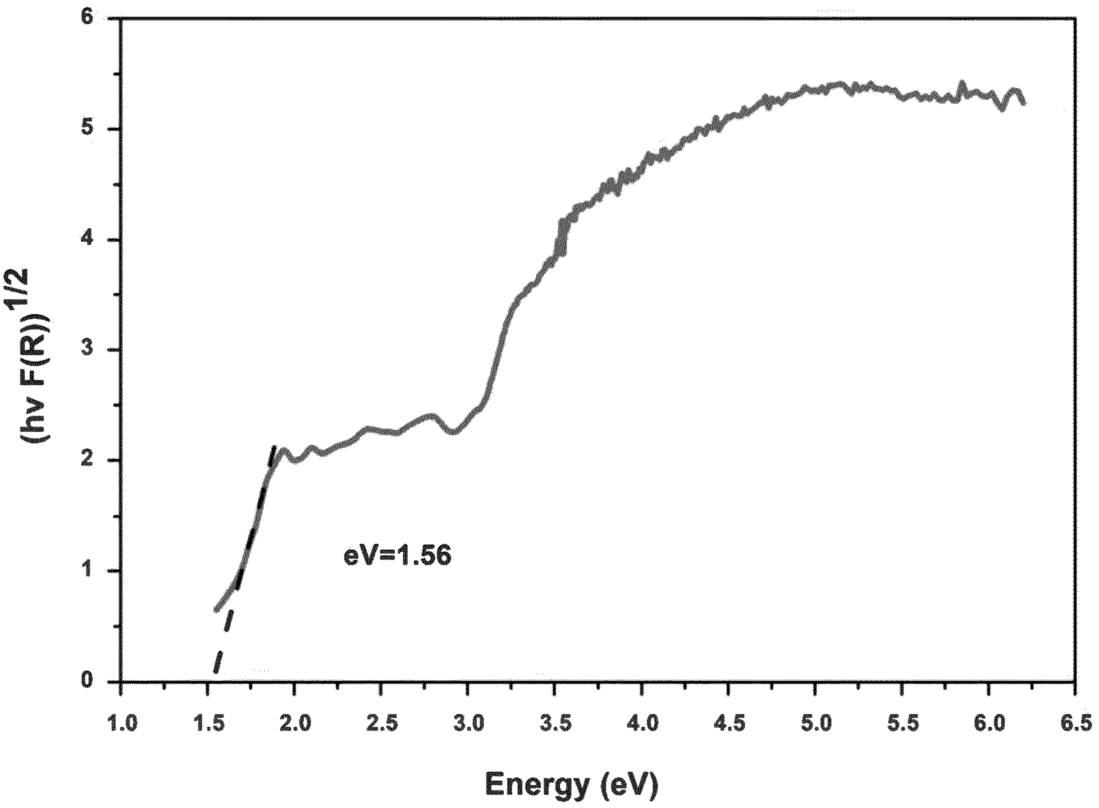
FIG. 18: Tauc plot from the solid-state UV-Vis spectrum of GTUB5, showing a band gap of 1.56 eV. The second jump at 2.88 eV corresponds to the Soret band of the porphyrin core at 430 nm.

The band gap was estimated from a solid-state diffuse reflectance UV-Vis spectrum of the GTUB5 crystals (see FIG. 13). As seen in FIG. 18, the Tauc plot derived from the spectrum yields a narrow band gap of 1.56 eV. The second jump at 2.88 eV corresponds to the Soret band of the porphyrin core at 430 nm. A similar band gap of 1.65 eV was also obtained from a UV-Vis spectrum of a dissolved sample of GTUB5 in DMSO (see FIG. 12), suggesting that the hydrogen-bonded supramolecular structure of the HOF is not disrupted in a polar aprotic solvent. From a cyclic voltammetry measurement on GTUB5 in DMSO (see FIG. 14), the first oxidation and reduction potentials were measured to be 0.42 V and −1.23 V, respectively, yielding a HOMO-LUMO gap of 1.65 eV supporting this hypothesis. Such properties make GTUB5 and phosphonic acid HOFs, superior compounds to be used in printed electronics.

Figure 19:
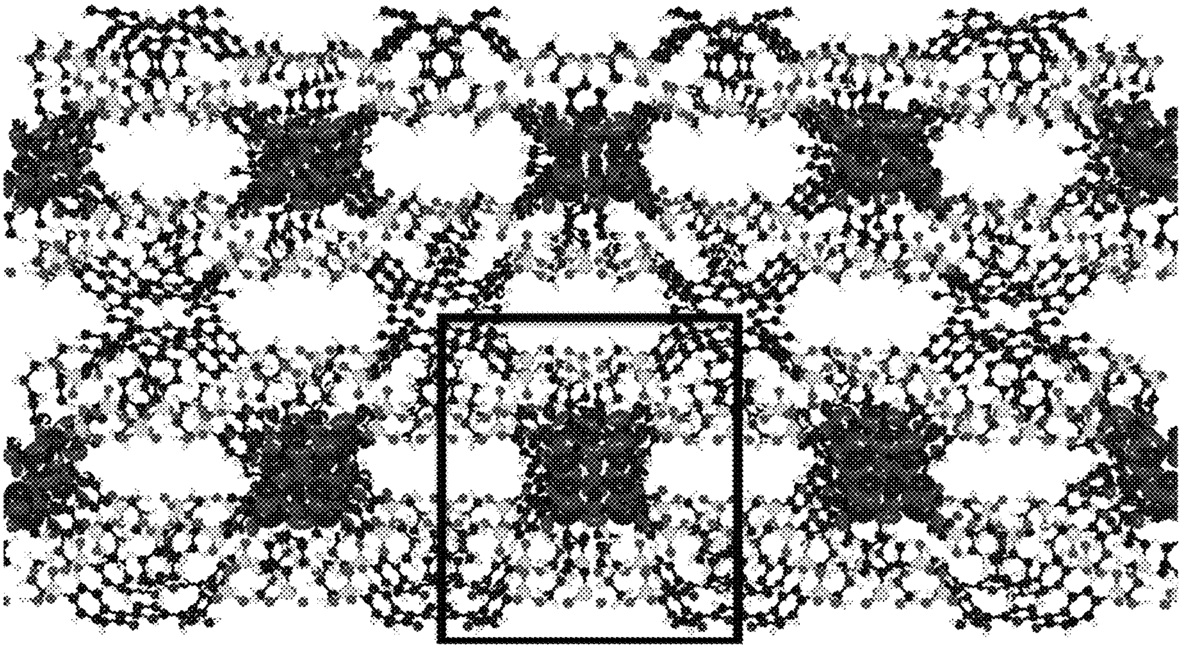
FIG. 19: Periodic representation of GTUB5, with the unit cell indicated by the black box. This represents the HOMO iso-surface corresponding to an electron density of 0.01 electrons per Å$^3$ (negative and positive phases are shown in red and blue, respectively). (O—red; N—blue; P—yellow; C—black; H—white).

Semiconductivity of GTUB5. To gain insight into the semiconductive nature of GTUB5, we performed density functional theory (DFT) calculations. The details of the calculations, employing hybrid Gaussian plane-wave (GPW) basis sets, can be found in the supplementary materials. FIG. 19 shows a periodic representation of the optimized geometry, which is in close agreement with the experimental crystal structure (see Table 5 and FIGS. 4-7). A single point calculation on the optimized structure yields a band gap of 1.65 eV, in very good agreement with the experimental result of 1.56 eV. As seen in FIG. 19, the HOMO and LUMO are predominantly localized on some of the porphyrins within the supercell (of which, a single unit cell is delineated by the black rectangle), but not all of them; with the LUMO occupying the same porphyrins as the HOMO.

Figure 20A:
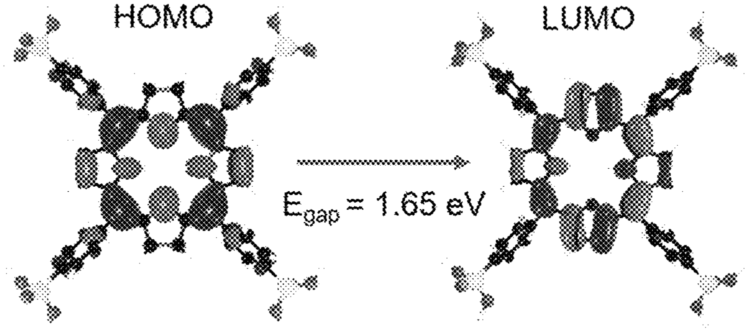
FIG. 20: HOMO and LUMO iso-surfaces, corresponding to an electron density of 0.01 electrons per Å$^3$. (A) Top view. (B) Side view. Red/blue correspond to the negative/positive phases. (O—red; N—blue; P—yellow; C—black; H—white).
Figure 20B:
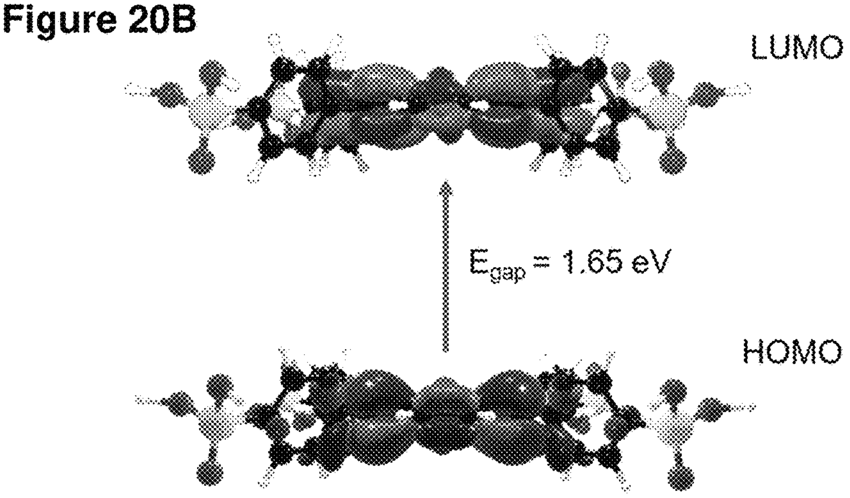
Figure 21:
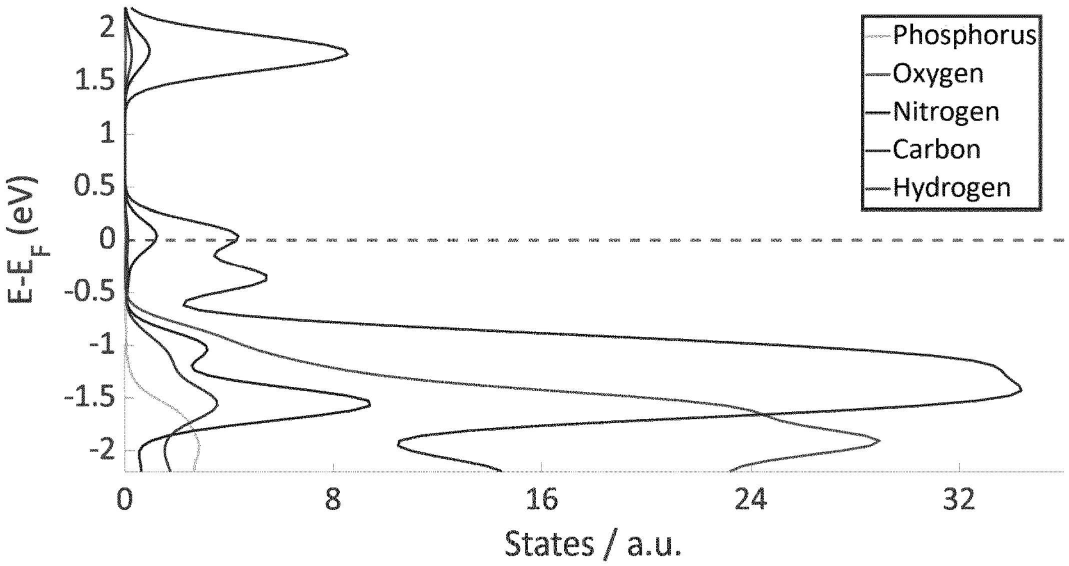
FIG. 21: Projected density of states (pDOS) for P, O, N, C, and H in GTUB5, generated using scripts from Ref. 51.
Figure 22:
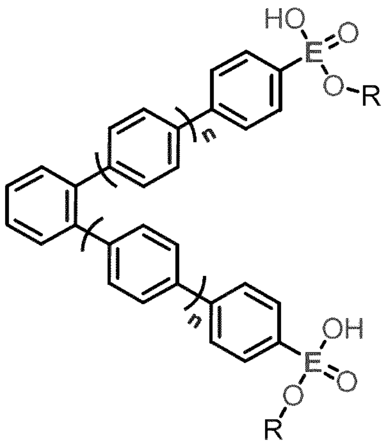
FIG. 22: Preferred examples of organic linkers of the HOFs of the invention comprising different geometrical cores. (A) V, (B) L, (C-D) T, (E-G) X, (H) Y shaped and (I) hexagonal linkers with extending tether arms, wherein X=C or Si; E=P or As; n=0,1,2, 3 or 4; R=H, methyl, ethyl or isopropyl.
Figure 22:
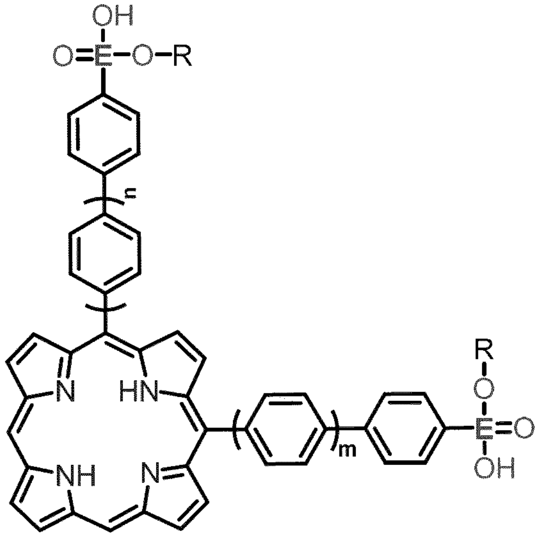
Figure 22:
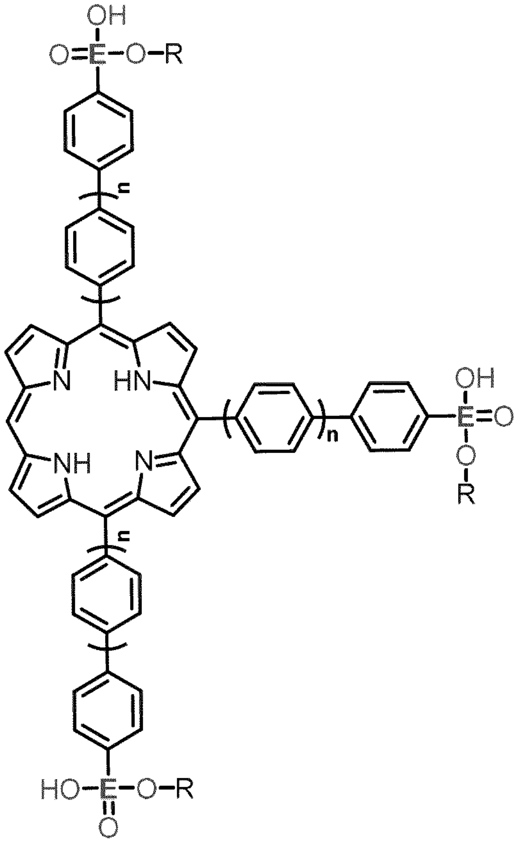
Figure 22:
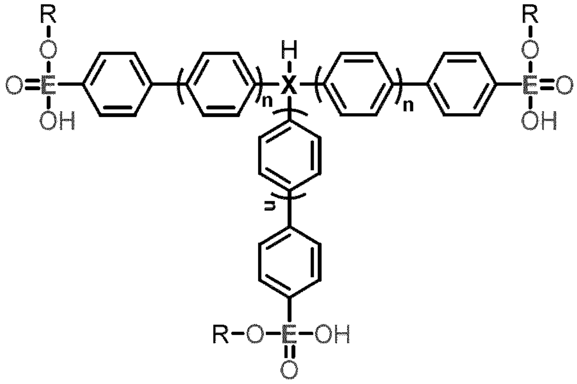
Figure 22:
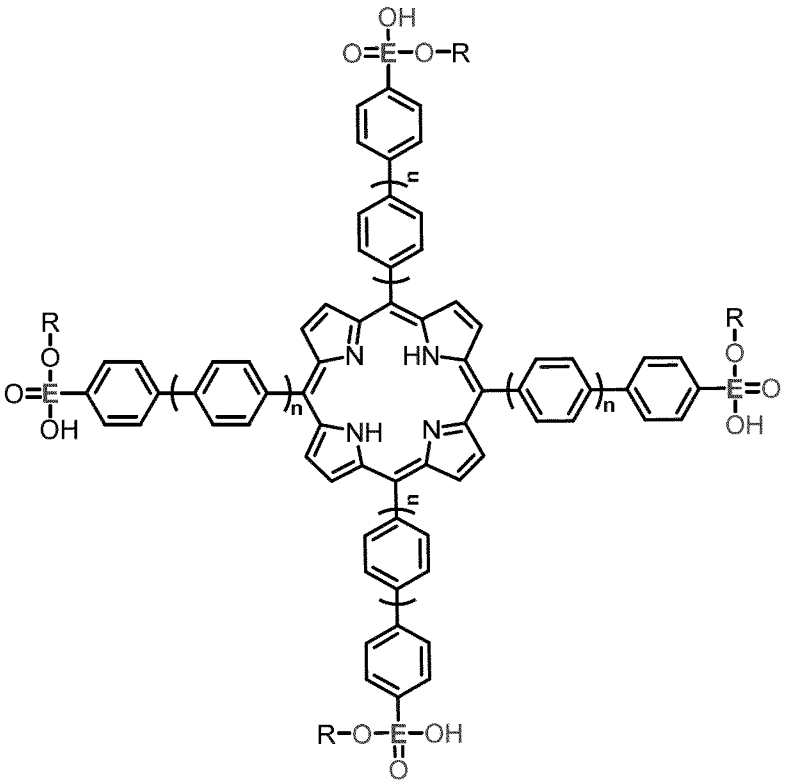
Figure 22:
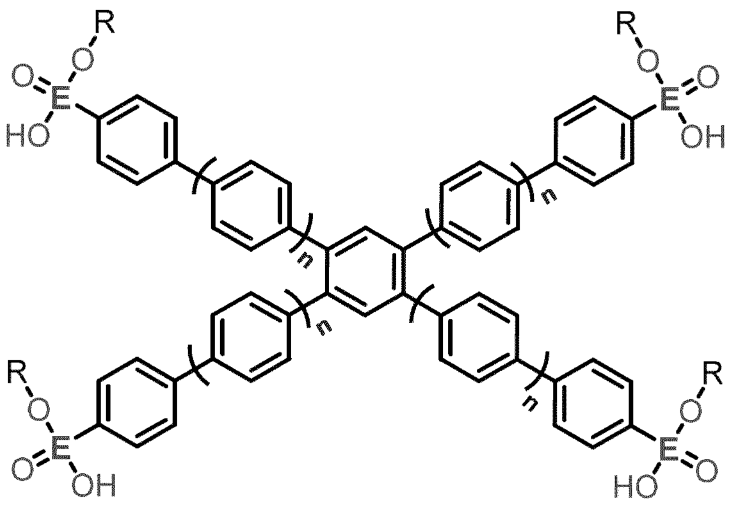
Figure 22:
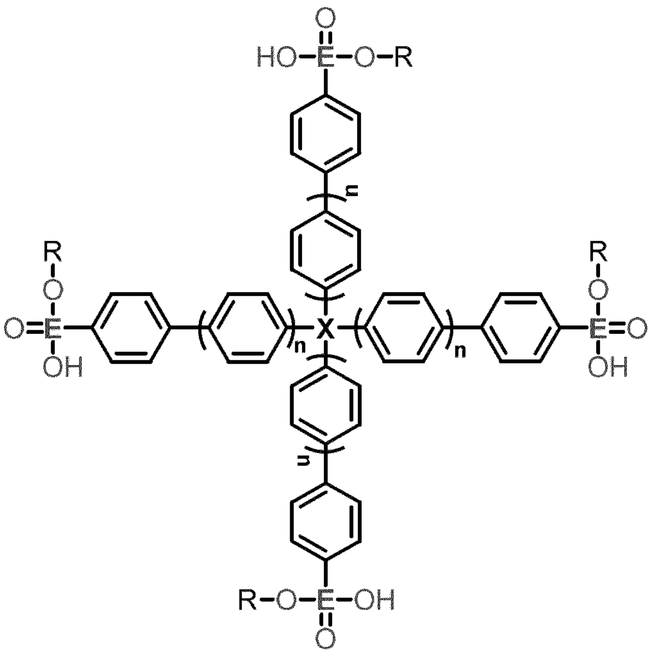
Figure 22:
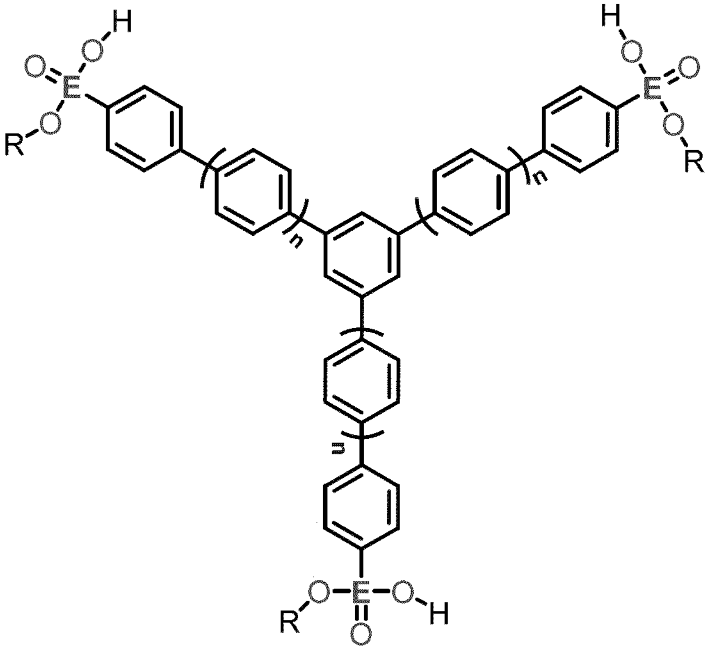
Figure 22:
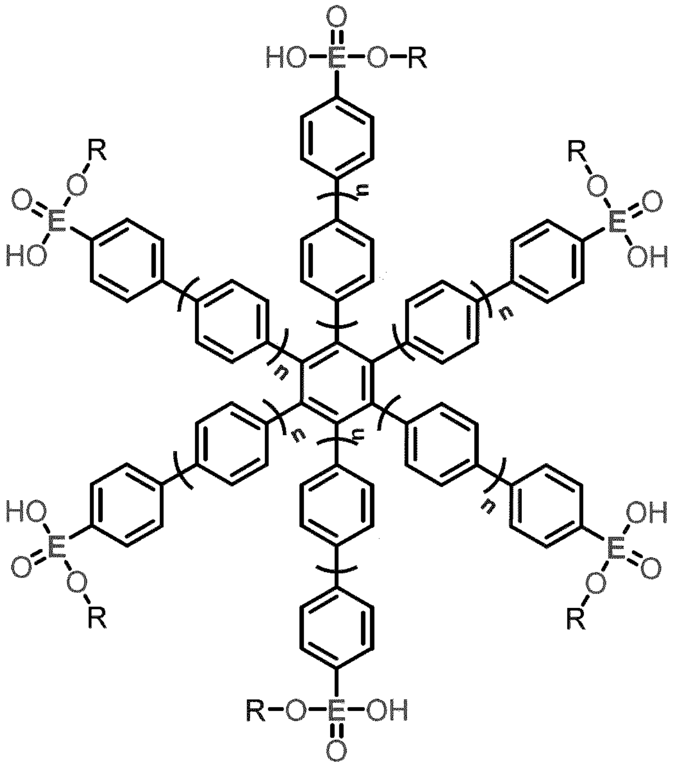
Figure 23:
FIG. 23: (A) Crystal structure of the one-dimensional hydrogen-bonded building unit of "HOF1" constructed using $H_8$TPPA as a sole organic linker. (B) The void channels and two-dimensional network of "HOF1" constructed using $H_8$TPPA as a sole organic linker. The HOF displayed in this figure (termed "HOF1") was synthesized by heating $H_8$TPPA in a solution of N-methyl-2-pyrrolidone (NMP) and ethanol at 80° C. in scintillation vials.
Figure 23:
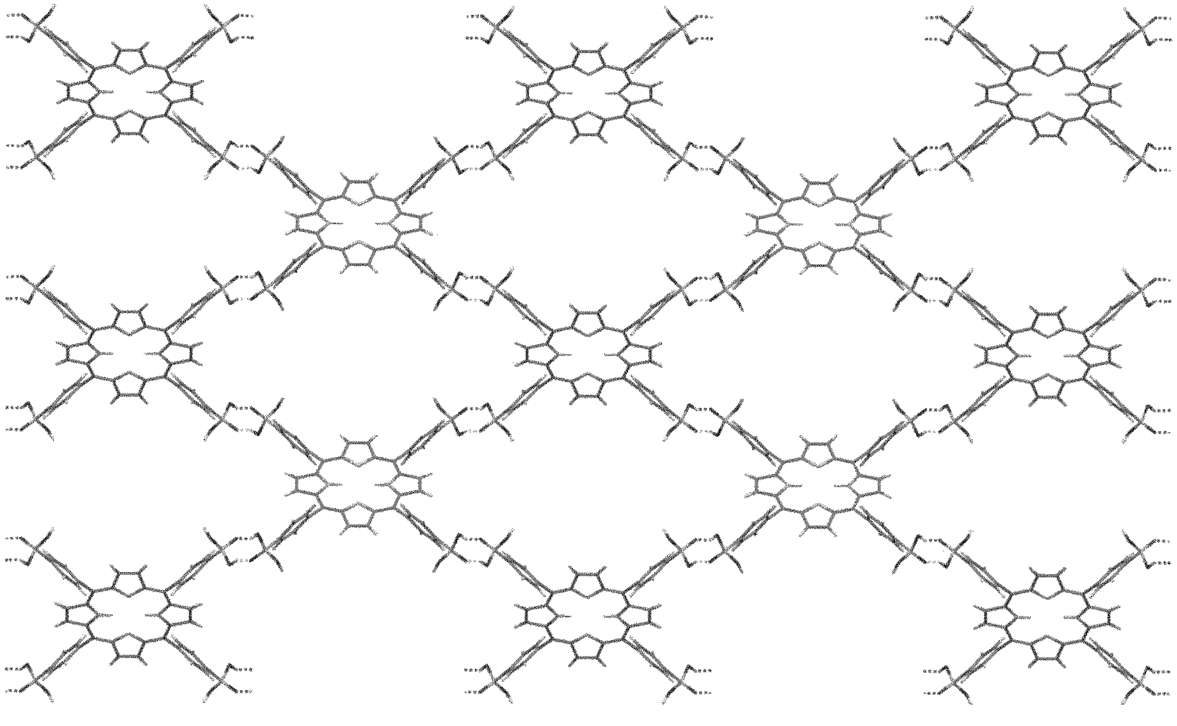
Figure 24:
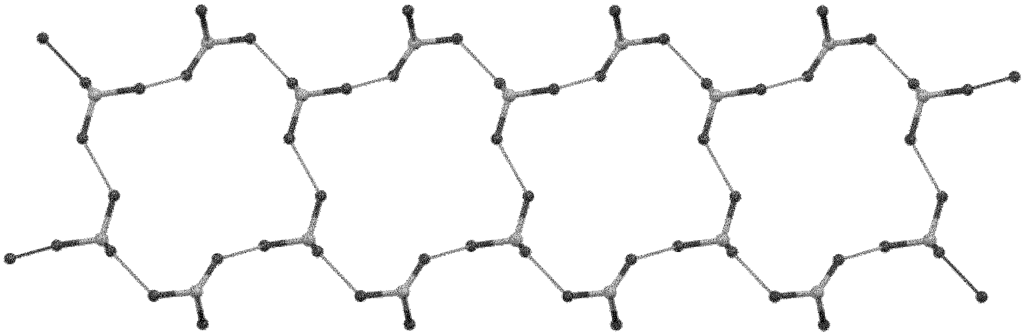
FIG. 24: (A) Crystal structure of the one-dimensional hydrogen-bonded building unit of "HOF2" constructed using $H_8$TPPA as a sole organic linker. The hydrogens are omitted in the structure. (B) The void channels and view of a two-dimensional layer of "HOF2", which are connected by the one-dimensional hydrogen bonded building unit in FIG. 24A to form the three-dimensional HOF2. HOF2 is constructed using $H_8$TPPA as a sole organic linker. The HOF displayed in this figure (termed "HOF2") was synthesized by heating $H_8$TPPA in a dimethylacetamide and ethanol solution mixture at 80° C. for two days in scintillation vials. Phenylphosphonic acid was added to the solution mixture as a modulator. Hydrogen atoms between dashed line connected oxygens in FIGS. 24A and 24B are omitted in the structure for clarity.
Figure 24:
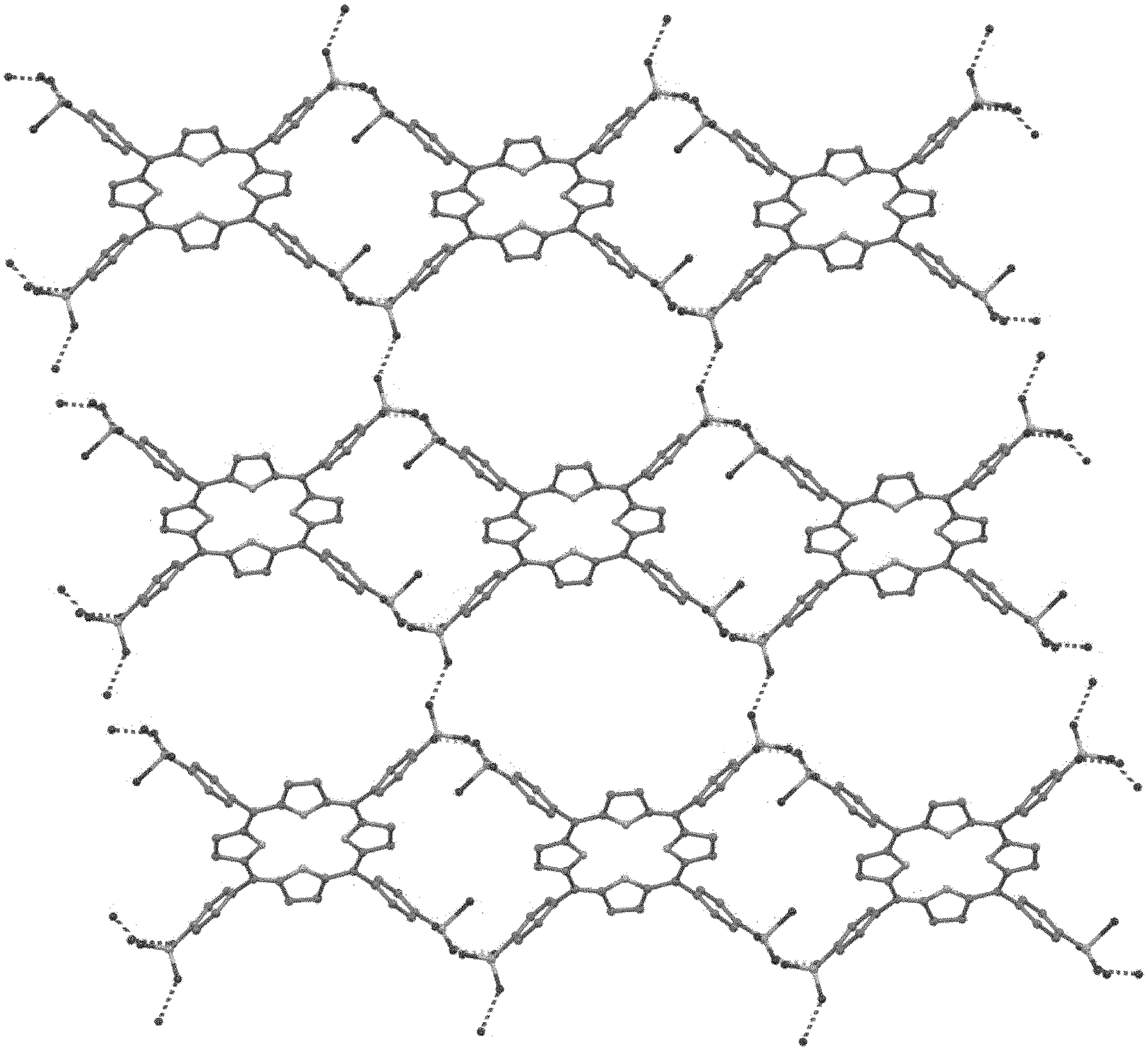

Focusing in on the portions of the structure that have significant HOMO and LUMO density, we see that the HOMO and LUMO are localized on the same porphyrin (see FIG. 20). Moreover, they are mostly confined to a subset of the carbons and nitrogens. The HOMO is composed of π orbitals mostly on $sp^2$ hybridized carbons and nitrogens, while the LUMO is composed of π* orbitals on some of the $sp^2$ carbons and nitrogens. As shown in Table 8, ~75% of the HOMO and LUMO orbital contributions are from the carbon and nitrogen 2p orbitals of the porphyrin. Table 8 also shows that a HOMO-LUMO transition would lead to an increase in the carbon $2p_x$ orbital population, a slight decrease in the carbon $2p_y$ population, and a slight increase in the carbon $2p_z$ population; while the nitrogen $2p_x$ and $2p_z$ populations both decrease (the $2p_y$ population remains negligible). These results suggest that the semiconductive nature of GTUB5 is predominantly determined by π-π* transitions involving orbitals localized on some of the porphyrin carbons and nitrogens. Inspection of the projected density of states (pDOS) confirms that the HOMO-LUMO gap is predominantly due to orbitals localized on carbons and nitrogens (see FIG. 21).

TABLE 8

Contributions from the 2p orbitals on the porphyrin carbons and nitrogens to the HOMO and LUMO.

| Carbon | $2p_x$ | $2p_y$ | $2p_z$ | Sum |
|---|---|---|---|---|
| HOMO | 0.366 | 0.042 | 0.134 | 0.541 |
| LUMO | 0.484 | 0.020 | 0.170 | 0.674 |
| **Nitrogen** | $2p_x$ | $2p_y$ | $2p_z$ | |
| HOMO | 0.163 | $4.70 \times 10^{-07}$ | 0.053 | 0.216 |
| LUMO | 0.048 | $5.22 \times 10^{-4}$ | 0.020 | 0.067 |

Thermogravimetric analysis. Thermogravimetric analysis (TGA) indicates an initial 2% loss between 50 and 100° C. suggesting that remaining solvent molecules evaporating. The following ca. 12% step until 250° C. corresponds to the unbound solvent molecules of DMF (12.9% calculated). The remaining organic components of GTUB5 decompose in two steps until 900° C. The presence of large weight loss at ca. 900° C. suggests the formation of thermally stable other species at temperatures above 400° C.

Proton conductivity of GTUB5. Given the presence of $—PO_3H_2$ groups in its hydrogen-bonded framework, the proton conductivity of GTUB5 was measured. Electrochemical impedance spectroscopy measurements were carried out at 75% and 90% relative humidity (% rh) and temperatures in the range of 25 to 75° C. (see supplementary materials and Ref. 53 for setup details). At 75% rh, we see that the proton conductivity of GTUB5 increases from $8.29 \cdot 10^{-7}$ to $3.00 \cdot 10^{-6}$ S $cm^{-1}$ as the temperature is increased from 25 to 75° C., while a non-monotonic increase is observed at 90% rh (see Table 9 for full data set).

TABLE 9

Proton conductivities and activation energies ($E_A$) of GTUB5 at different relative humidities.

| Relative humidity [% rh] | | 75 | 90 |
|---|---|---|---|
| | 25° C. | $8.29 \cdot 10^{-7}$ | $3.55 \cdot 10^{-6}$ |
| Conductivity [S $cm^{-1}$] | 50° C. | $1.67 \cdot 10^{-6}$ | $3.26 \cdot 10^{-6}$ |
| | 75° C. | $3.00 \cdot 10^{-6}$ | $4.20 \cdot 10^{-6}$ |
| $E_A$ [eV] | | 0.26 | 0.13 |

Furthermore, at a given temperature, we observe an increase in the proton conductivity with increasing relative humidity. The activation energies, as sum of the migration energy and the formation energy of defects, were extracted from the slopes of the Arrhenius plots (see FIG. 15) to be $E_A$=0.26 eV and $E_A$=0.13 eV at 75° C. and 90° C., respectively. These low activation energy values suggest that a Grotthuss mechanism with high proton movability and therefore low migration energy is the predominant mechanism for proton conduction through the framework. As seen in FIG. 17, the XRD pattern of the sample recorded before and after the proton conductivity experiments slightly changes, indicating that the structure was slightly affected by the humidified atmosphere and the applied temperatures up to 75° C. during the measurements.

Conclusion of the Examples

In conclusion, GTUB5 represents the first member of a novel family of two-dimensional, microporous phosphonic acid HOFs with calculated surface area of 422 $m^2$/g. Given its low band gap (as confirmed by solid-state/solution measurements and DFT calculations), GTUB5 paves the way for the creation of new semiconductive microporous compounds. Within the context of semiconductive microporous compounds, GTUB5 is the first HOF in the literature exhibiting such a small band gap.

The use of hydrogen bonds in constructing a framework comes with the advantage of less complex connectivity options and eliminate the presence of toxic metal ions in capacitors and batteries providing environmentally friendlier solutions.

Among, other HOFs, due to the tetrahedral geometry and the presence of three oxygen atoms, phosphonic acid HOFs provide more structural diversity and further potential applications. Phosphonic acids have d orbitals, which provides additional properties to the HOF compounds and interactions with the organic core. In addition to its narrow band gap within the semiconductive region, GTUB5 exhibits proton conductive behavior as well. Based on the present example, different linker geometries and pH modulations can be designed by a person skilled in the art to further optimize the pore sizes and conductive behavior of phosphonic acid-HOFs. Given the high surface area and narrow band gap of GTUB5, phosphonate-HOFs have the potential to revolutionize the semiconductive materials industry with applications in electrodes and suparcapacitors, optoelectronics, solar panels. Such HOFs could be further used in thin films on surfaces, optoelectronic applications, solar panels, printed electronics such as screen printing, flexography, gravure, offset lithography, and inkjet. Furthermore, such HOFs could be used to construct active or passive devices such as thin film transistors, coils, resistors. Semiconductive HOFs would provide important advantages due to their simpler chemistry and solubilities compared to the MOFs.

REFERENCES

1 Li, H.; Eddaoudi, M.; O'Keeffe, M.; Yaghi, O. M.; Design and synthesis of an exceptionally stable and highly porous metal-organic framework. *Nature* (1999), 402, 276-279.

2 Lohse, D. L.; Sevov, S. C.; $Co_2(O_3P—CH_2—PO_3).H_2O$: A novel microporous diphosphonate with an inorganic framework and hydrocarbon-lined hydrophobic channels. *Angew. Chem., Int. Ed. Engl* (1997), 36, 1619-1621.

3 Poojary, D. M.; Zhang, B.; Clearfield, A., Pillared layered metal phosphonates. Syntheses and x-ray powder structures of copper and zinc alkylenebis(phosphonates). *J. Am. Chem. Soc.* (1997), 119, 12550-12559.

4 Mason, J. A.; Veenstra, M.; Long, J. R.; Evaluating metal-organic frameworks for natural gas storage. *Chem. Sci.* (2014), 5, 32-51.

5 Miller, S. R.; Pearce, G. M.; Wright, P. A.; Bonino, F.; Chavan, S.; Bordiga, S.; Margiolaki, I.; Guillou, N.; Férey, G.; Bourrelly, S.; Llewellyn, P. L.; Structural transformations and adsorption of fuel-related gases of a structurally responsive nickel phosphonate metal-organic framework, Ni-STA-12. *J. Am. Chem. Soc.* (2008), 130, 15967-15981.

6 Liu, Y.; O'Keeffe, M.; Treacy, M. M.; Yaghi, O. M.; The geometry of periodic knots, polycatenanes and weaving from a chemical perspective: a library for reticular chemistry. *Chem. Soc. Rev.* (2018), 47, 4642-4664.

7 Furukawa, H.; Cordova, K. E.; O'Keeffe, M.; Yaghi, O. M.; The chemistry and applications of metal-organic frameworks. *Science* (2013), 341, 1230444.

8 Dhakshinamoorthy, A.; Li, Z.; Garcia, H.; Catalysis and photocatalysis by metal organic frameworks. *Chem. Soc. Rev.* (2018), 47, 8134-8172.

9 Remya, V. R.; Kurian, M.; Synthesis and catalytic applications of metal-organic frameworks: a review on recent literature. *Int. Nano Lett.* (2019), 9, 17-29.

10 Liu, M.; Wu, J.; Hou, H.; Metal-organic framework (MOF)-based materials as heterogeneous catalysts for C—H bond activation. *Chem. Eur. J.* (2019), 25, 2935-2948.

11 Zhu, L.; Liu, X.-Q.; Jiang, H.-L.; Sun, L.-B.; Metal-organic frameworks for heterogeneous basic catalysis. *Chem. Rev.* (2017), 117, 8129-8176.

12 Kang, Y.-S.; Lu, Y.; Chen, K.; Zhao, Y.; Wang, P.; Sun, W.-Y.; Metal-organic frameworks with catalytic centers: From synthesis to catalytic application. *Coord. Chem. Rev.* (2019), 378, 262-280.

13 Chen, X.; Peng, Y.; Han, X.; Liu, Y.; Lin, X.; Cui, Y.; Sixteen isostructural phosphonate metal-organic frameworks with controlled lewis acidity and chemical stability for asymmetric catalysis. *Nat. Commun.* (2017), 8, 2171.

14 Espallargas, G. M.; Coronado, E.; Magnetic functionalities in MOFs: From the framework to the pore. *Chem. Soc. Rev.* (2018), 47, 533-557.

15 Kurmoo, M.; Magnetic metal-organic frameworks. *Chem. Soc. Rev.* (2009), 38, 1353-1379.

16 Stock, N.; Biswas, S.; Syntheses of metal-organic frameworks (MOFs): Routes to various MOF topologies, morphologies, and composites. *Chem. Rev.* (2012), 112, 933-969.

17 Ko, M.; Mendecki, L.; Mirica, K. A.; Conductive two-dimensional metal-organic frameworks as multifunctional materials. *Chem. Commun.* (2018), 54, 7873-7891.

18 Bhardwaj, S. K.; Bhardwaj, N.; Kaur, R.; Mehta, J.; Sharma, A. L.; Kim, K.-H.; Deep, A.; An overview of different strategies to introduce conductivity in metal-organic frameworks and miscellaneous applications thereof. *J. Mater. Chem. A* (2018), 6, 14992-15009.

19 Sun, L.; Campbell, M. G.; Dincă, M.; Electrically conductive porous metal-organic frameworks. *Angew. Chem. Int. Ed.* (2016), 55, 3566-3579.

20 Taylor, J. M.; Mah, R. K.; Moudrakovski, I. L.; Ratcliffe, C. I.; Vaidhyanathan, R.; Shimizu, G. K. H.; Facile proton conduction via ordered water molecules in a phosphonate metal-organic framework. *J. Am. Chem. Soc.* (2010), 132, 14055-14057.

21 Levenson, D. A.; Zhang, J.; Szell, P. M. J.; Bryce, D. L.; Gelfand, B. S.; Huynh, R. P. S. Fylstra, N.; Shimizu, G. K. H.; Effects of secondary anions on proton conduction in a flexible cationic phosphonate metal-organic framework. *Chem. Mater.* (2019), DOI: 10.1021/acs.chemmater.9b03453.

22 Pili, S.; Argent, S. P.; Morris, C. G.; Rought, P.; Garcia-Sakai, V.; Silverwood, I. P.; Easun, T. L.; Li, M.; Warren, M. R.; Murray, C. A.; Tang, C. C.; Yang, S.; Schroder, M.; Proton conduction in a phosphonate-based metal-organic framework mediated by intrinsic "free diffusion inside a sphere". *J. Am. Chem. Soc.* (2016), 138, 6352-6355.

23 Cai, W.; Wang, J.; Chu, C.; Chen, W.; Wu, C.; Liu, G.; Metal-organic framework-based stimuli-responsive systems for drug delivery. *Adv. Sci.* (2019), 6, 1801526.

24 Liu, R.; Yu, T.; Shi, Z.; Wang, Z.; The preparation of metal-organic frameworks and their biomedical application. *Int. J. Nanomed.* (2016), 11, 1187-1200.

25 Ibrahim, M.; Sabouni, R.; Husseini, G. A.; Anti-cancer drug delivery using metal organic frameworks (MOFs). *Curr. Med. Chem.* (2017), 24, 193-214.

26 Huang, Q.; Li, W.; Mao, Z.; Qu, L.; Zhang, H.; Yu, T.; Yang, Z.; Zhao, J.; Zhang, Y.; Aldred, M. P.; Chi, Z.; An exceptionally flexible hydrogen-bonded organic framework with large-scale void regulation and adaptive guest accommodation abilities. *Nat. Comm.* (2019), 10, 3074.

27 Yin, Q.; Lü, J.; Li, H.-F.; Liu, T.-F.; Cao, R.; Robust microporous porhyrin-based hydrogen-bonded organic framework for highly selective separation of $C_2$ hydrocarbons versus methane. *Cryst. Growth Des.* (2019), 19, 4157-4161.

28 Yoon, T.-U.; Baek, S. B.; Kim, D.; Kim, E.-J.; Lee, W.-G.; Singh, B. K.; Lah, M. S.; Bae, Y.-S.; Kim, K. S.; Efficient separation of $C_2$ hydrocarbons in a permanently porous hydrogen-bonded organic framework. *Chem. Commun.* (2018), 54, 9360-9363.

29 Bao, S.-S.; Shimizu, G. K. H.; Zheng, L.-M.; Proton conductive metal phosphonate frameworks. *Coord. Chem. Rev.* (2019), 378, 577-594.

30 Shearan, S. J. I.; Stock, N.; Emmerling, F.; Demel, J.; Wright, P. A.; Demadis, K. D.; Vassaki, M.; Costantino, F.; Vivani, R.; Sallard, S.; Salcedo, I. R.; Cabeza, A.; Taddei, M.; New directions in metal phosphonate and phosphinate chemistry. *Crystals* (2019), 9, 270.

31 Sevrain, C. M.; Berchel, M.; Couthon, H.; Jaffrès, P.-A.; Phosphonic acid: Preparation and applications. *Beilstein J. Org. Chem.* (2017), 13, 2186-2213.

32 Schoedel, A.; Li, M.; Li, D.; O'Keeffe, M.; Yaghi, O. M.; Structures of metal-organic frameworks with rod secondary building units. *Chem. Rev.* (2016), 119, 12466-2535.

33 Ramaswamy, P.; Wong, N. E.; Shimizu, G. K. H.; MOFs as proton conductors—challenges and opportunities. *Chem. Soc. Rev.* (2014), 43, 5913-5932.

34 Tholen, P.; Zorlu, Y.; Beckmann, J.; Yücesan G.; Steps towards the next generation of stable and functional MOFs. *Eur. J. Inorg. Chem.* (DOI: 10.1002/ejic.201901291).

35 Lin, R.-B.; He, Y.; Li, P.; Wang, H.; Thou, W.; Chen, B.; Multifunctional porous hydrogen-bonded organic framework materials. *Chem. Soc. Rev.* (2019), 48, 1362-1389.

36 Lou, J.; Wang, J.-W.; Zhang, J.-H.; Lai, S.; Zhong, D.-C.; Hydrogen-bonded organic frameworks: Design, structures and potential applications. *CrystEngComm.* (2018), 20, 5884-5898.

37 Hisaki, I.; Xin, C.; Takahashi, K.; Nakamura, T.; Designing hydrogen-bonded organic frameworks (HOFs) with permanent porosity. *Angew. Chem. Int. Ed.* (2019), 58, 11160-11170.

38 Wang, H.; Li, B.; Hu, T.-L.; Yao, Z.; Zhou, W.; Xiang, S.; Chen, B. A flexible microporous hydrogen-bonded organic framework for gas sorption and separation. *J. Am. Chem. Soc.* (2015), 137, 9963-9970.

39 Patil, R. S.; Banerjee, D.; Zhang, C.; Thallapally, P. K.; Atwood, J. L.; Selective $CO_2$ adsorption in a supramolecular organic framework. *Angew. Chem. Int. Ed.* (2016), 55, 4523-4526.

40 Luo, X.-Z.; Jia, X.-J.; Deng, J.-H.; Zhong, J.-L.; Liu, H.-J.; Wang, K.-J.; Zhong, D.-C.; A microporous hydrogen-bonded organic framework: exeptional stability and highly selective adsorption of gas and liquid. *J. Am. Chem. Soc.* (2013), 135, 11684-11687.

41 Karmakar, A.; Illathvalappil, R.; Anothumakkool, B.; Sen, A.; Samanta, P.; Desai, A. V.; Kurungot, S.; Ghosh, S. K.; Hydrogen-bonded organic frameworks (HOFs): A new class of porous crystalline proton-conducting materials. *Angew. Chem. Int. Ed.* (2016), 55, 10667-10671.

42 Yang, W.; Yang, F.; Hu, T.-L.; King, S. C.; Wang, H.; Wu, H.; Zhou, W.; Li, J.-R.; Arman, H. D.; Chen, B.; Microporous diaminotriazine-decorated porphyrin-based hydrogen-bonded organic framework: Permanent porosity and proton conduction. *Cryst. Growth Des.* (2016), 16, 5831-5835.

43 Zhai, F.; Zheng, Q.; Chen, Z.; Ling, Y.; Liu, X.; Weng, L.; Zhou, Y.; Crystal transformation synthesis of a highly stable phosphonate MOF for selective adsorption of $CO_2$. *CrystEngComm.* (2013), 15, 2040-2043.

44 Schütrumpf, A.; Bulut, A.; Hermer, N.; Zorlu, Y.; Kirpi, E.; Stock, N.; Yazaydin, A. Ö.; Yücesan, G.; Beckmann, J.; From tetrahedral tetraphosphonic acids E[p-$C_6H_4P(O)(OH)_2]_4$ (E=C, Si) to porous Cu- and Zn-MOFs with large surface areas. *ChemistrySelect* (2017), 2, 3035-3038.

45 Hermer, N.; Stock, N.; The new triazine-based porous copper phosphonate $[Cu_3(PPT)(H2O)_3]\cdot 10H_2O$. *Dalton Trans.* (2015), 44, 3720-3723.

46 Wang, B.; Rhauderwiek, T.; Inge, A. K.; Xu, H.; Yang, T.; Huang, Z.; Stock, N.; Zou, X.; A porous cobalt tetraphosphonate metal-organic framework: Accurate structure and guest molecule location determined by continuous-rotation electron diffraction. *Chem. Eur. J.* (2018), 24, 17429-17433.

47 Gao, C.; Ai, J.; Tian, H.; Wub, D.; Sun, Z.; An ultrastable zirconium-phosphonate framework as bifunctional catalyst for highly active $CO_2$ chemical transformation. *Chem. Commun*. (2017), 53, 1293-1296.

48 Zheng, T.; Yang, Z.; Gui, D.; Liu, Z.; Wang, X.; Dai, X.; Sheng, D.; Overcoming the crystallization and designability issues in the ultrastable zirconium phosphonate framework system. *Nat. Commun*. (2017), 8, 15369.

49 Rhauderwiek, T.; Zhao, H.; Hirschle, P.; Döblinger, M.; Bueken, B.; Reinsch, H.; Vos, D. D.; Wuttke, S.; Kolb, U.; Stock, N.; Highly stable and porous porphyrin-based zirconiium and hafnium phosphonates—electron crystallography as an important tool for structure elucidation. *Chem. Sci*. (2018), 9, 5467-5478.

50 Maares, M.; Ayhan, M. M.; Yu, K. B.; Yazaydin, A. O.; Harmandar, K.; Haase, H.; Beckmann, J.; Zorlu, Y.; Yücesan, G.; Alkali phosphonate metal-organic frameworks. *Chem. Eur. J*. (2019), 25, 11214-11217.

51 DOS CP2K, (available at http://wiki.wpi.edu/deskins-group/Density_of_States).

52 https://doi.org/10.26434/chemrxiv.11396622.v1

53 Homburg, T.; Tschense, C. B. L.; Wolkersdoerfer, K.; Reinsch, H.; Wark, M.; Többens, D.; Zander, S.; Senker, J.; Stock, N.; Magnesium doped gallium phosphonates $Ga_{1-x}Mg_x[H_{3+x}(O_3PCH_2)_3N]$ (x=0, 0.20) and the influence on proton conductivity. *Z Anorg. Allg. Chem*. (2018), 644, 86-91.

54 Maares, M.; Ayhan, M. M.; Yu, K. B.; Yazaydin, A. O.; Harmandar, K.; Haase, H.; Beckmann, J.; Zorlu, Y.; Yücesan, G.; Alkali phosphonate metal-organic frameworks. *Chem. Eur. J*. (2019), 25, 11214-11217.

55 Dubbeldam, D.; Calero, S.; Ellis, D. E.; Snurr, R. Q.; RASPA: Molecular simulation software for adsorption and diffusion in flexible nanoporous materials. *Mol. Sim*. (2016), 42, 81-101.

56 Mayo, S. L.; Olafson, B. D.; Goddard, W. A.; DREIDING: A generic force field for molecular simulations. *J. Phys. Chem*. (1990), 94, 8897-8909.

57 Campaná, C.; Mussard, B.; Woo, T. K.; Electrostatic potential derived atomic charges for periodic systems using a modified error functional. *J. Chem. Theo. Comp*. (2009), 5, 2866-2878.

58 Clark, S. J.; Segall, M. D.; Pickard, C. J.; Hasnip, P. J.; Probert, M. J.; Refson, K.; Payne, M. C.; First principles methods using CASTE P. *Z. Krist*. (2005), 220, 567-570.

59 Perdew, J.; Burke, K.; Ernzerhof, M.; Generalized gradient approximation made simple. *Phys. Rev. Lett*. (1996), 77, 3865-3868.

60 Vanderbilt, D.; Soft self-consistent pseudopotentials in a generalized eigenvalue formalism. *Phys. Rev. B*. (1990), 41, 7892-7895.

61 Talu, O.; Myers, A. L.; Molecular simulation of adsorption: Gibbs dividing surface and comparison with experiment. *AlChE. J*. (2001), 47, 1160-1168.

62 Hirschfelder, J. O.; Curtiss, C. F.; Bird, R. B.; *Molecular Theory of Gases and Liquids*, Wiley, New York, (1954), p. 1114.

63 Gelb, L. D.; Gubbins, K. E.; Pore size distributions in porous glasses: A computer simulation study. *Langmuir* (1999), 15, 305-308.

64 Potoff, J. J.; Siepmann, J. I.; Vapor-liquid equilibria of mixtures containing alkenes, carbon dioxide, and nitrogen. *AlChE J*. (2001), 47, 1676-1682.

65 Walton, K. S.; Snurr, R. Q.; Applicability of the BET method for determining surface areas of microporous metal-organic frameworks. *J. Am. Chem. Soc*. (2007), 129, 8552-8556.

66 VandeVondele, J.; Krack, M.; Mohamed, F.; Parrinello, M.; Chassaing, T.; Hutter, J.; QUICKSTEP: Fast and accurate density functional calculations using a mixed gaussian and plane waves approach. *Comput. Phys. Commun*. (2005), 167, 103-128.

67 Grimme, S.; Antony, J.; Ehrlich, S.; Krieg, H.; A consistent and accurate ab initio parametrization of density functional dispersion correction (DFT-D) for the 94 elements H—Pu. *J. Chem. Phys*. (2010), 132, 154104-1-154104-19.

68 Grimme, S.; Ehrlich, S.; Goerigk, L.; Effect of the damping function in dispersion corrected density functional theory. *J. Comput. Chem*. (2011), 32, 1456-1465.

69 Lippert, G.; Hutter, J.; Parrinello, M.; A hybrid gaussian and plane wave density functional scheme. *Mol. Phys*. (1997), 92, 477-488.

70 VandeVondele, J.; Hutter, J.; Gaussian basis sets for accurate calculations on molecular systems in gas and condensed phases. *J. Chem. Phys*. (2007), 127, 114105.

71 Goedecker, S.; Teter, M.; Separable dual-space gaussian pseudopotentials. *Phys. Rev. B—Condens. Matter Mater. Phys*. (1996), 54, 1703-1710.

72 Hartwigsen, C.; Goedecker, S.; Huller, J.; Relativistic separable dual-space gaussian pseudopotentials from H to Rn. *Phys. Rev. B—Condens. Matter Mater. Phys*. (1998), 58, 3641-3662.

73 Hestenes, M. R.; Stiefel, E.; Methods of conjugate gradients for solving linear systems. *J. Res. Natl. Bur. Stand*. (1952), 49, 409-436.

74 Macrae, C. F.; Edgington, P. R.; McCabe, P.; Pidcock, E.; Shields, G. P.; Taylor, R.; Towler, M.; Van De Streek, J; Mercury: Visualization and analysis of crystal structures. *J. Appl. Crystallogr*. (2006), 39, 453-457.

75 Togo, A.; Tanaka, I.; Spglib: a software library for crystal symmetry search. arXiv:1808.01590 (2018), (available at http://atztogo.github.io/spglib/).

76 Hinuma, Y.; Pizzi, G.; Kumagai, Y.; Oba, F.; Tanaka, I.; Band structure diagram paths based on crystallography. *Comput. Mater. Sci*. (2017), 128, 140-184.

77 APEX2, version 2014.11-0, Bruker (2014), Bruker AXS Inc., Madison, WI.

78 SAINT, version 8.34A, Bruker (2013), Bruker AXS Inc., Madison, WI.

79 SADABS, version2014/5, Bruker (2014), Bruker AXS Inc., Madison, WI.

80 Sheldrick, G. M.; SHELXT—Integrated space-group and crystal-structure determination. *Acta Cryst. A* (2015), 71, 3-8.

81 Sheldrick, G. M.; Crystal structure refinement with SHELXL. *Acta Cryst. C* (2015), 71, 3-8.

82 Dolomanov, O. V.; Bourhis, L. J.; Gildea, R. J.; Howard, J. A. K.; Puschmann, H; OLEX2: A complete structure solution, refinement and analysis program. *J. Appl. Crystallogr*. (2009), B, 339-341.

83 Spek, A. L; Structure validation in chemical crystallography. *Acta Cryst. D* (2009), 65, 148-155.

84 Kadish, K. M.; Caemelbecke, E. V.; Electrochemistry of porphyrins and related macrocycles. *J. Solid State Electrochem*. (2003), 7, 254-258.

The invention claimed is:

1. A hydrogen-bonded organic framework (HOF) comprising at least one organic linker with at least one functional group forming a hydrogen-bonded network, wherein the at least one functional group comprises a hydroxyl group and a central atom of tetrahedral geometry, and wherein the HOF is semi-conductive, proton-conductive and porous.

2. The HOF according to claim 1, wherein the central atom of the at least one functional group is selected from the group consisting of phosphorus (P), arsenic (As), antimony (Sb), silicon (Si), selenium (Se) and bismuth (Bi).

3. The HOF according to claim 2, wherein the at least one functional group of the at least one organic linker is selected from the group consisting of phosphonic acid, phosphinic acid, arsonic acids, arsenic acids, phosphonate, arsonate and/or esters thereof with at least one hydroxyl group.

4. The HOF according to claim 1, wherein the at least one organic linker is V-shaped, L-shaped, T-shaped, X-shaped, X-shaped tetrahedral, Y-shaped, star-shaped, linear or hexagonal geometrical core enabling a formation of void channels.

5. The HOF according to claim 1, wherein the at least one organic linker comprises porphyrin or phthalocyanine as a geometrical core.

6. The HOF according to claim 1, wherein the hydrogen-bonded network of the at least one functional group of the at least one organic linker forms one-dimensional hydrogen-bonded chains and/or two-dimensional hydrogen-bonded sheets.

7. The HOF according to claim 1, wherein the at least one organic linker forms two-dimensional hydrogen-bonded sheets, wherein the sheets assemble in multiple layers.

8. The HOF according to claim 1, wherein the at least one organic linker comprises at least two organic linkers of different structures.

9. The HOF according to claim 1, wherein the at least one organic linker comprises phenylphosphonic acid and/or 5,10,15,20-tetrakis[p-phenylphosphonic acid] porphyrin ($H_8$-TPPA).

10. The HOF according to claim 1, wherein the HOF consists of $H_8$-TPPA and optionally phenylphosphonic acid.

11. The HOF according to claim 1, wherein the at least one functional group of the at least one organic linker forms one, two and/or three hydrogen bonds with each other.

12. The HOF according to claim 1, wherein the HOF has a band gap of between about ~0 eV and about ~4.0 eV.

13. An electrode material comprising a proton exchange fuel cell having membrane material comprising the HOF according to claim 1 intermediate between a first layer generating either electron-hole pairs or excitons and a layer for separate extraction of differently charged carriers produced in the first layer to an external circuit.

14. A covalent organic framework (COF), characterized in that it has been generated from the HOF according to claim 1, by transforming the hydrogen bonds between the at least one functional group into covalent anhydride bonds via a condensation reaction or reactions known to form anhydrides.

15. A method of synthetizing the HOF according to claim 1, by combining the at least one organic linker of the HOF in a solution, wherein the solution comprises a solvent;

and the solution is incubated at about 80° C.

16. The HOF according to claim 5, wherein the geometrical core comprises a bound metal, or a transition metal.

17. The HOF according to claim 16, wherein the bound metal is at least one of iron (Fe), palladium (Pd), zinc (Zn), copper (Cu), or nickel (Ni).

18. The HOF according to claim 6, wherein the at least one functional group also forms isolated hydrogen bonded clusters.

19. The HOF according to claim 7, wherein the hydrogen-bonded network extends in the two-dimensional hydrogen-bonded sheets and/or between the multiple layers.

20. The HOF according to claim 8, wherein the at least two organic linkers of different structures comprise identical functional groups.

* * * * *